United States Patent
Budra et al.

(10) Patent No.: US 7,150,630 B2
(45) Date of Patent: Dec. 19, 2006

(54) METHOD AND APPARATUS FOR AUTOMATED TRAINING OF LANGUAGE LEARNING SKILLS

(75) Inventors: Elizabeth H. Budra, Albany, CA (US); Elizabeth C. Cottle, San Francisco, CA (US); Logan E. De Ley, Alameda, CA (US); Jefferson A. Dewey, San Francisco, CA (US); William M. Jenkins, Berkeley, CA (US); Virginia A. Mann, Dana Point, CA (US); Steven L. Miller, Pacifica, CA (US)

(73) Assignee: Scientific Learning Corporation, Oakland, CA (US)

( * ) Notice: Subject to any disclaimer, the term of this patent is extended or adjusted under 35 U.S.C. 154(b) by 2 days.

(21) Appl. No.: 11/115,997

(22) Filed: Apr. 27, 2005

(65) Prior Publication Data

US 2005/0196731 A1  Sep. 8, 2005

Related U.S. Application Data

(63) Continuation of application No. 10/788,182, filed on Feb. 26, 2004, now Pat. No. 6,986,663, which is a continuation of application No. 09/965,530, filed on Sep. 26, 2001, now Pat. No. 6,726,486.

(60) Provisional application No. 60/236,918, filed on Sep. 28, 2000.

(51) Int. Cl.
*G09B 5/00* (2006.01)

(52) U.S. Cl. .................. 434/169; 434/167; 434/236; 434/307 R; 434/362; 704/251

(58) Field of Classification Search ................ 434/118, 434/156, 167, 169, 178, 185, 307 R, 308, 434/322, 323, 350, 362, 365; 704/1, 7, 9, 704/251, 254, 257, 270; 702/19
See application file for complete search history.

(56) References Cited

U.S. PATENT DOCUMENTS

| | | | |
|---|---|---|---|
| 4,308,017 A | 12/1981 | Laughon et al. | |
| 4,437,837 A | 3/1984 | Schnettler et al. | |
| 4,690,644 A | 9/1987 | Flanders et al. | |
| 4,832,605 A | 5/1989 | Bragin | |
| 5,147,205 A | 9/1992 | Gross et al. | |
| 5,203,705 A | 4/1993 | Hardy et al. | |

(Continued)

OTHER PUBLICATIONS

Adams, MJ. "*Beginning to read: Thinking and learning about print.*" Cambridge, MA. MIT Press. 1993. 3 pages of cover sheet.

(Continued)

*Primary Examiner*—Joe H. Cheng
(74) *Attorney, Agent, or Firm*—James W. Huffman

(57) ABSTRACT

A computer program for execution on a computing device is provided to cross-train students in language development skills such as letter-word correspondence, word recognition, vocabulary, and sentence and paragraph comprehension. A set of programs provide an adaptive methodology for training a student in decoding (semantic, syntactic, phonological, and morphological relationships), knowledge of rhymes, synonyms, antonyms, and homophones, spelling, letter-word correspondences, sentence comprehension, grammatical comprehension, working memory, vocabulary, paragraph comprehension, and improved reading comprehension. In each program, students are presented with an animated scene that poses a question, and a set of answers. The set of answers contain a correct response, and a number of incorrect responses or foils. The student advances to more complex levels by satisfying predetermined correct thresholds. Through repetition and intensity, the student's language skills are developed.

31 Claims, 34 Drawing Sheets

U.S. PATENT DOCUMENTS

| | | | |
|---|---|---|---|
| 5,219,291 | A | 6/1993 | Fong et al. |
| 5,572,423 | A | 11/1996 | Church |
| 5,717,468 | A | 2/1998 | Baryla |
| 5,717,828 | A | 2/1998 | Rothenberg |
| 5,722,418 | A | 3/1998 | Bro |
| 5,724,262 | A | 3/1998 | Ghahramani |
| 5,727,950 | A | 3/1998 | Cook et al. |
| 5,754,938 | A | 5/1998 | Herz et al. |
| 5,827,071 | A | 10/1998 | Sorensen et al. |
| 5,835,758 | A | 11/1998 | Nochur et al. |
| 5,873,094 | A | 2/1999 | Talatik |
| 5,987,443 | A | 11/1999 | Nichols et al. |
| 6,006,221 | A | 12/1999 | Liddy et al. |
| 6,024,571 | A * | 2/2000 | Renegar ..................... 434/157 |
| 6,105,046 | A | 8/2000 | Greenfield et al. |
| 6,109,925 | A | 8/2000 | Druckman et al. |
| 6,160,986 | A | 12/2000 | Gabai et al. |
| 6,275,789 | B1 * | 8/2001 | Moser et al. .................. 704/7 |
| 6,343,935 | B1 | 2/2002 | Clements |
| 6,411,932 | B1 | 6/2002 | Molnar et al. |
| 6,676,412 | B1 | 1/2004 | Masterson et al. |
| 6,685,477 | B1 | 2/2004 | Goldman et al. |
| 6,755,657 | B1 | 6/2004 | Wasowicz |
| 2002/0035486 | A1 | 3/2002 | Huyn et al. |
| 2002/0090596 | A1 | 7/2002 | Sosoka et al. |
| 2002/0091686 | A1 | 7/2002 | Keith |
| 2002/0107681 | A1 | 8/2002 | Goodkovsky |
| 2002/0132213 | A1 | 9/2002 | Grant et al. |
| 2002/0194081 | A1 | 12/2002 | Perkowski |
| 2004/0029084 | A1 | 2/2004 | Johnson et al. |
| 2004/0219495 | A1 | 11/2004 | Marcus et al. |
| 2006/0069512 | A1 * | 3/2006 | Rzhetsky et al. ............. 702/19 |

OTHER PUBLICATIONS

Anglin, JM. "Vocabulary Development: A Morphological Analysis." *Monographs of the Society for Research in Child Development.* 1993. p. 57-79, 149-157.

*Annabelle's Quotation Guide.* www.annabelle.net. Feb. 7, 2002. 2 pages.

Bryant, P, Nunes, T, & Bindman, M. "The relations between Children's Linguistic Awareness and Spelling: The Case of the Apostrophe" *Reading and Writing: An Interdisciplinary Journal.* 2000. (253-276).

Carroll, JB. "The Analysis of Reading Instruction: Perspectives from Psychology and Linguistics." *Scientific Studies of Reading.* (3-17). 2000.

Daneman & Carpenter. "Individual differences in working memory and reading" *Verbal learning and verbal memory.* 1980. (450-466).

Ehri, I & Wilce, LS. "Movement into reading: Is the first stage of printed word learning visual or phonetic?" *Reading Research Quarterly.* 1985. (163-179).

Ferster, CB & Skinnder, BF. "*Schedules of Reinforcement.*" New York, NY: Appleton Century Crofts. 1957. 2 pages of cover sheet.

Fry. "*The Reading Teacher's Book of Lists.*" West Nyack, NY: Center of Applied Research in Education. 1984. 3 pages of cover sheet.

Graves, MF. "Vocabulary Learning and Instruction" In EZ Rothkopf (Ed.) *Review of Research in Education.* (49-89). 1986. Washington, DC: American Educational Research Association.

Hall, SL & Moats, LC. "*Straight Talk About Reading.*"Chicago, IL: Contemporary Books. 1999. 3 pages of cover sheet.

Kucera, H & Francis, WN. "*Computational Analysis of Present-Day American English.*"1967. Providence, RI: Brown University Press. 2 pages of cover sheet.

Laberge & Samuels. "Towards a Theory of Automatic Information Processing in Reading" *Cognitive Psychology.* 1974. (293-323).

"*Language Arts Curriculum Frameworks and Standards.*"2000. Links to available state language arts curriculum frameworks and standards 10 pages.

Mahony, D, Singson, M & Mann, VA. "Reading Ability and Sensitivity to Morphophonological Relations." *Reading and Writing An Interdisciplinary Journal.* 2000. (191-218).

Mann, VA. "Introduction to Special Issue on Morphology and the Acquisition of Alphabetic Writing Systems." *Reading and Writing: An Interdisciplinary Journal.* 2000. (143-147).

Lyon, GR. "*Learning to Read: A Call from Research to Action.*"www.ncld.org/theirworld/lyon98.html. 1997. 10 pages.

Mogilner, A. "*Children's Writers Word Book.*" Cincinnati, OH: Writer's Digest Books. 3 pages of cover sheet, 1992.

Quotation Ring Homepage. *The Gate to a Webring of Quotes Collections.* www.gunnar.cc/webring/quotes.html Feb. 7, 2002. 2 pages.

Rayner, K & Pollatsek, A. "*The Psychology of Reading.*"Englewood Cliffs, NJ: Prentice Hall. 1989. 3 pages of cover sheet.

Readence, JE, Bean, TW & Baldwin, RS. "*Content Area Literacy: An Integrated Approach.*"Dubuque, Iowa: Kendall/Hunt Publishing Co. 1998. 3 pages of cover sheet.

"*Reading/Language Arts Framework for California Public Schools.*" Sacramento, CA: California Department of Education. 1999. p. 22-95.

Scarborough, HS. "Continuity Between Childhood Dyslexia and Adult Reading." *British Journal of Psychology.* Aug. 1984 (329-48).

Searfoss, LW & Readence, JE. "*Helping Children Learn to Read.*"Needham, MA: Allyn and Bacon. 4 pages of Cover sheet, 1994.

Shankweiler & Liberman. "Misreading: A Search for Causes." *In Language by Ear and by Eye.* Cambridge, MA: MIT Press. 1972. p. 293-295, 297, 299, 301, 303, 306, 208, 310, 312, 314, 315.

Singson, M, Mahony, D & Mann, VA. "The Relation Between Reading Ability and Morphological Skills: Evidence from Derivational Suffixes." *Reading and Writing: An Interdisciplinary Journal.* 2000. (219-252).

Snow, CE, Burns, MS & Griffin, P. "*Preventing Reading Difficulties In Young Children.*" National Research Council Committee on the Prevention of Reading Difficulties in Young Children. Washington, DC: National Academy Press. 1998. 7 pages.

Taylor, I & Taylor MM. "*The Psychology of Reading.*" New York, NY: Academic Press, 3 pages of cover sheet, 1983.

Venezky, RL. "*The American Way of Spelling.*" New York, NY: Guilford Press. 1999. p. 4-7, 51-95, 125-159, 164, 165, 168-209, 230-245.

Scientific Learning. *Fast-Forward Reading.* 2001. 5 pages.

"*English- Language Arts Content Standards for California Public Schools.*" California Department of Education. 1997. p. 1-84.

Kavanagh, J & Mattingly, I. "*Language by Ear and Eye: The Relationships Between Speech and Reading.*" 1992. 3 pages of cover sheet.

National Assessment of Education Progress *The Nation's Report Card: Focus on Reading.* http://nces.ed.gov/nationsreportcard/reading/reading.asp. 6 pages.

* cited by examiner

Select an Exercise

Scrap Cat
Canine Crew
Chicken Dog
Twisted Pictures
Book Monkeys
Hog Hat Zone

FIG. 22 ← 2200
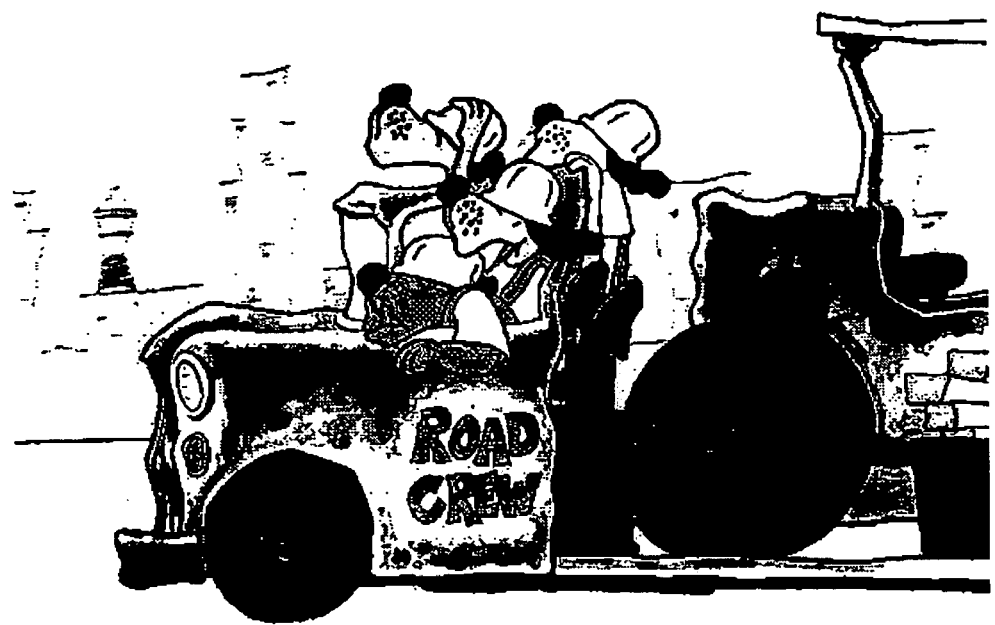

The rat is dancing.

The bird is drinking.

The rat is sitting.

The cat is sitting.

METHOD AND APPARATUS FOR AUTOMATED TRAINING OF LANGUAGE LEARNING SKILLS

CROSS REFERENCE TO RELATED APPLICATION

This application is a continuation of U.S. patent application Ser. No. 10/788,182, filed Feb. 26, 2004, now U.S. Pat. No. 6,986,663 B2, which a continuation of U.S. patent application Ser. No. 09/965,530, filed Sep. 26, 2001, now U.S. Pat. No. 6,726,486 B2, which claims the benefit of provisional application No. 60/236,918, filed Sep. 28, 2000, and is related to U.S. application Ser. No. 11/115,994, filed Apr. 27, 2005, U.S. application Ser. No. 11/115,870, filed Apr. 27, 2005, and U.S. application Ser. No. 11/116,062, filed Apr. 27, 2005 and having common inventors.

| Docket No. | Ser. No. | Filing Date | Title |
| --- | --- | --- | --- |
| SLC.0006-C2 | | | METHOD AND APPARATUS FOR AUTOMATED TRAINING OF LANGUAGE LEARNING SKILLS |
| SLC.0006-C4 | | | METHOD AND APPARATUS FOR AUTOMATED TRAINING OF LANGUAGE LEARNING SKILLS |
| SLC.0006-C5 | | | METHOD AND APPARATUS FOR AUTOMATED TRAINING OF LANGUAGE LEARNING SKILLS |

FIELD OF THE INVENTION

This invention relates in general to the field of language education, and more specifically to a computer program for training a human's language learning skills.

BACKGROUND OF THE INVENTION

Decades of research in the fields of education and cognitive psychology have shown that the following skills are critical to learning to read proficiently:

Phonemic awareness
Letter-word correspondence skills
Fluent word recognition
Vocabulary
Comprehension skills
Appreciation of literature Once students have developed good phonemic awareness skills, research strongly supports concurrent training of the other five reading skills (letter-word correspondences, word recognition, vocabulary, comprehension, and appreciation of literature) as the next step towards reading fluency. Students learn to read most proficiently and quickly when all these skills are taught at the same time rather than sequentially.

Phonemic awareness is part of a broader skill set called phonological awareness, which is the ability to recognize and use all sizes of sound units, such as words, syllables, and phonemes. An extremely successful set of programs have been developed by Scientific Learning Corporation. They are called Fast ForWord Language, Fast ForWord Middle and High School, and Fast ForWord Language to Reading, information for which may be found at www.scientificlearning.com. However, up to this time, there has not been a program that adequately teaches the other five skills mentioned above, once phonological awareness has been developed.

Neuroscientific research has also found that there is a potent combination of elements that lead to efficient learning of new tasks and concepts:

Frequency
Intensity
Cross-training
Adaptivity
Motivation and attention

What is needed is a program that incorporates the elements of frequency, intensity, cross-training, adaptivity, and motivation, while training students on foundational language skills such as letter-word correspondences, word recognition, vocabulary, comprehension, and appreciation of literature.

SUMMARY

The present invention provides a method for cross-training a student in decoding, spelling, sentence comprehension and paragraph comprehension so that s/he may become a better reader, and a better learner. More specifically, the method utilizes a computing device to train a student in semantic, syntactic, phonological and morphological categories, with the method adaptively presenting the training in an entertaining way according to the skill level of the student.

In one aspect, the present invention provides A method on a computing device for training a student to recover syntactical structures of sentences, the method comprising: providing a plurality of sentence categories, each of the categories having a plurality of sentences to be presented as trials, the categories varying in syntactical complexity; providing a plurality of graphical pictures, each of the pictures corresponding to at least one of the plurality of sentences to be presented as trials; graphically presenting one of the plurality of graphical pictures to the student; graphically presenting one of the plurality of sentences from a first category to the student as a target, the graphically presented one of the plurality of sentences corresponding to the graphically presented one of the plurality of graphical pictures; graphically presenting at least one of the plurality of sentences that does not correspond to the graphically presented one of the plurality of graphical pictures, as a foil; requiring the student to select between the target and the foil; and recording whether the student correctly selected the target.

In another aspect, the present invention provides a method for training a student to choose a sentence that best describes a picture, the method presented within a game environment on a personal computer, the method comprising: providing a plurality of target sentences each of which correspond to at least one of a plurality of pictures; providing a plurality of foil sentences; graphically presenting one of the plurality of pictures, its corresponding target sentence, and at least one of the plurality of foil sentences; requiring the student to select between the target sentence and the at least one of the plurality of foil sentences, according to which one corresponds to the graphically presented picture; recording whether the student correctly selected the target sentence; and repeating said steps of graphically presenting thru recording for each of the plurality of target sentences.

Other features of the present invention will become apparent upon study of the remaining portions of the specification and drawings.

BRIEF DESCRIPTION OF THE DRAWINGS

FIG. 22 is a screen shot illustrating a reward animation within the game Canine Crew.

DETAILED DESCRIPTION

The present invention is embodied in a computer program entitled Fast ForWord Reading developed by Scientific Learning Corporation. A comprehensive discussion of this program may be found in a text developed by Scientific Learning Corporation entitled "Fast ForWord Reading: Why It Works", and on its web site at www.scientificlearning.com related to Fast ForWord Reading, both of which are incorporated herein by reference for all purposes.

Fast ForWord Reading includes six exercises that train skills crucial to proficient reading. The exercises are: 1) Scrap Cat; 2) Canine Crew; 3) Chicken Dog; 4) Twisted Pictures; 5) Book Monkeys; and 6) Hog Hat Zone. Although each of these games incorporates aspects of the other games with respect to certain language skills, and thereby affects cross-training of language skills, they are also designed to aid in developing specific skills. A detailed description of each of these games now follows.

Figure 1:
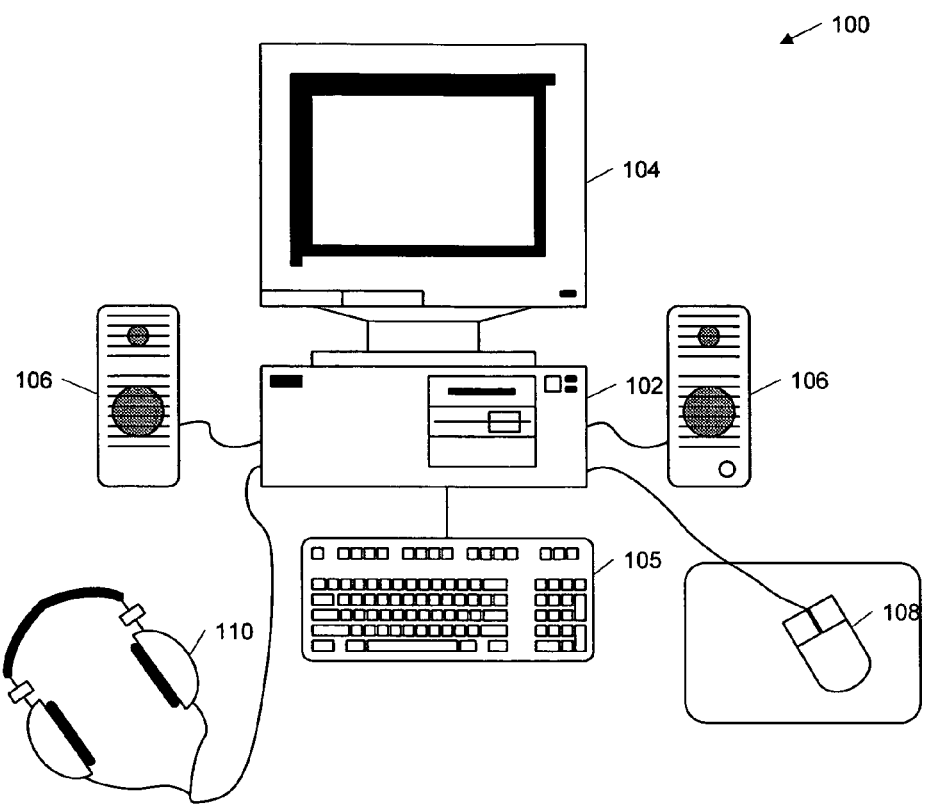
FIG. 1 is a block diagram illustrating a computer environment upon which the present invention can be utilized.

Referring to FIG. 1, a computer system 100 is shown for executing a computer program according to the present invention. The computer system 100 contains a computer 102, having a CPU, memory, hard disk and CD ROM drive (not shown), attached to a monitor 104. The monitor 104 provides visual prompting and feedback to the subject during execution of the computer program. Attached to the computer 102 are a keyboard 105, speakers 106, a mouse 108, and headphones 110. The speakers 106 and the headphones 110 provide auditory prompting and feedback to the subject during execution of the computer program. The mouse 108 allows the subject to navigate through the computer program according to the present invention, and to select particular responses after visual or auditory prompting by the computer program. The keyboard 105 allows an instructor to enter alpha numeric information about the subject into the computer 102. Although a number of different computer platforms are applicable to the present invention, embodiments of the present invention execute on either IBM compatible computers or Macintosh computers.

Figure 2:
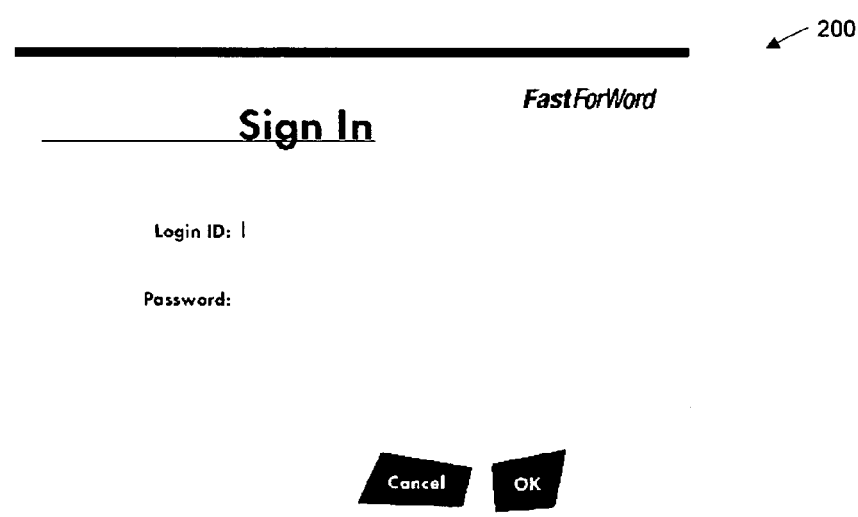
FIG. 2 is a block diagram of login screen for Fast ForWord Reading, according to the present invention.

Referring now to FIG. 2, a login screen 200 is shown allowing a user to enter into the Fast ForWord Reading program. A login such as this is important for several reasons. First, it insures that only licensed students obtain the training provided by the Reading games. Second, it allows the software to act as a client, in a client-server architecture, specifically to allow the client to communicate game progress for each student back to the server. This provides an important progress reporting function that is desirable to the student. In addition, it provides significant heuristic information relating to each trial, and the success of the training methodology of each game back to the developer, so that further advancements can be made.

Figure 3:
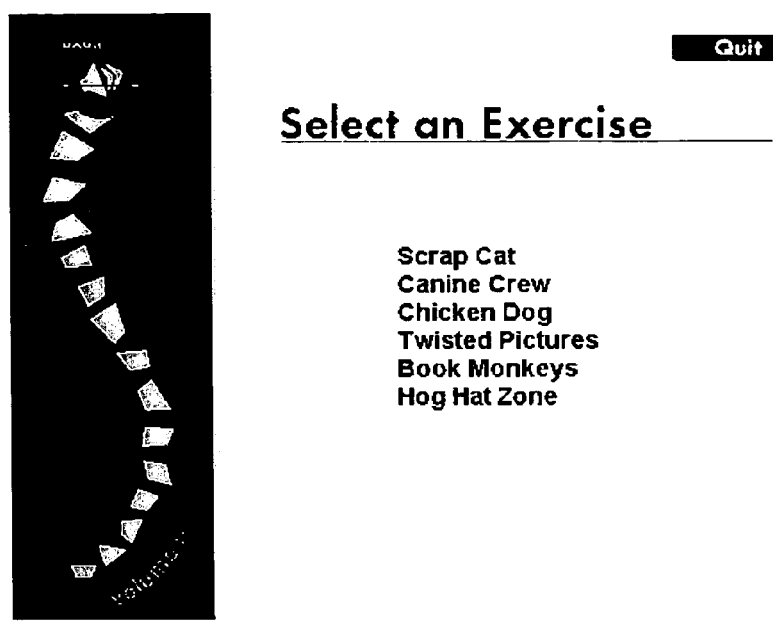
FIG. 3 is a screen shot of a game selection screen for Fast ForWord Reading, according to the present invention.

Once the student enters their username and password, they are taken to the main program selection screen 300 of FIG. 3 to which attention is now directed. Screen 300 shows six games that are to be played within Fast ForWord Reading: 1) Scrap Cat; 2) Canine Crew; 3) Chicken Dog; 4) Twisted Pictures; 5) Book Monkeys; and 6) Hog Hat Zone. The student begins training in one of the games by selecting the name of the game on the screen 300. One skilled in the art will appreciate that an alternative methodology would allow a trainer, or a supervisor, to particularly specify the games to be played, and the order in which they are to be played. By providing multiple games, each of which train on different aspects important in language learning and comprehension, a student will be cross trained in a number of areas important in becoming an efficient reader.

With this in mind, an overview of Decoding will now be provided, along with a detailed description of the games Scrap Cat and Canine Crew. This will be followed with an overview of Spelling and a detailed description of the game Chicken Dog. Sentence Comprehension will then be discussed, along with the game Twisted Pictures. Finally, Paragraph Comprehension will be discussed along with a detailed description of the games Book Monkeys and Hog Hat Zone.

Decoding

Decoding is the ability to decipher printed words by recovering the spoken word that a printed word represents. More specifically, decoding a word involves realizing that a printed word reproduces the spoken word as a written sequence of phonemes, recognizing the individual phonemes that the printed word represents, and then blending those phonemes to form the sound of the word. Decoding involves many skills, including: Conceptual relationships; semantics; syntax; phonological properties; and morphological properties.

Conceptual relationships—A student's ability to figure out and remember new words depends on that student's pre-existing knowledge of other words and concepts. Understanding the conceptual relationships between words helps the student associate a new word to a known concept, which strengthens the student's understanding and ability to remember not only the new word, but the previously known word as well. Moreover, as the student encounters more and more related words, the student's understanding of those words and the concepts behind them becomes more and more flexible; the student's understanding of the concept broadens to include many different aspects of that concept. This broader understanding also helps the student become aware of and understand relevant differences among the words and the concepts they represent. For instance, a student who knows the word "house" and then encounters "mansion" can then link the concepts behind these two words; they are synonymous in that both are dwellings. The student will also start to notice the differences between the two—size, for one—and narrow his or her understanding of what a house is: a dwelling that isn't enormous. When that student later comes across "cottage" for the first time, that student can cluster it with "house" and "mansion." The student will then have an even better concept of what a house is: a medium sized dwelling; not too big, not too small.

Semantics—The larger a student's vocabulary, the better that student's ability to understand and remember the meanings of new words. Vocabulary instruction helps increase the student's vocabulary by directly teaching new words as well as by enhancing that student's ability to learn new words. In addition, explicit vocabulary instruction increases reading comprehension not only of the words directly taught but also of words in general.

Syntax—To understand a sentence, the student must understand the relationships among the words. When students read a sentence, they hold the words and their meanings in memory until the grammatical function of the words—the syntax of the sentence—becomes clear. After the semantic and syntactic meanings of the sentence have been decoded, the student retains the general meaning of the sentence and quickly loses memory of the actual words and structure. Although it is not absolutely necessary for the student to know syntactic labels in order to understand the relationships among words, research shows that explicit training in grammar labels and rules helps students understand sentences better—and remember them better, as well.

Phonological Properties—Using the phonological properties of a word to decipher its meaning, is a decoding method used by all readers at all ages. Phonemic awareness is one of the first steps toward using this method; the student must be able to appreciate the fact that words are made up of the units of sounds referred to as phonemes before that student can recognize the letters that symbolize those sounds—and then go on to build letter-sound correspondence skills. Successful decoding depends on the development of phonemic awareness.

In addition to being aware of the phonemes themselves, readers must appreciate that the pronunciation of a letter depends on the letters that surround it. For example, e is pronounced very differently in bed, bead, and bite. Also consider digraphs, which are combinations of two letters, such as sh and ch; the digraphs and their individual letters have very different pronunciations (for example, the s in sip and ship). Pronunciation of a letter sometimes depends on the root word, prefix, or suffix: autumn contains a silent n, but the addition of the suffix -al causes the n in the resulting word, autumnal, to be pronounced. Different word families have different pronunciations (hoot and soon have a different vowel sound than look and brook). Different words can be spelled the same way (for instance, the two pronunciations of words like read and primer); words that sound the same can also be spelled differently, such as there and their. Many of these seeming irregularities are actually rule-governed, but the reader has to discover or be taught the rules and learn to categorize words accordingly.

Once the reader successfully links letters and letter sequences to their underlying phonological structures, word recognition becomes largely automatic and the student can comprehend familiar words without consciously analyzing their phonological properties. However, even very skilled readers will use phonological properties to decode a word they have never seen before. For example, how could you read the nonsense word atishnet if you didn't use the phonological properties of the word?

Morphological Properties—Understanding morphemes helps the student break an unfamiliar word into comprehensible pieces. A student who understands what hope means and what -ful means will be able to put two and two together when first confronted with the word hopeful. Morphemes can also help the student decide whether a word is verb, adjective, or noun and thus provide another type of clue to the word's meaning and function in the sentence.

In addition, the student's vocabulary in $3^{rd}$ grade and beyond is expanded primarily through adding morphemes to already known root words. As the student progresses, he or she relies more and more on analyzing morphological components in order to decode new words.

The first game in Fast Forward Reading is called Scrap Cat. Scrap Cat utilizes a combination of elements that lead to efficient learning, including: frequency, intensity, cross-training, adaptivity, and motivation. Cross training, adaptivity and motivation are directly incorporated into the game Scrap Cat. Frequency and intensity are a function of the training schedule.

More specifically, Scrap Cat focuses on helping the student improve decoding, vocabulary, and word recognition skills by training in: Conceptual relationships; Semantics; Syntax; Phonological properties; and morphological properties. For example, Scrap Cat trains in conceptual relationships by having the student sort several words into a few different categories, thereby increasing his/her understanding of how words relate to one another. In addition, Scrap Cat trains the student in semantics by having the student categorize words according to their meaning. Scrap Cat further trains the student in syntax by having the student categorize words according to the grammatical function of the word. Scrap Cat also trains the student's phonological properties by having the student categorize words according to the attributes of the different sounds within a word. Scrap Cat further trains the student's morphological properties by having the student categorize words according to morphemes.

Scrap Cat trains the student as above by having him/her progress through four category types: Semantic; Syntactic; phonological; and morphological. A complete listing of the categories are provided in Appendix A, attached hereto. More specifically, the Semantic categories require the student to sort words according to definition (such as animals and states). The Syntactic categories require the student to sort words into grammatical groups (such as nouns and verbs). The Phonological categories require the student to sort words according to vowel sounds, consonant sounds, and syllables (such as "has one consonant sound" and "has the same vowel sound as ate"). The Morphological categories require the student to sort words by morpheme (such as "has a suffix that means full of" and "is a plural").

Adaptivity—Scrap Cat adapts to the student's incoming skill level and, as the student continues to train, tracks the number of correct and incorrect answers and adjusts the training level when the student is ready to advance or needs to transition to different training material. This flexible approach ensures that the student is challenged but not frustrated, which in turn ensures that the student continues to pay attention to and enjoys training, as well as continues to learn and progress in the exercise.

Advancement in Scrap Cat is made by providing progressively larger numbers of words in progressively more categories. That is, when starting to train on a new category type, such as semantics, Scrap Cat presents two different categories (such as animals and thing to wear) from the first category group. The student then sorts six different words (such as salamander and mitten) into these categories. After all six words have been sorted, Scrap Cat evaluates that group of trials. If the student has sorted at least 90 percent of the words correctly, Scrap Cat presents more categories and more words to sort until the student is sorting 20 words into 4 different categories. After the student has completed 90 percent of each group of trials correctly for the current category group, Scrap Cat advances to the next category group. When the student has completed Scrap Cat, that student will have been exposed to 412 words and will have correctly categorized at least 370 words.

Table 1 below illustrates the category types in progression order.

TABLE 1

| Semantic | Syntactic | Phonological | Morphological |
| --- | --- | --- | --- |
| (1) 2 × 3 | (1) 2 × 3 | (1) 2 × 3 | (1) 2 × 3 |
| (1) 3 × 3 | (1) 3 × 3 | (1) 3 × 3 | (1) 3 × 3 |
| (1) 3 × 4 | (1) 3 × 4 | (1) 3 × 4 | (1) 3 × 4 |
| (1) 4 × 4 | (1) 4 × 4 | (1) 4 × 4 | (1) 4 × 4 |
| (5) 4 × 5 | (5) 4 × 5 | (5) 4 × 5 | (5) 4 × 5 |

Plateau-Based Transitions—Scrap Cat allows a student who is not progressing in one area to continue to advance in other areas. To accomplish this goal, Scrap Cat uses plateau-based transitions to allow the student to train on different material when the student becomes stuck in one category group or category type and is not able to progress immediately. If a student repeats a group of trials 3 times but does not achieve 90 percent correct, Scrap Cat presents a new category group from the same category type. For instance, if the student is training on phonology and is having trouble sorting words in the second category group (which includes categories such as "words that have the same vowel sound as mop"), Scrap Cat switches to presenting words from the third category group (which includes categories such as "words that have three consonants"). If the student repeats this new group of trials 3 times without sorting 90 percent of the words correctly, Scrap Cat transitions to the next category: morphology. Before the student completes the exercise—and after the student completes as much of the material in Scrap Cat as possible—Scrap Cat returns the student to the group (or groups) of trials that the student did not complete with 90 percent accuracy. Scrap Cat requires the student to train on this group (or groups) of trials until s/he achieves 90 percent accuracy. A complete flow chart illustrating this adaptivity in training is provided below in FIG. 15.

Figure 4:
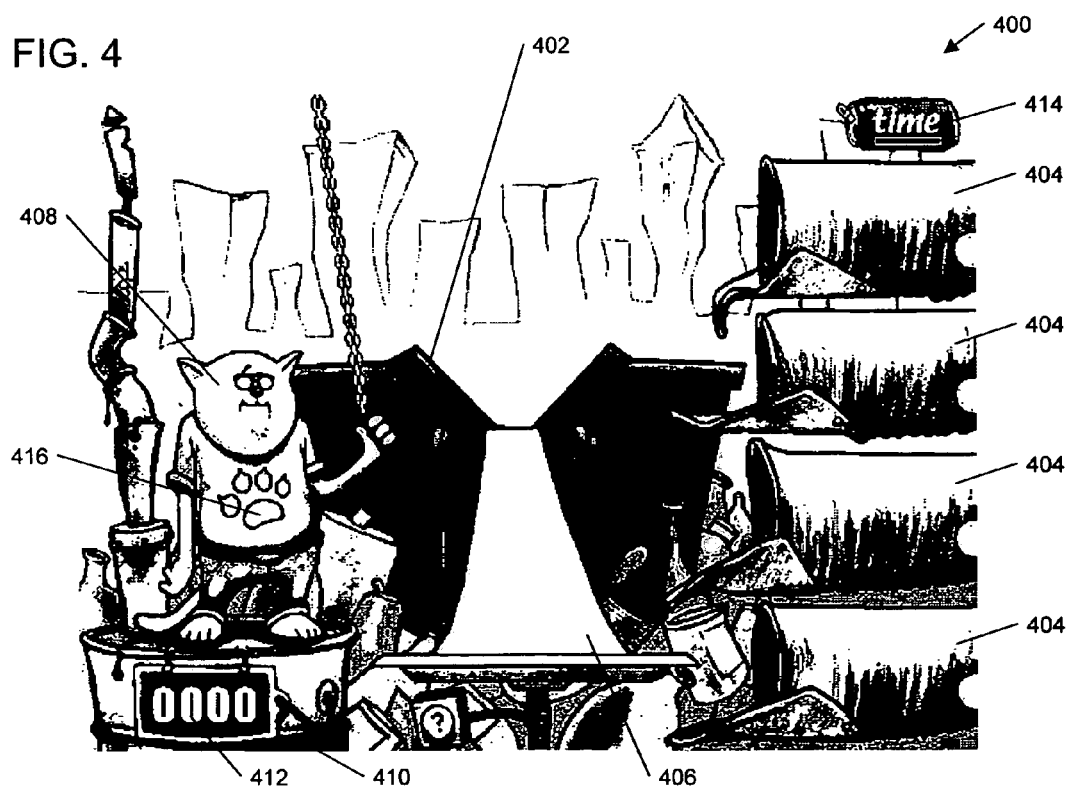
FIG. 4 is a screen shot of an opening scene in the game Scrap Cat.

With the above background on Scrap Cat, the reader's attention is now directed to FIG. 4 which provides a screen shot 400 illustrating an initial scene for the game. The setting for the game is a junkyard. When the game begins, the student is presented with an empty garbage bin 402, a number of recycling containers 404, a recycling chute 406, and a character 408 entitled "Scrap Cat". Scrap Cat 408 is standing on a barrel 410 that contains a counter 412. In the upper right hand corner of the scene 400 is a time indicator 414 that provides the student with a relative indication of the time remaining for training.

On Scrap Cat's 408 shirt is a paw 416. The student begins training by placing a cursor (moved by a computing input device such as a mouse) over the paw 416 and selecting the paw 416 (by clicking the mouse, for example). When the student has indicated selection of the paw 416, a bottle or can rolls down the recycling chute 406 and displays a word. The student must figure out which category the word fits into, and then select (by mouse click, for example) that category's recycling container 404.

Figure 5:
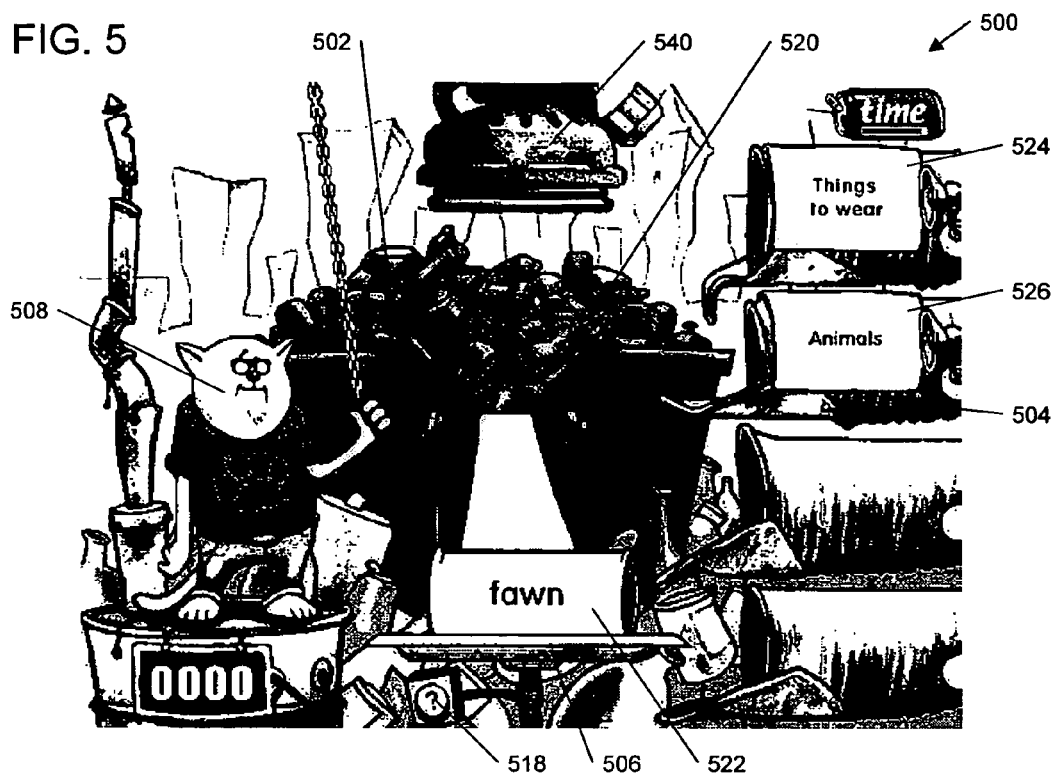
FIG. 5 is a screen shot of a beginning trial for the game Scrap Cat.

Referring now to FIG. 5, a screen shot 500 is shown, illustrating a first trial (presented after the student selected the paw 416). Like elements have like references, the hundreds digit being replaced by a "5". The garbage bin 502 is first filled with garbage 520, and then a first word 522 is presented on a rolling can or bottle at the bottom of the recycling chute 506. At first, the student is provided with just two categories into which the word 522 must be sorted. In this example, the word 522 fawn must be sorted into one of the categories: "things to wear" 524; or "Animals" 526. For the first trial, the correct category (e.g., Animals) is highlighted to indicate to the student that they are to select Animals. Upon successful selection of the category Animals, a crusher 540 crushes the word fawn 522 and sorts it into the recycling bin 504 associated with Animals.

Figure 6:
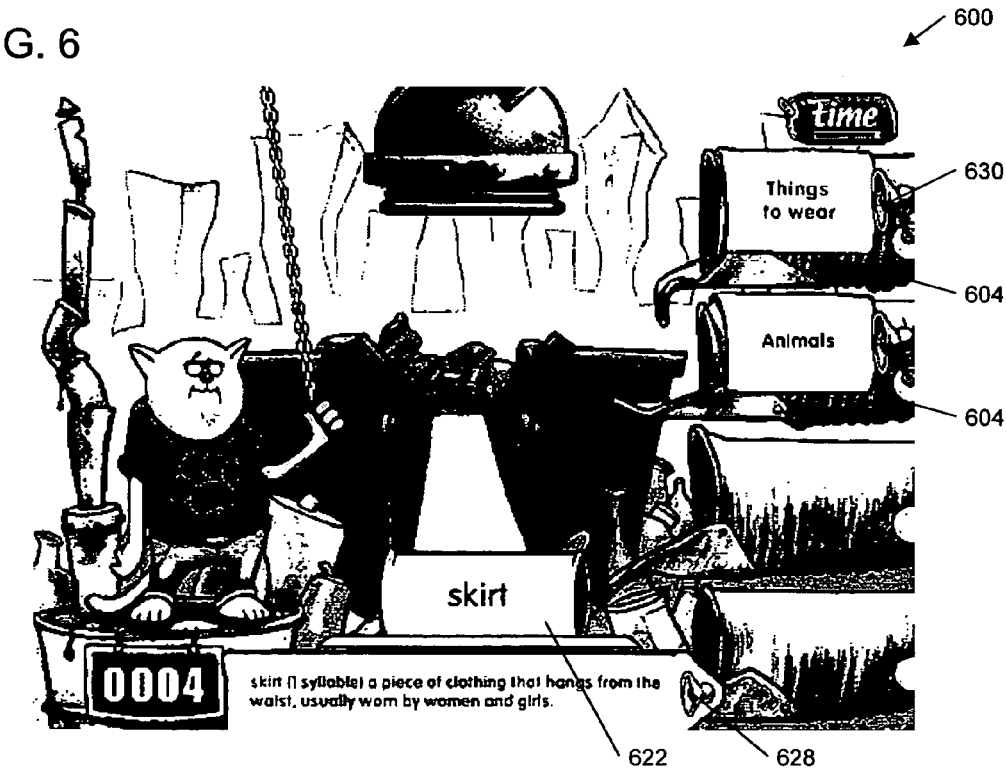
FIG. 6 is a screen shot showing a word definition box within the game Scrap Cat.

Referring now to FIG. 6, a screen shot 600 is provided illustrating presentation of a second word, skirt 622. This word is automatically presented after completion of the first trial. The student must correctly select the category associated with the recycling containers 604. If the student doesn't understand a word, the student can look up the definition by clicking the ? button 518 at the bottom of the recycling chute 506 (see FIG. 5). Scrap Cat 608 then presents the word and the number of syllables along with a short definition, as shown in box 628. If the student doesn't understand a category in one of the recycling containers 404, the student can click a speaker 630 next to each recycling container 604 to hear the category name read aloud.

Figure 7:
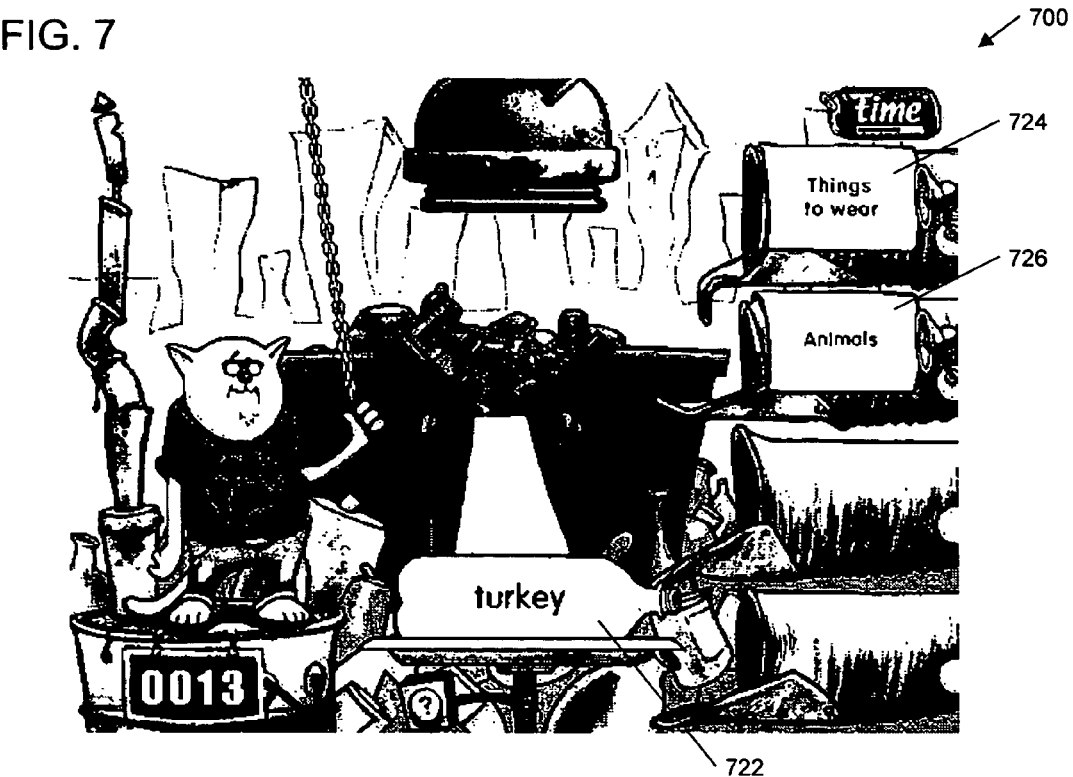
FIG. 7 is a screen shot showing categorization of a word within the game Scrap Cat.

Referring now to FIG. 7, a screen shot 700 is shown presenting a word "turkey" 722 for categorization. The student must correctly categorize the word 722 into one of two categories "things to wear" 724 or "Animals" 726. Upon correct selection of the category "Animals" 726, the category is highlighted to indicate correct selection, and the sound of a bell (e.g., "ding") is played to indicate correct selection. If the student makes an incorrect selection, a "thunk" is played, and the correct category is highlighted.

Figure 8:
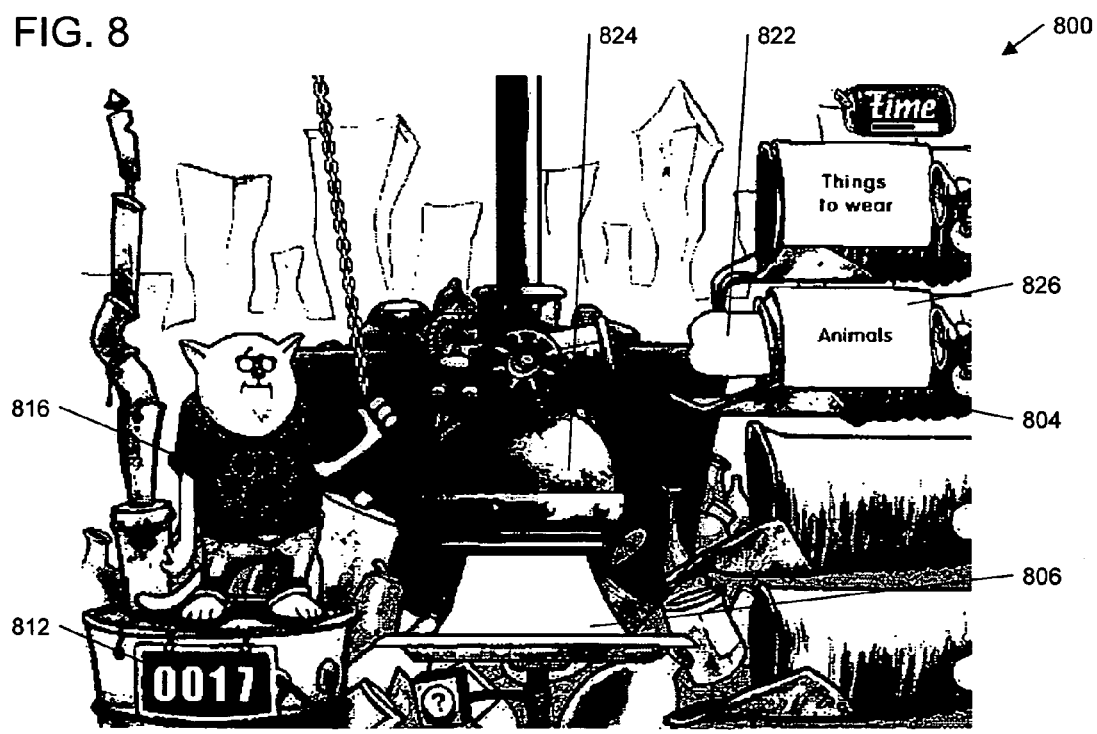
FIG. 8 is a screen shot showing an animation pertaining to a correct categorization within the game Scrap Cat.

Referring now to FIG. 8, a screen shot 800 is shown illustrating an animation occurring after correct categorization of a word. A crusher 840 drops down and crushes the word, and then shoots the crushed word 822 into the recycling bin 804 associated with the correct category 826. Alternatively, if the student selects an incorrect category for the word 822, after the "thunk" is played, the word simply drops off the recycling chute 806.

After several trials, the score counter 812 advances to indicate correct categorizations, and the student is required to select the paw 816 for more trials. The number of trials for each category level was provided above in Table 1.

Figure 9:
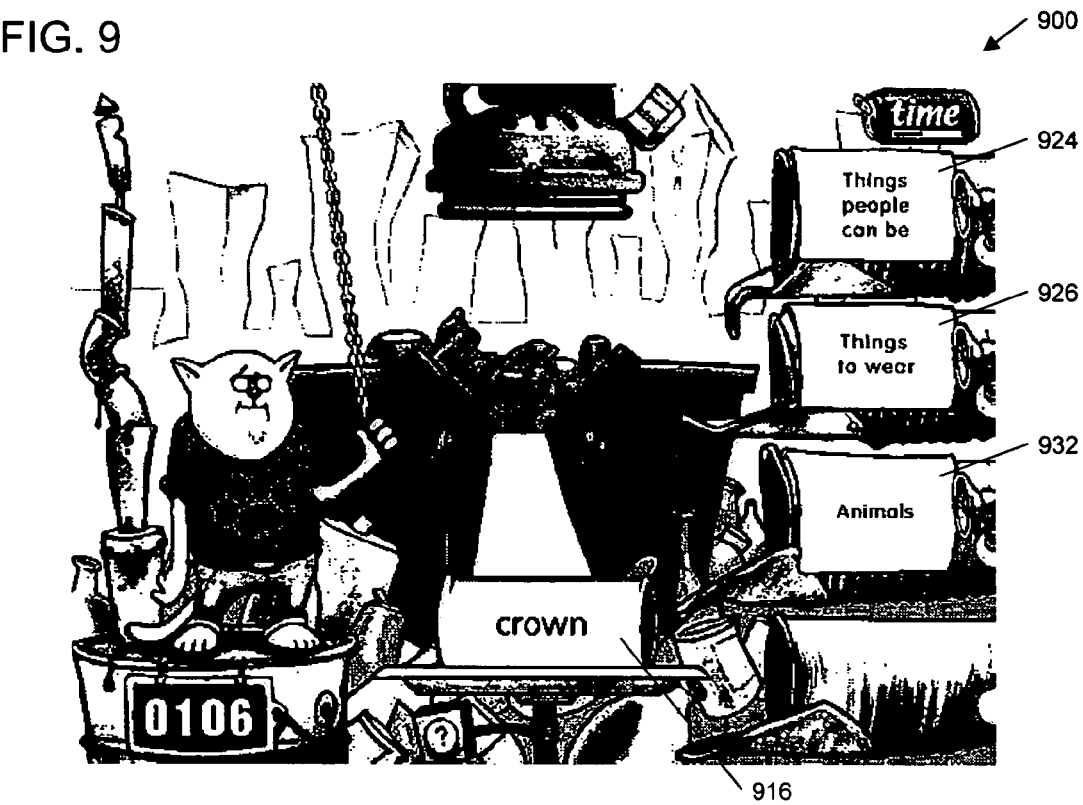
FIG. 9 is a screen shot showing categorization of a word within three categories within the game Scrap Cat.

Referring now to FIG. 9, a screen shot 900 is shown illustrating a word 916 that must be categorized into one of three categories 924, 926, or 932. In this screen shot, the student incorrectly selected the category "Animals" 932 to correspond to the word "crown" 916 (indicated by the highlighted box 932). A "thunk" is played, and the correct category "things to wear" 926 is subsequently highlighted.

Figure 10:
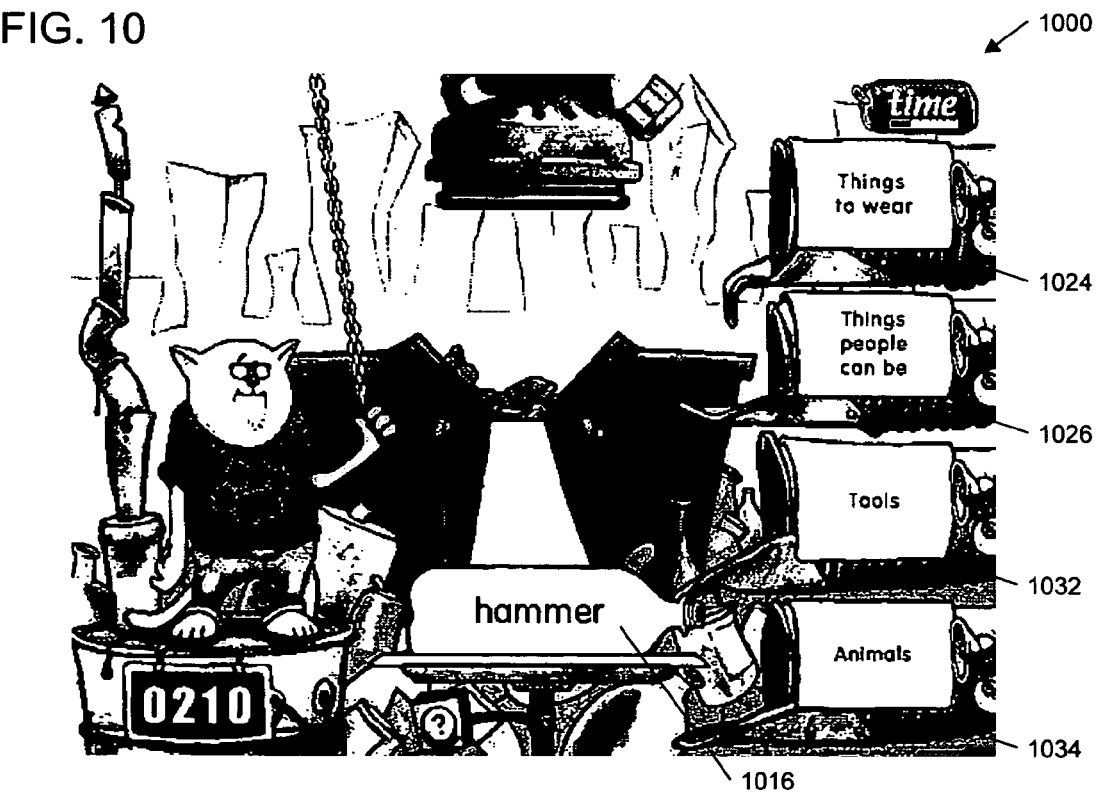
FIG. 10 is a screen shot showing categorization of a word within four categories within the game Scrap Cat.

Referring now to FIG. 10, a screen shot 1000 is shown illustrating a word "hammer" 1016 that must be categorized into one of four categories 1024, 1026, 1032, or 1034. The student has progressed to playing in four categories by correct categorization as described above with reference to Table 1.

Figure 11:
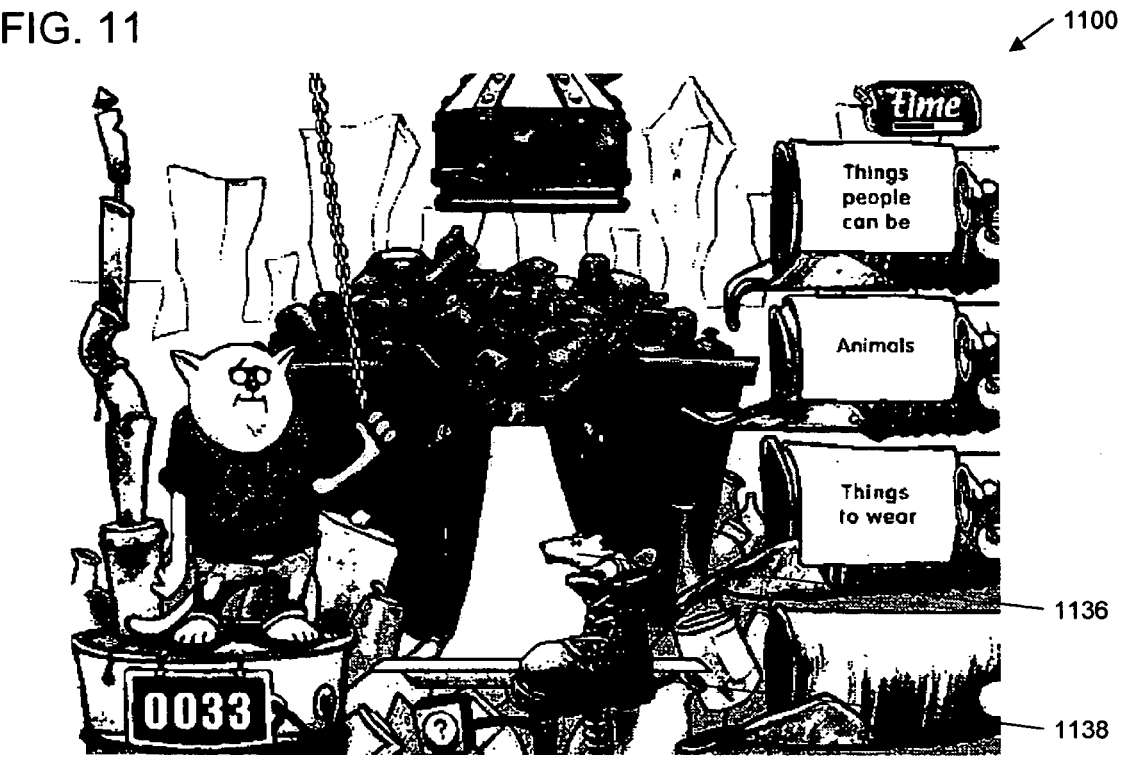
FIG. 11 is a screen shot of a reward animation within the game Scrap Cat.

Referring now to FIG. 11, a screen shot 1100 is shown illustrating a reward animation, in this case a mouse 1136 hopping across the screen in a jumping boot 1138. Reward animations similar to this are presented at regular intervals to entertain the student and keep them interested in continued training.

Figure 12:
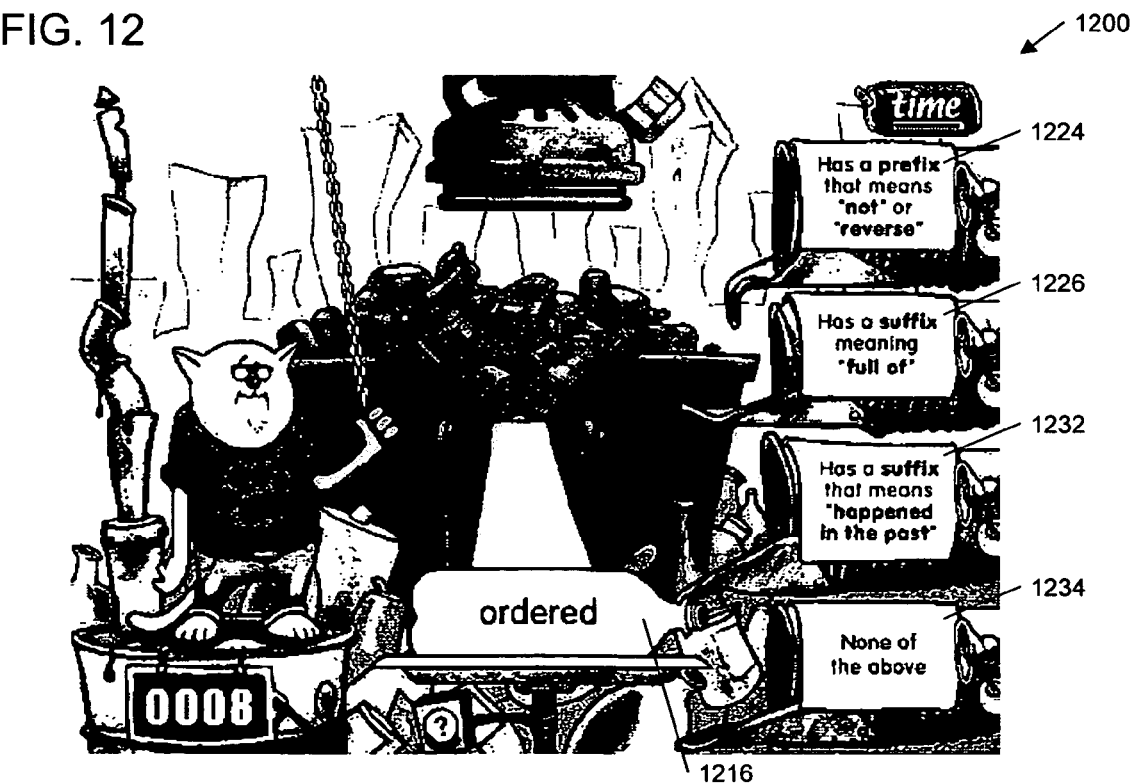
FIG. 12 is a screen shot of four morphological categories into which a word is to be categorized, within the game Scrap Cat.

Referring now to FIG. 12, a screen shot 1200 is shown illustrating a trial within one of the morphological categories. In this trial, the student is presented with a word "ordered" 1216 and is required to place the word into one of the four categories 1224, 1226, 1232, or 1234. In this instance, the student correctly selects the category 1232 "Has a suffix that means "happened in the past"" as indicated by the highlight.

Figure 13:
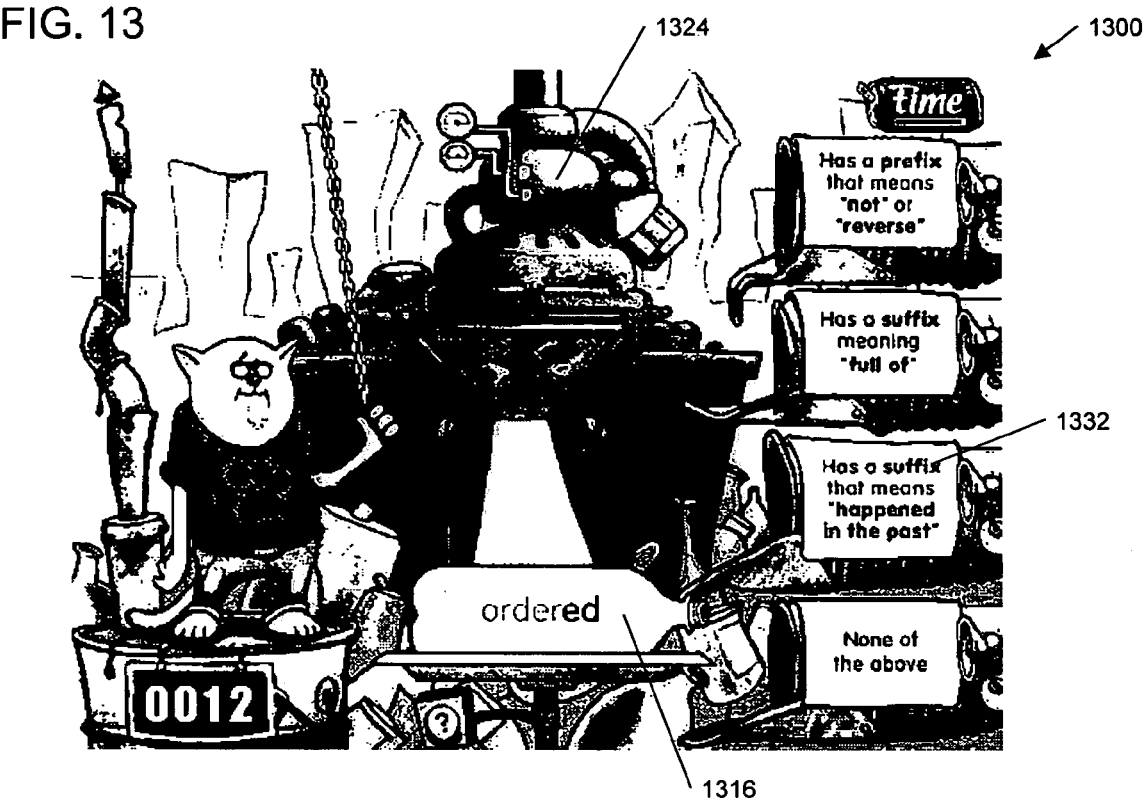
FIG. 13 is a screen shot indicating correct categorization of the word shown in FIG. 12 within the game Scrap Cat.

Referring now to FIG. 13, a screen shot 1300 is shown illustrating that after correct selection of the category 1332 for the word "ordered" 1316, before the word is crushed by the crusher 1324, the word particularly highlights the suffix "ed" for the correct categorization. One skilled in the art will appreciate that other suffixes/prefixes as applicable are highlighted before being disposed of in the proper recycle bin.

Figure 14:
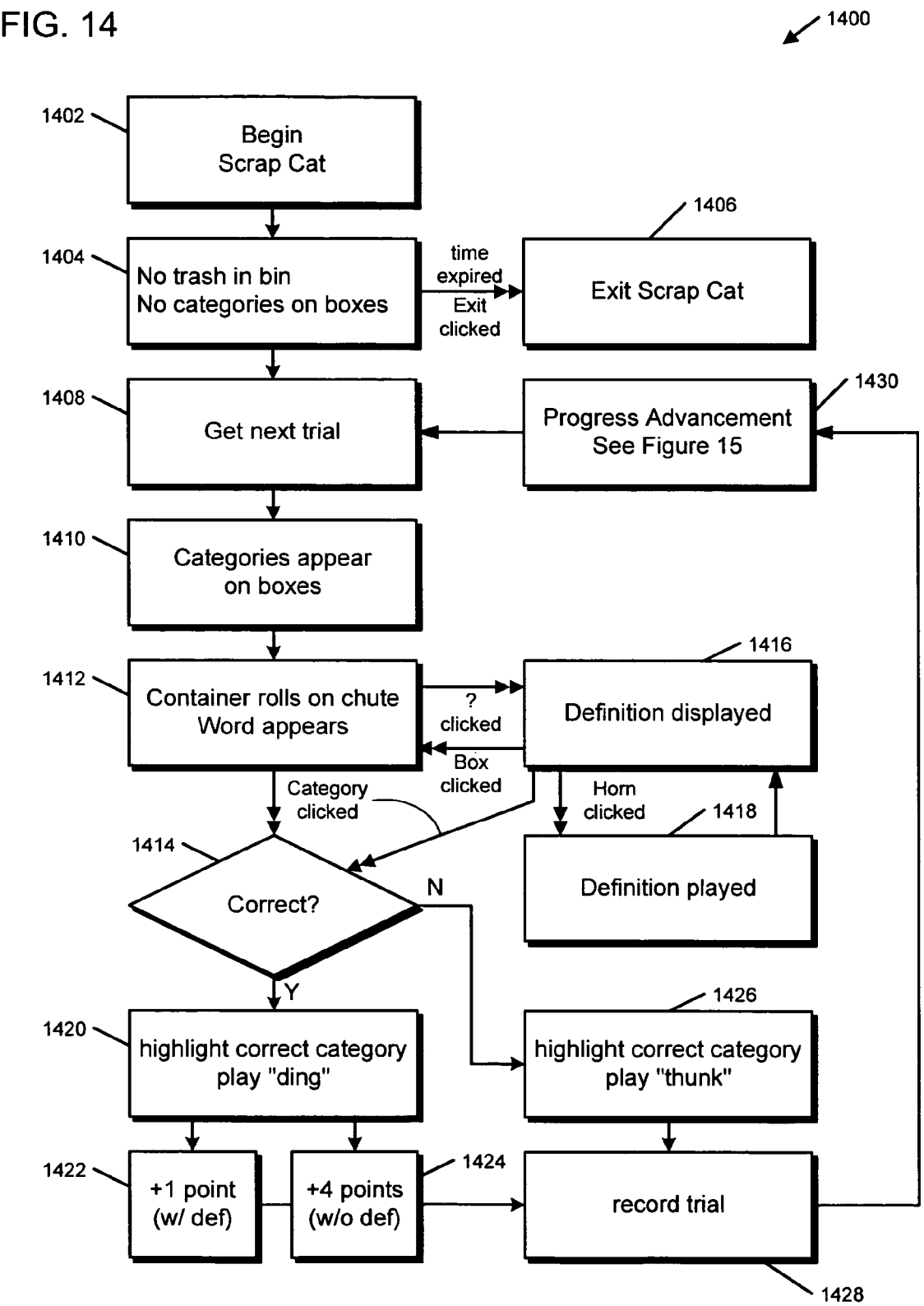
FIG. 14 is a flow chart illustrating game flow within the game Scrap Cat.

Referring now to FIG. 14, a flow chart 1400 is provided particularly illustrating the progress flow for the game Scrap Cat. When reference is required to the screen image for the game, reference will be made back to elements in FIG. 4. The game starts at block 1402 and proceeds to block 1404.

At block 1404 there is no trash in the bin 402 and no categories in the recycle bins 404. Flow proceeds to block 1408. If the student selects "Exit", or if a predefined time period for game play expires, flow proceeds to block 1406 where the game Scrap Cat ends, taking the student back to the main program screen as described above.

At block 1408, the next trial begins. The trial begins with the program selecting a category type (e.g., Semantic, Syntactic, Phonological, Morphological), two or more categories (e.g., Animals, Things to Wear), and a word from one of the selected categories (e.g., fawn) to be presented to the student. Flow then proceeds to block 1410.

At block 1410, the selected (two, three, or four) categories appear on the recycle bins 404 (in random placement). Flow then proceeds to block 1412.

At block 1412, a container rolls out of the garbage bin 402, down the chute 406, and the selected word appears on the container. At this point, the system waits for the student to indicate which of the categories the selected word should be placed in. If the student selects one of the provided categories (on the bins 404), flow proceeds to decision block 1414. If the student requires assistance with the selected word, s/he may click on the "?" box below the chute 406. If s/he does, then flow proceeds to block 1416.

At block 1416, a definition of the selected word appears below the chute 406, as illustrated in FIG. 6. At this point, the student may understand the word enough to attempt a categorization, and if s/he selects one of the provided categories, flow proceeds to decision block 1414. Alternatively, the student may wish to hear the selected word. If so, the student can click on the horn 628, in which case flow proceeds to block 1418.

At block 1418, the selected word is aurally presented by the computing system so that the student can hear the word that is to be categorized. Flow then returns back to block 1416.

Flow reaches decision block 1414 when one of the categories is clicked. A determination is made as to whether the correct category for the word has been selected. If so, flow proceeds to block 1420. If an incorrect categorization is made, flow proceeds to block 1426.

At block 1420, a "ding" is played, indicating to the student that a correct categorization has been made. In addition, the selected category is highlighted to further emphasize the correct selection. Flow then proceeds to blocks 1422/1424.

At blocks 1422/1424, points are added to the student's score. More specifically, if the student did not press the "?" box 518 to see a definition of the word, the student's score is incremented by four points. Alternatively, if the student did press the "?" box 518 to see a definition of the word, the student's score is incremented by one point. In either case, flow proceeds to block 1428.

At block 1428, the result of the instant trial is recorded. That is, the program records the categories being tested, the number of categories being tested, the word tested, whether the student required the word to be defined/played, and whether the student correctly or incorrectly categorized the word. Flow then proceeds to block 1430.

Flow to block 1426 indicates that the student incorrectly categorized the word. At this point, a "thunk" is played indicating to the student that s/he incorrectly categorized the word. In addition, the correct category is highlighted to emphasize to the student the correct categorization. Flow then proceeds to block 1428 where the result of the trial is recorded.

At block 1430, another trial is selected according to the advancement strategy further described with respect to FIG. 15 below.

Figure 15:
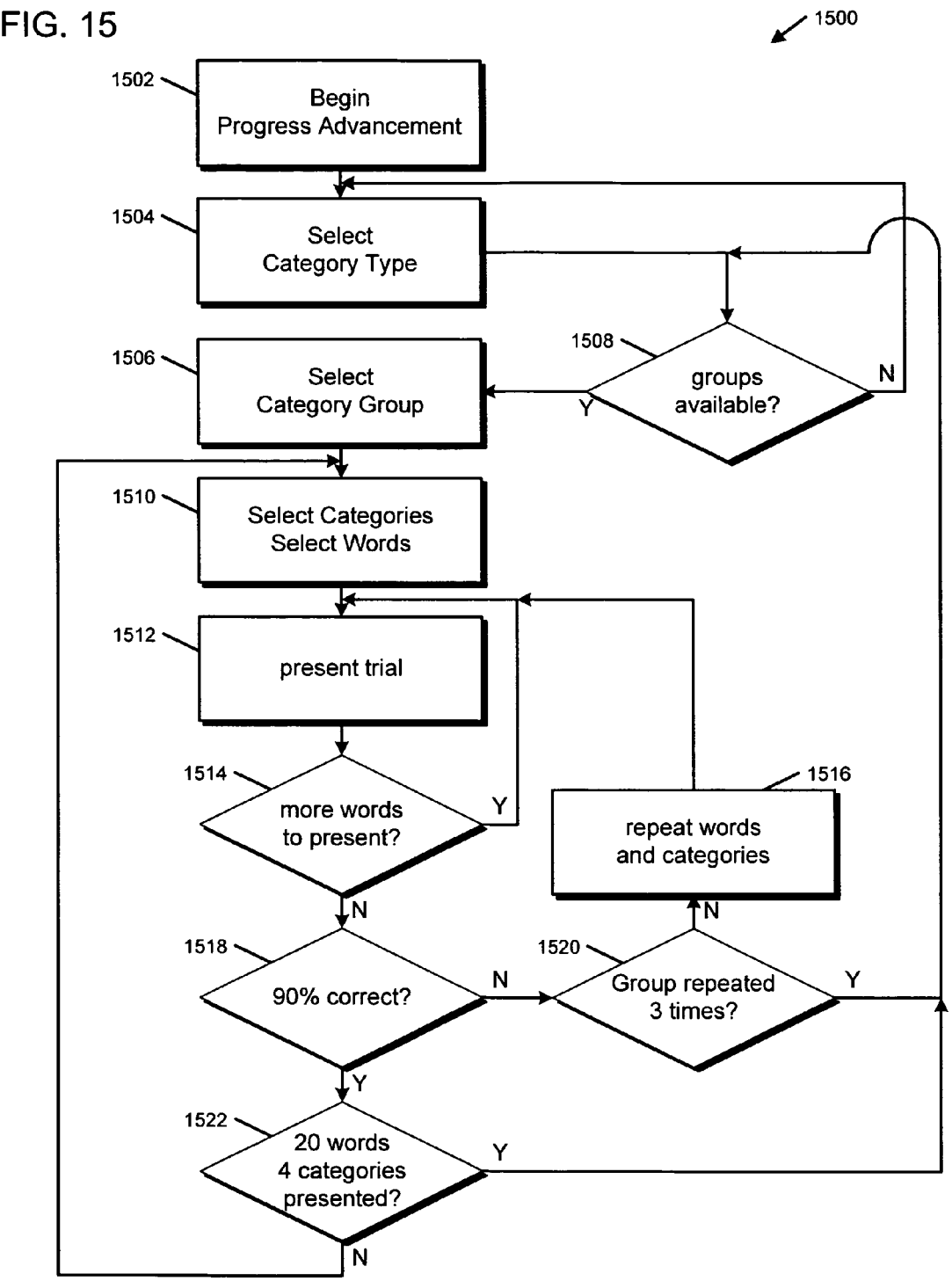
FIG. 15 is a flow chart illustrating progress advancement within the game Scrap Cat.

Referring now to FIG. 15, a flow chart 1500 is provided to particularly illustrate how trials are selected, and how a student advances play for the game Scrap Cat. Flow begins at block 1502 and proceeds to block 1504. As mentioned above, the student will ultimately progress through the four category types: Semantic; Syntactic; Phonological; and Morphological. More specifically, a student will advance through progressively larger numbers of words in progressively more categories (as shown in Table 1 above).

At block 1504, a category type is selected. If no testing has taken place, the first category type selected is Semantic. Flow then proceeds to decision block 1508.

At decision block 1508 a determination is made as to whether there are any groups are available within the selected category type. If not, flow proceeds back to block 1504 where another category type is selected (e.g., syntactic). If groups are available within the selected category type, flow proceeds to block 1506.

At block 1506, a category group is selected. Flow proceeds to block 1510.

At block 1510, a category is selected, then words for the selected category is selected. Flow proceeds to block 1512.

At block 1512, the trial is presented. Flow then proceeds to decision block 1514.

At decision block 1514, a determination is made as to whether there are any more words to present for the selected category. If there are, flow proceeds back to block 1512 where the additional words are presented. Otherwise, flow proceeds to decision block 1518.

At decision block 1518, a determination is made as to whether the student has correctly categorized at least 90% of the trials within the selected groups. If ten or less words have been tested, the student is allowed to miss just one of the trials. If less than six words have been tested (for two categories), or if the student has correctly responded to 90% of the trials within a selected category group, flow proceeds to decision block 1522. Otherwise, flow proceeds to decision block 1520.

At decision block 1522, a determination is made as to whether the student has been tested in 20 words in all four categories of a category type. If so, flow proceeds back to decision block 1508. If not, flow proceeds back to block 1510 where categories/words are selected.

At decision block 1520, a determination is made as to whether the present group has been repeated 3 times. If so, the flow proceeds back to decision block 1508. Otherwise, flow proceeds to block 1516.

The student reaches decision block 1520 when they have not achieved 90 percent correct response within a given selection of category groups within a selected category type. A test is made to determine whether the student has three times repeated the present group selection, within the selected category type. If not, flow proceeds to block 1516 where testing in the present group continues. However, if the student has repeated the present group three times, the student is considered to have "plateaued". That is, the student has been unable to achieve 90% correct response to trials within a selected group within a selected category type. In this instance, the category group selection within the present category type is changed. Flow then proceeds to block 1508 for continued testing within alternative category groups within the present category type.

At block 1516, the words and categories are repeated for the present group. Flow proceeds to block 1512. The above discussion has described the methodology for the game Scrap Cat according to the present invention.

Figure 16:
FIG. 16 is a screen shot of an opening scene within the game Canine Crew.

Attention is now directed to FIG. 16 where discussion begins for the game Canine Crew. Canine Crew trains students in decoding, vocabulary, and automatic word recognition. Canine Crew further improves students semantic and phonological skills through training students in rhymes, synonyms, antonyms, and homophones. More specifically, Canine Crew presents word pairs many times, which allows the student to not only cement knowledge of those words' meanings and sounds, but also helps the student develop automatic word recognition and understanding of conceptual relationships.

An animated scene 1600 is presented of a street whose traffic has been stopped by a hairy street worker 1602 that is repairing a pothole 1604. Students who play the game help the street worker 1602 to fill the pothole 1604 by matching similar words and filling the pothole with word bricks. Also shown in the scene 1600 is a score counter 1606 for accumulating a student's score and a timer 1608 indicating a relative amount of time remaining for game play Referring now to FIG. 17, a scene 1700 is shown for the game Canine Crew. When the student clicks on the yellow paw 1710, a steam shovel (not shown) drops a brickload of words 1712 above the pothole 1704. The student must pair the words according to the category that is being trained. In one embodiment, the first category being trained is rhyme. Initially, the student is provided with a brickload 1712 of seven words including three matching pairs, and one foil (the foil is provided to increase the difficulty of the task). When training in this category, the student clicks a first word, and then clicks a second word that rhymes with the first word. This is particularly illustrated in FIG. 17. That is, the student has first clicked the word "deal" 1714. The only word shown that rhymes with "deal" is the word "peel" 1716. When the student places a selection cursor (not shown) over the word "peel" 1716, the word is highlighted. When the student selects the word "peel" 1716, a "ding" is played by the computing device indicating to the student that s/he has correctly selected a rhyme for the word "deal". At this point, both words "deal" 1714 and "peel" 1716 fall into the pothole 1704, and are thus removed from the set of brickwords 1712. The student continues pairing the remaining words until the last pair has been matched, and the pothole 1704 is filled.

If the student selects a first word, and then incorrectly pairs it with a second word, the student is aurally presented with a "thunk" indicating an incorrect selection, and the first word is "un-highlighted", thereby allowing the student to re-select a first word for pairing. As the student progresses in his/her training, the number of words provided in the brickword load 1712 increases, as does the complexity of the vocabulary. In addition, as the student correctly progresses in pairing words, s/he is moved through four semantic and phonological categories, one by one as follows: 1) Rhymes; 2) Synonyms; 3) Antonyms; and 4) Homophones.

Figure 18:
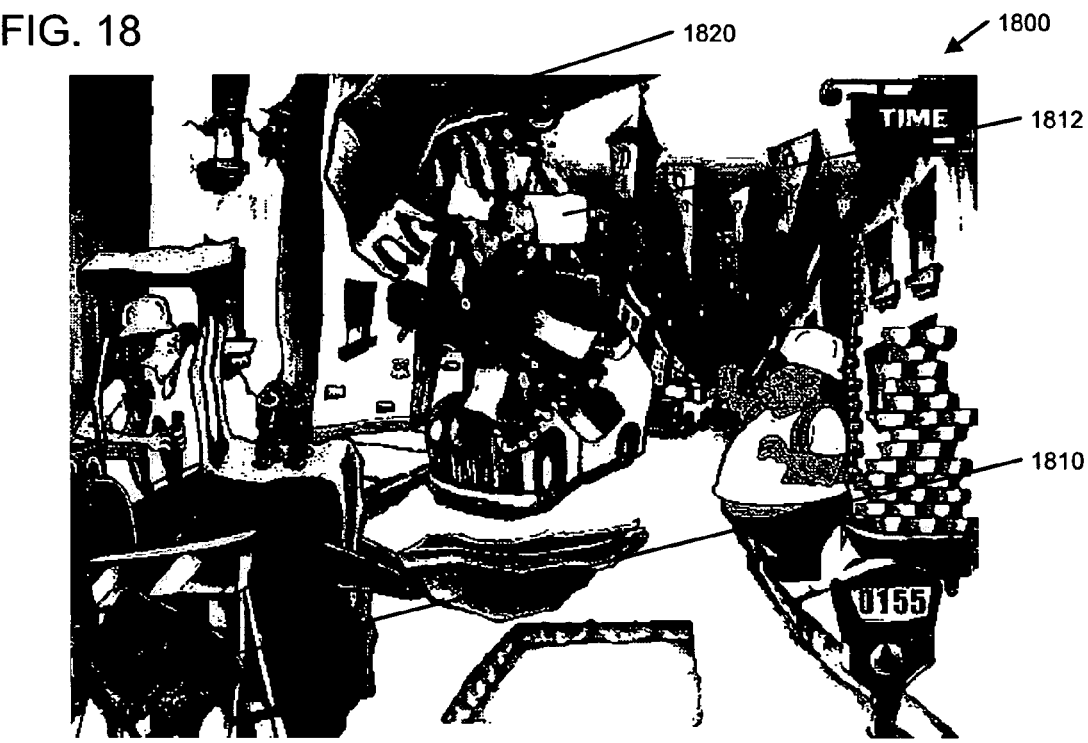
FIG. 18 is a screen shot illustrating a brickload of words being dropped, to begin a new trial within the game Canine Crew.

Referring now to FIG. 18, a screen shot 1800 is shown illustrating a steam shovel 1820 dropping another brickload of words 1812 for the next trial. In one embodiment, the brickload 1812 is dropped after the student completes a previous trial, and selects the yellow paw 1810.

Figure 19:
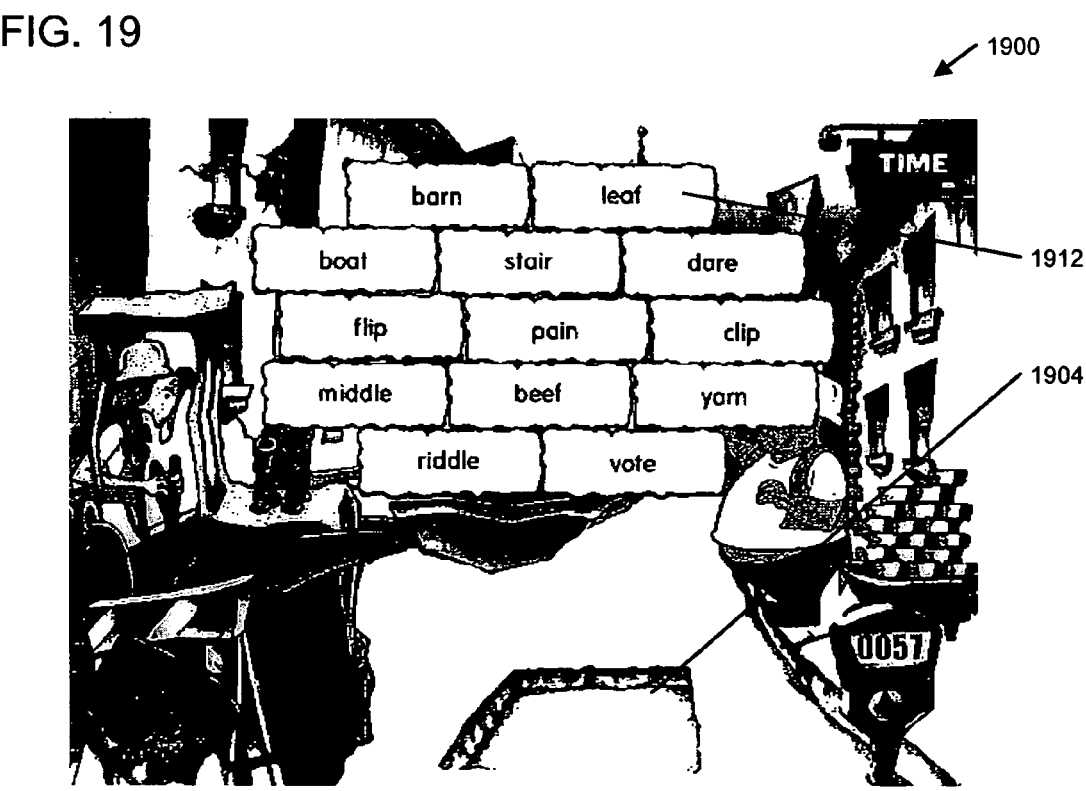
FIG. 19 is a screen shot illustrating six matched pairs of rhyming words within the game Canine Crew.

Referring now to FIG. 19, a screen shot 1900 is provided of another rhyming trial. In this instance, one skilled in the art will appreciate that the number of bricks 1912 that are presented in the trial has increased over the trial illustrated in FIG. 1700 (as has the size of the pothole 1904!) As in FIG. 1700, the student must pair the rhyming words to fill the pothole 1904.

Figure 20:
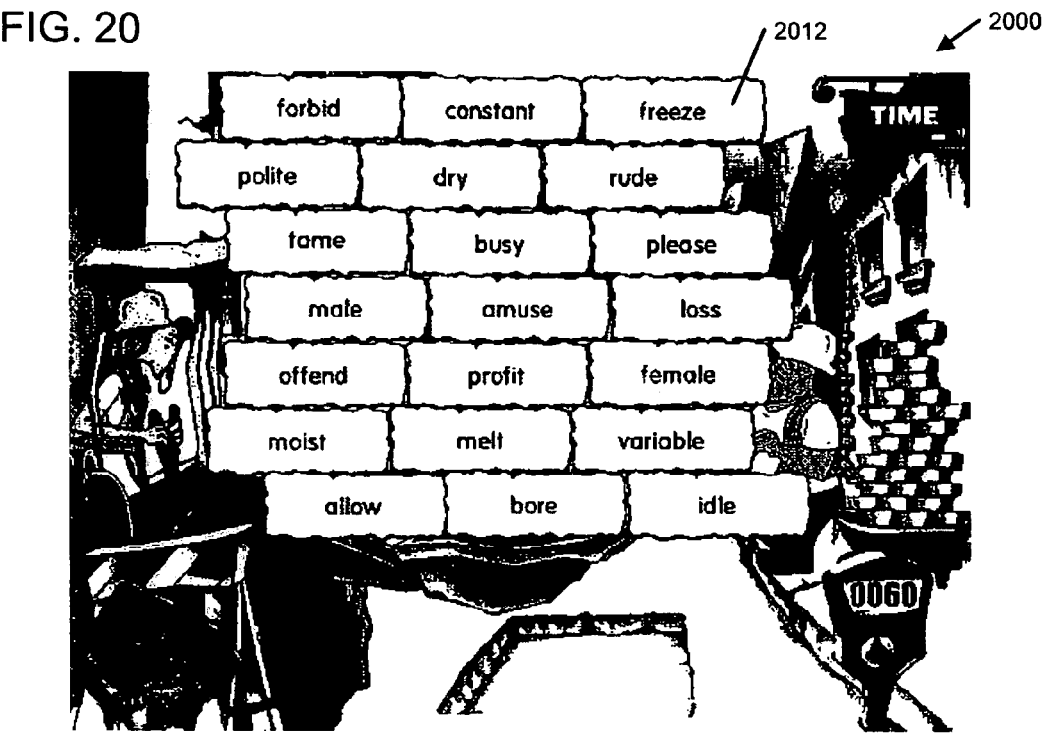
FIG. 20 is a screen shot illustrating 10 matched pairs of antonyms within the game Canine Crew.

Referring now to FIG. 20, a screen shot 2000 is shown illustrating a large number of brick words 2012 that must be paired. In this instance however, the words that must be paired are not rhymes of each other. Rather, they are antonyms (i.e., words that mean the opposite of each other).

Figure 21:
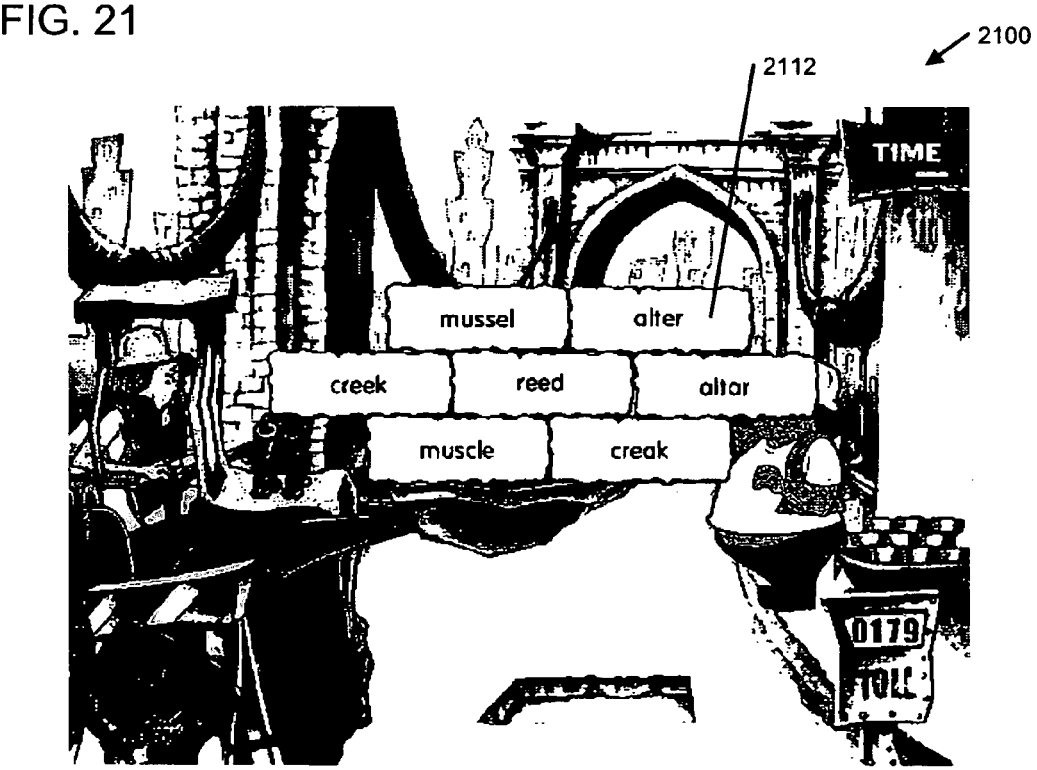
FIG. 21 is a screen shot illustrating three matched pairs of homophones within the game Canine Crew.

Referring now to FIG. 21, a screen shot 2100 is shown illustrating a number of brick words 2112 that must be paired. In this instance however, the words that must be paired are not antonyms of each other. Rather, they are homophones (i.e., words that sound alike though spelled differently).

Referring now to FIG. 22, a screen shot 2200 is shown illustrating a reward animation that is played for the student. A number of different reward animations are provided to the student at various times during training to entertain and hold the attention of the student.

Figure 23A:
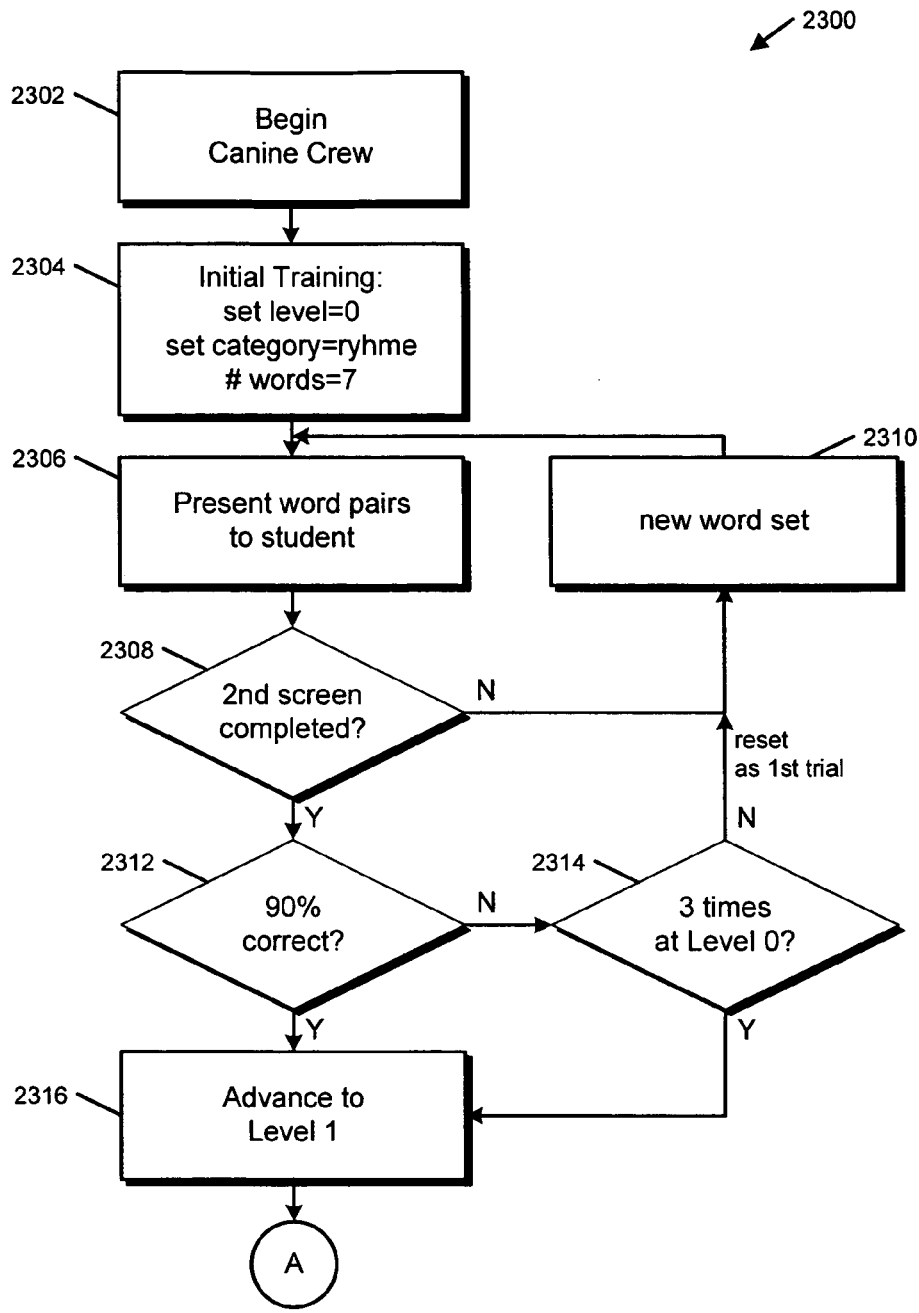
FIGS. 23a–c provide a flow chart illustrating advancement with the game Canine Crew.
Figure 23B:
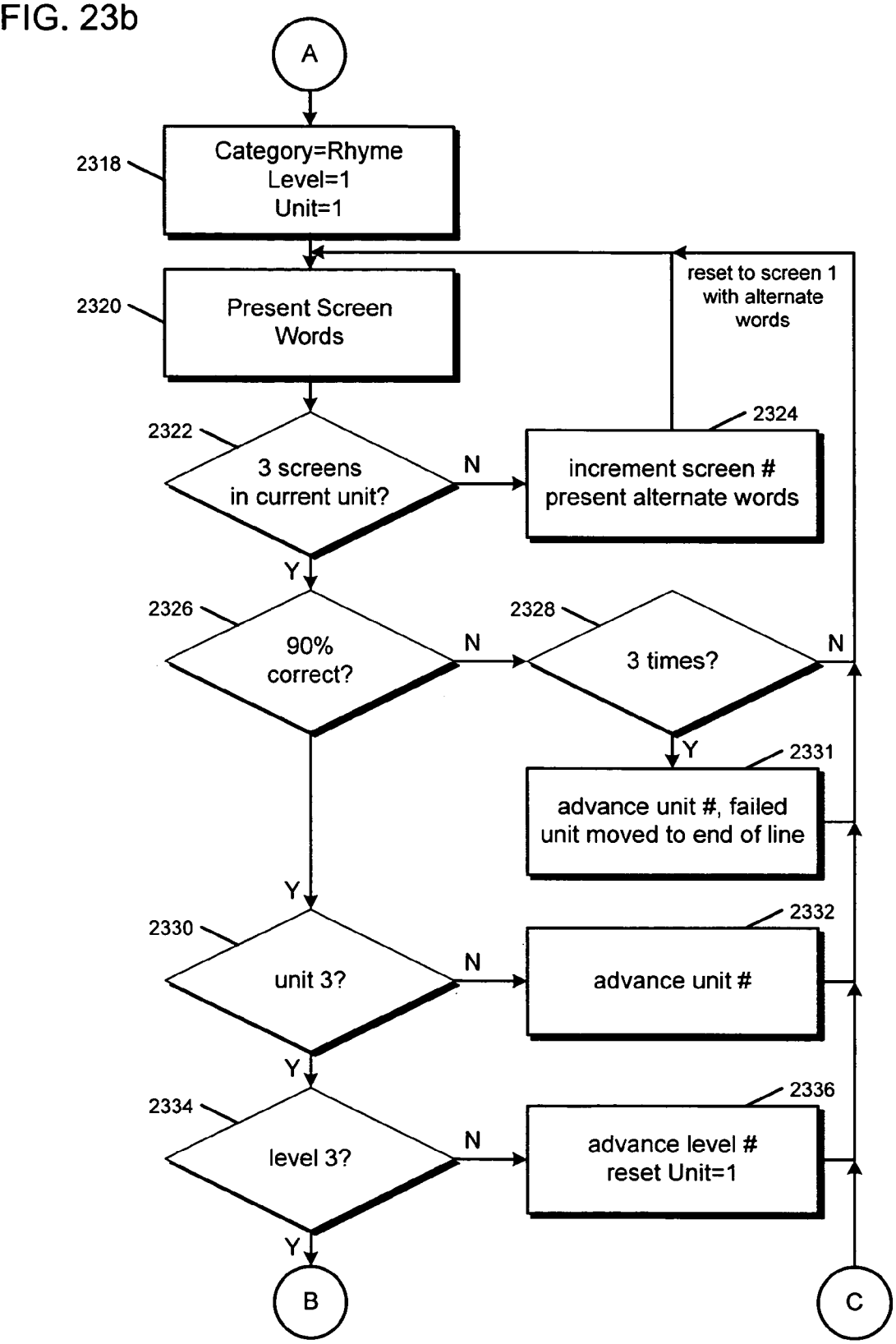
Figure 23C:
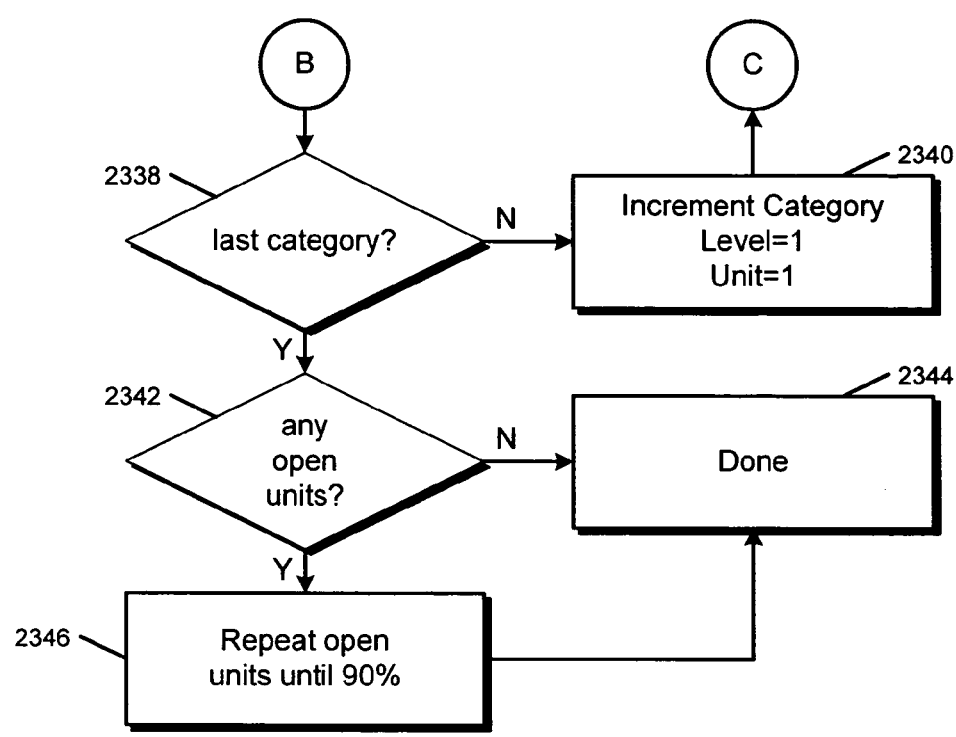

With the above discussion of the screen shots in mind for Canine Crew, attention is now directed at FIG. 23 where a flow chart 2300 is provided particularly illustrating how a student is trained in the game Canine Crew, as well as how the student advances through the four semantic and phonological categories. To better understand the terminology related to flow chart 2300, Table II is provided below to provide definitional assistance.

TABLE II

| Category: | A category refers to a type of match for a group of matching pairs including: rhymes, synonyms, antonyms, or homophones. |
| Level: | A level refers to the difficulty level of a group of matches. There are up to four levels per category. As the level increases so does the grade level of the vocabulary. |
| Set: | A set is a group of matching pairs in a certain category at a certain level. Generally the set consists of 30 matching pairs. |
| Unit: | A unit is the smallest group of trials to be evaluated for advancement. In Canine Crew there are four unit sizes: 6, 9, 18 and 30 matches. |
| Screen: | A screen refers to the group of matches presented on screen after the yellow paw is clicked. There are 3 screens of 3 matches each in a unit of 9 matches. |

A complete listing of word pairs, for each level is provided in Appendix B attached hereto. Table III below provides an overview of level advancement for each of the categories trained on by Canine Crew. In general, a student must complete all units in a category at all levels before moving on to a new category. The Rhyme category progresses from level 0 through 3. Each of the other categories (Synonyms, Antonyms, and Homophones) progress from level 1 through 3.

TABLE III

| Level | Grade level | # of Screens, Words per Screen | Matches per Screen | Unit (Matches Evaluated) | Words per Unit |
|---|---|---|---|---|---|
| 0 | 2 | (2) 6 on screen 1, 7 on screen 2 | 3 | 6 | 12 |
| 1 | 2 | (3) 7 | 3 | 9 | 18 |
|   |   | (3) 13 | 6 | 18 | 36 |
|   |   | (3) 21 | 10 | 30 | 60 |
| 2 | 3 | (3) 7 | 3 | 9 | 18 |
|   |   | (3) 13 | 6 | 18 | 36 |
|   |   | (3) 21 | 10 | 30 | 60 |
| 3 | 4 | (3) 7 | 3 | 9 | 18 |
|   |   | (3) 13 | 6 | 18 | 36 |
|   |   | (3) 21 | 10 | 30 | 60 |
| Total |   |   |   | 177 |   |

Flow begins at block 2302 and proceeds to block 2304.

At block 2304 an initial training sequence is begun. The student begins training in Rhymes at Level 0. S/he will train by pairing 6 matches from three different word families. These matches are presented in two screens of 3 matches each (each screen has seven words). Level 0 is considered "training". This level differs from the others in that it has only one unit, and that unit has only two screens. Also, if the training is failed 3 times then the user progresses to the next unit and the training unit is not placed at the end of the list for further play. So, after Level 0 is set, flow proceeds to block 2306.

Figure 17:
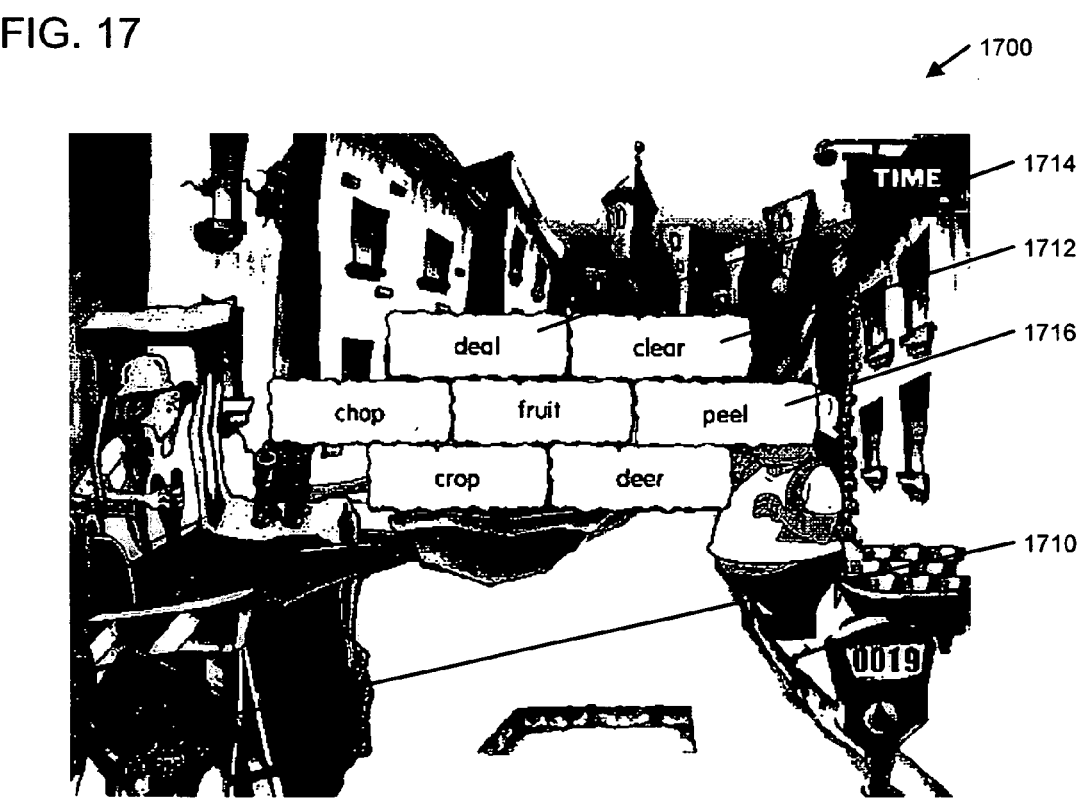
FIG. 17 is a screen shot of three matched pairs of rhyming words within the game Canine Crew.

At block 2306, three word pairs (with seven words) are presented by displaying them as a brickload to the student (as shown in FIG. 17). As mentioned above, the student selects a first word, which is highlighted, and then selects a second word that rhymes with the first word. If the student correctly matches a pair of words, a "ding" is played, and the words are removed from the screen and dropped into the pothole. If the student incorrectly matches a pair of words, the words are un-highlighted, and the student continues selecting. When three pairs of words have been matched, and the brickload has been moved to the pothole, flow proceeds to decision block 2308.

At decision block 2308 a determination is made as to whether the student has completed two screens of trials. If not, flow proceeds to block 2310. Otherwise, flow proceeds to decision block 2312.

At block 2310, a new word set is selected from Level 0, and flow proceeds to block 2306 where the new words are presented to the student.

At decision block 2312, a determination is made as to whether the student has obtained a 90% correct selection across the two trials. If not, flow proceeds to decision block 2314. Otherwise, flow proceeds to block 2316. For example, a unit is successfully completed if:

numberOfPairsInUnit/numberOfTrialsTakenToCompleteUnit >=90%

Here are the maximum number of trials the user can take to pass each unit

Unit 1 (9 pairs): 10 trials (9/10=90%)
Unit 2 (18 pairs): 20 trials (18/20=90%)
Unit 3 (30 pairs): 30 trials (30/33=91%)
Another way to look at it is:
Unit 1: User can pass with 1 incorrect trial
Unit 2: User can pass with 2 incorrect trials
Unit 3: User can pass with 3 incorrect trials At decision block 2314, a determination is made as to whether the student has trained at level 0 three times. If not, the student remains at level 0, and repeats the two screen trial again with flow proceeding back to block 2310. If the student has trained at level 0 three times, but has not accomplished a 90% success rate, flow still proceeds to block 2316.

At block 2316, the student advances to level 1 for the category Rhymes. Flow then proceeds to block 2318.

At block 2318, the Category is set to Rhyme, the Level is set to 1, and the Unit is set to 1 so that the first screen for Level 1 can be presented. Flow then proceeds to block 2320.

At block 2320 a screen is presented as a trial. The number of words presented is initially seven, at level 1 within the category Rhyme. However, the number of words presented, the level presented, and the category presented will vary as the student advances. For each screen that is presented, when the student has removed all of the words from the screen by matching pairs, flow proceeds to decision block 2322.

At decision block 2322, a determination is made as to whether the student has completed three screens at the current unit. For example, initially the unit is set to one, meaning that for each screen, seven words are presented. Alternatively, if the student is at level 2, thirteen words at presented for each screen. This is shown above in Table III. If the student has not completed three screens at the current unit number, flow proceeds to block 2324. Otherwise, flow proceeds to decision block 2326.

At block 2324, the screen number is incremented, alternate word pairs from the current level are selected, and flow proceeds to block 2320 where a new screen is presented for training.

At decision block 2326, a determination is made as to whether the student has obtained a 90% correct score for matching pairs of words on the three screens, at the present training level, for the present category. If not, flow proceeds to decision block 2328. Otherwise, flow proceeds to decision block 2330.

At decision block 2328, a determination is made as to whether the student has trained at the present level, in the present category, three times. If not, then the screen number for the present level is reset to one, and the words for the present level are reordered and presented again at block 2320. However, if the student has trained three times at the present unit number, at the present level, in the present category (and has not achieved a 90% success rate), flow proceeds to block 2331.

At block 2331, the unit # is advanced, and the failed unit is moved to the end of the land. That is, the present level is left "open" (meaning that ultimately the student will have to come back and complete the present unit number, at the present level before his/her training ends) and flow proceeds to block 2320. That is, a student is allowed three opportunities to achieve a 90% correct response before advancing to the next unit number, or if at unit 3, to the next level. If s/he is successful, then the unit/level is closed (i.e., not to be repeated again), and the student advances. If s/he is not successful, then the unit/level remains open, and the student advances.

At decision block 2330, a determination is made as to whether the student is currently in unit 3 (21 words) at the present level, in the present category. If not, flow proceeds to block 2332. Otherwise, flow proceeds to decision block 2334.

At block 2332, the unit number for the present level is incremented. For example, if the present unit number is 1 (7 words), then the unit number will be incremented to 2 (13 words). If the present unit number is 2 (13 words), the unit number will be incremented to 3 (21 words). Flow then proceeds back to block 2320 where the student will be presented with a screen at the new unit number, at the present level, in the present category.

At decision block 2334, a determination is made as to whether the student is currently at level 3 for the present category. If not, flow proceeds to block 2336. Otherwise, flow proceeds to decision block 2338.

At block 2336, the current training level is incremented, and the unit number is set to 1. For example, if the present training level is 2, and the present unit number is 3, the training level will be set to 3, and the unit number will be set to 1. Flow then proceeds to block 2320 where new words, at the new level are presented.

At decision block 2338, a determination is made as to whether all categories have been completed. If not, flow proceeds to block 2340. Otherwise, flow proceeds to decision block 2342.

At block 2340, the category number is incremented, and the level and unit numbers are reset to 1. For example, if the present category is 2 (Synonyms), then the category is incremented to 3 (Antonyms), and the level and unit numbers are reset to 1. Flow then proceeds back to block 2320 where training begins in the new category.

At decision block 2342, a determination is made as to whether any units remain open, at any level, for any category. If not, then the student has achieved a 90% success for all units, at all levels, for all categories. Training is therefore completed, with flow proceeding to block 2344. Otherwise, one or more units, at one or more levels, for one or more categories remain open. Flow thus proceeds to block 2346.

At block 2346, if the student arrives at this point, it is because s/he "plateaued" in a unit, being unable to achieve 90% correct after three tries at that level. As mentioned above with respect to decision block 2328, if the student is unable to obtain 90% correct after three trials in a unit, the student is advanced, but the unit remains open. In block 2346, all open units are repeated until the student obtains 90% correct. When s/he does, flow proceeds to block 2344 where training in Canine Crew ends.

The first two games in Fast ForWord Reading that have been described above have provided training, primarily utilizing Decoding exercises. In Scrap Cat, the student was trained to appreciate various properties of words including: Semantic, Syntax, Phonological, and Morphological. In Canine Crew, the student builds on their basic letter-sound correspondence skills and uses those to deal with more complex relationships between words: Rhymes, Synonyms, Antonyms, and Homophones.

The next game in the Fast ForWord Reading program is called Chicken Dog. This games builds on the other two games, but adds training in spelling and letter sound correspondence. Before Chicken Dog is discussed in detail, an overview of Spelling is considered applicable.

Chicken Dog trains a student in spelling by having the student associate the sound of a word with its spelling, and by having the student complete the written spelling of a spoken word. More specifically, Chicken Dog develops $1^{st}$ through $4^{th}$ grade spelling skills by training the student to recognize: 1) every syllable has a vowel letter; 2) many sounds are represented with letter combinations; 3) how we spell a sound depends on its position in a word; 4) only certain letters are doubled; and 5) meaningful word parts are often spelled consistently.

Chicken Dog Cross-Trains a student using a multiple-choice, closed task format to train:

Spelling—Words are presented that are missing a letter or letter combination. Chicken Dog varies the location of the missing letter(s) by beginning, middle, or end of the word. Chicken Dog also varies the linguistic properties of the missing letter(s) by consonant, short vowel, long vowel, or r-controlled vowel. Chicken Dog further varies the orthographic complexity of the missing letter(s) by a single letter, letter blend, digraph, diphthong, or special vowel spelling.

Sensitivity to letter-sound correspondence—The correct letter or letter combination is chosen from a group of letters and letter combinations that include not only the correct choice but also incorrect choices—foils—that are systematically selected to be either visually or phonetically similar to the correct choice.

Decoding Skills—To complete the spelling of a word, the student must successfully decode the part of the word that appears on the screen. Through practice in retrieving the appropriate letter-sound correspondences to complete the partially spelled word, the student further hones skills necessary for successful decoding.

Figure 24:
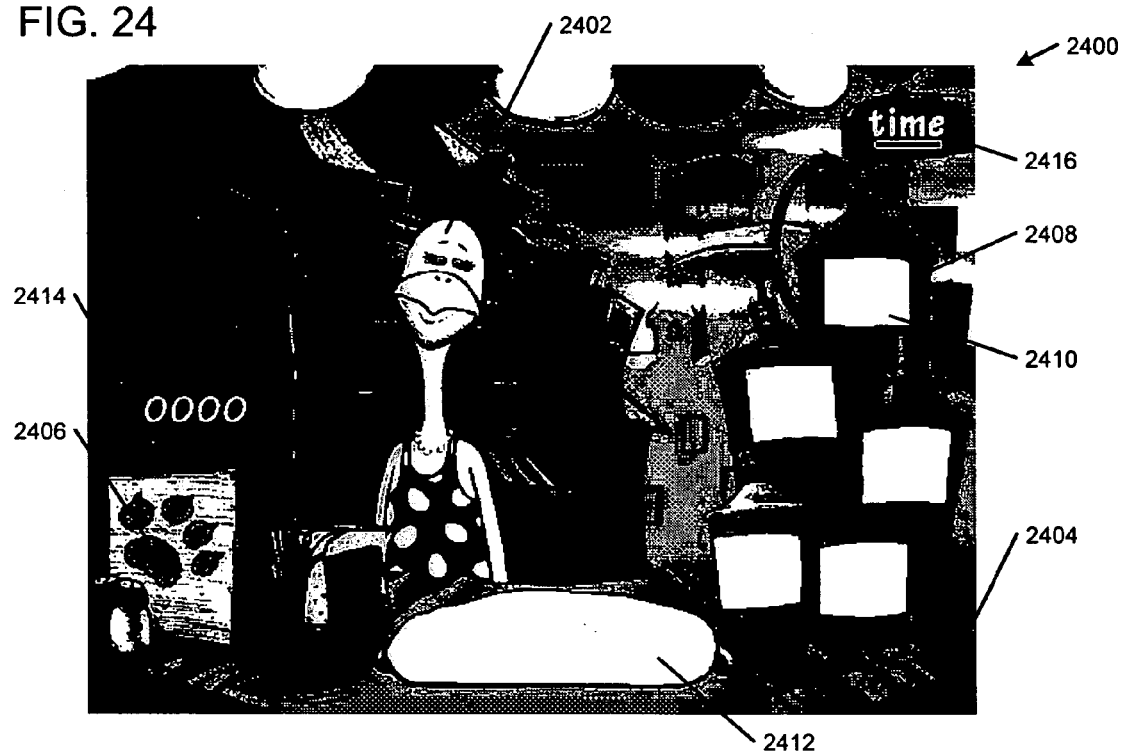
FIG. 24 is a screen shot of an opening scene in the game Chicken Dog.

Referring now to FIG. 24, a screen shot 2400 is shown for the game Chicken Dog. The animated scene 2400 depicts a chicken character 2402 working a hot dog stand 2404. On the left of the stand 2404 is a cash register having a yellow paw 2406. As in the other games above, a trial begins when a student clicks on the yellow paw 2406. On the right side of the screen are 5 condiment containers 2408, each having a display square 2410 onto which will be presented one or more letters. When a trial begins, Chicken Dog 2402 presents a hot dog 2412 on the stand 2404, onto which will be placed a word that is missing letters. The size of the hot dog 2412 will vary depending on the size of the word presented. As in the previous two games, a score counter 2414 is provided to indicate to the student a score, reflecting their performance, and a timer 2416 indicating a relative time remaining for game play.

Figure 25:
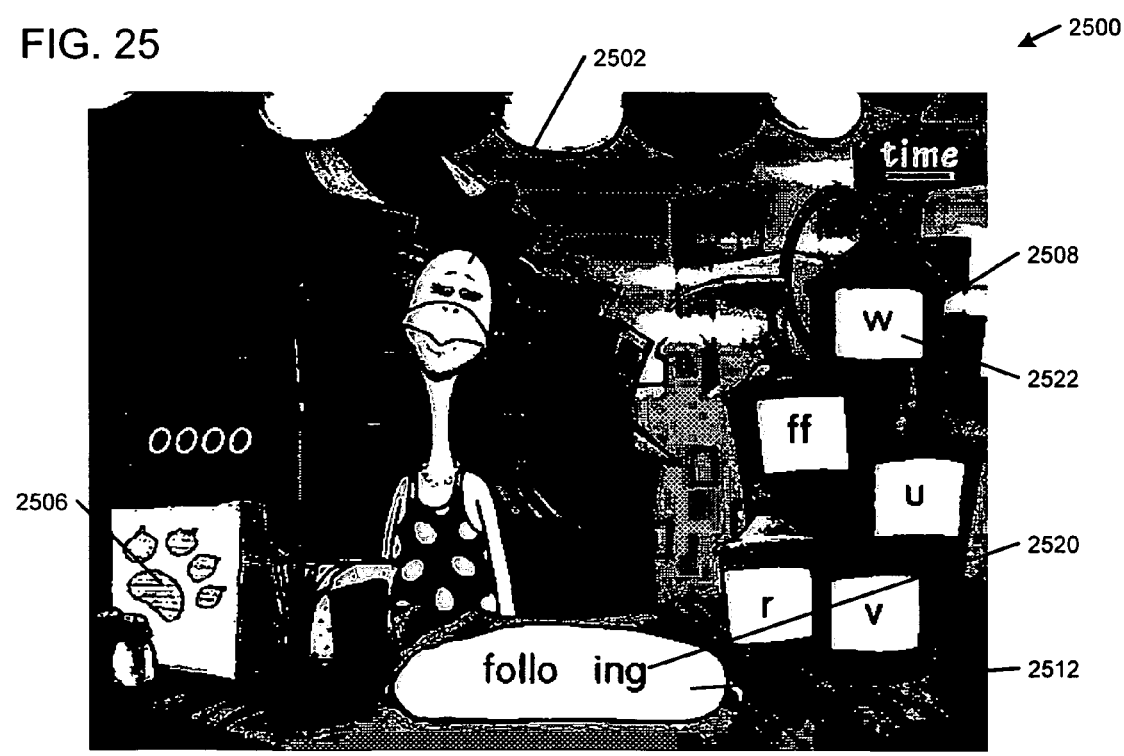
FIG. 25 is a screen shot of a trial within the game Chicken Dog requiring a student to complete the word "follo_ing" by selecting the consonant "w".

Referring now to FIG. 25, a screen shot 2500 is presented subsequent to the student selecting the yellow paw 2506. Like elements have like references, the hundreds digits being replaced with a 25. After the paw 2506 is selected, Chicken Dog 2502 presents a hot dog 2512 with a word 2520 on it. When the word 2520 is presented, it is also played aurally by the computing device on which the program is run so that the student being trained hears the entire word, in addition to seeing it. The word is missing a letter or letters which must be filled in by the student.

When the word 2520 is presented, five letters, or letter combinations, are inserted into the condiment containers 2508. In this scene, the word 2520 that is played is "following", and the word presented is "follo_ing". The student must select one of the five letters 2522 as a letter to complete the word 2520. For each trial, one correct answer and four incorrect (foil) answers are provided.

The first trial that is played by the student highlights the correct letter, in this case "w", to complete the word "follo_ing". When the student selects the correct letter 2522, a "ding" is played indicating a correct selection, all the letters disappear from the condiment containers 2508, and the letter appears in the word 2520 as will be further illustrated below. If the student selects one of the foil letters, a "thunk" is played indicating an incorrect selection, and the correct letter is placed into the word 2520 to illustrate to the student the correct selection. If at any time during a trial the student wishes to have the word played aurally, s/he can again select the yellow paw 2506, and the word will be played.

Figure 26:
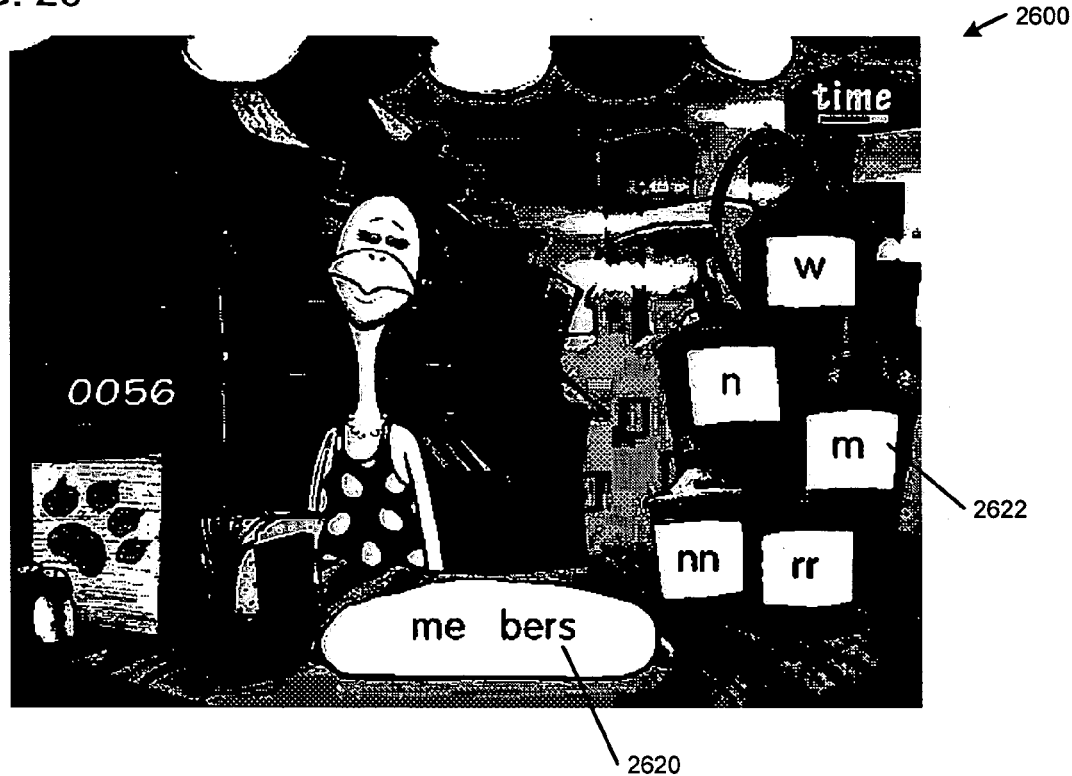
FIG. 26 is a screen shot of a trial within the game Chicken Dog requiring a student to complete the word "me_bers" with the letter "m".
Figure 27:
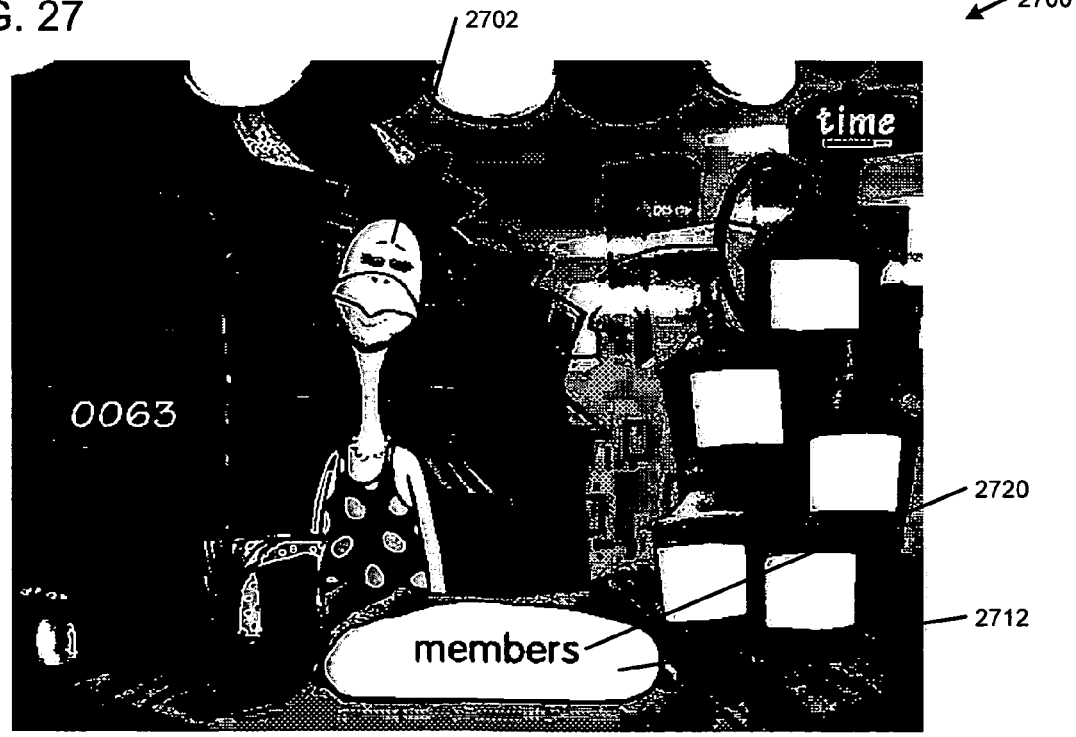
FIG. 27 is a screen shot illustrating correct completion of the word "members" within the game Chicken Dog.

Referring now to FIG. 26, a screen shot 2600 is shown illustrating a word 2620 "me_bers" that has been presented, visually and aurally to the student. The student indicates that the missing letter is "m" 2622 which is highlighted when the cursor is on top of the letter. After selecting "m" 2622 to complete the spelling of the word "members", the "m" drops down into the word 2620, as is shown in FIG. 27. Additionally, the program adds an entertaining animation (not shown) upon each correct selection wherein the condiment container associated with the correct letter is manipulated by Chicken Dog 2702 to squirt, pour, shake, etc., some ingredient onto the hot dog 2712. Furthermore, similar to the other games described above, after a number of trials, a reward animation (not shown) is played for the student to further enhance their enjoyment of the game.

Figure 28:
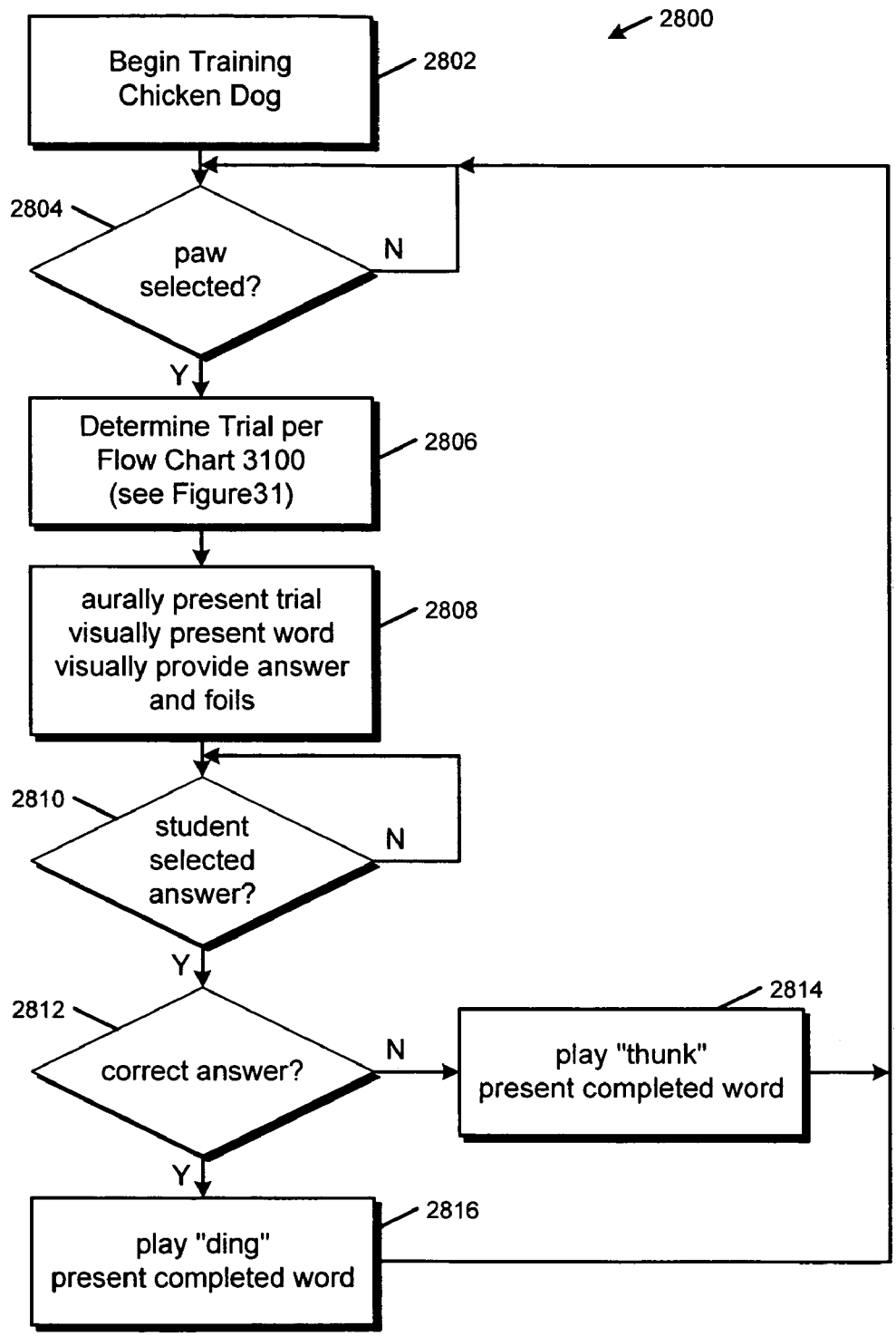
FIG. 28 is a flow chart illustrating game flow within the game Chicken Dog.

Referring now to FIG. 28, a flow chart 2800 is shown that provides an overview of the training steps for each trial in Chicken Dog. Flow begins at block 2802 and proceeds to decision block 2804.

At decision block 2804, a determination is made as to whether the yellow paw 2406 has been selected. If so, flow proceeds to block 2806. Otherwise, play remains at decision block 2804 until the student selects the paw 2406.

At block 2806, the correct trial to be presented is determined as is further illustrated below with respect to FIG. 31. Flow then proceeds to block 2808.

At block 2808, the particular trial selected in block 2806 is presented to the student. As described above, the word being tested is aurally presented to the student, a portion of the word is visually presented to the student, and the correct answer, along with a number of foils are presented to the student. Flow then proceeds to decision block 2810.

At decision block 2810, a determination is made as to whether the student has selected an answer. If not, flow remains at decision block 2810 until the student selects an answer. Otherwise, flow proceeds to decision block 2812. At decision block 2812, a determination is made as to whether the student correctly responded in the trial. If so, flow proceeds to block 2816. Otherwise, flow proceeds to block 2814.

At block 2814, the incorrect response is indicated by playing a "thunk", and then the correct completed word is presented. Flow then proceeds back to decision block 2804 awaiting instigation of another trial.

At block 2816, the correct response is indicated by playing a "ding", and then the correct completed word is presented. Flow then proceeds back to decision block 2804 awaiting instigation of another trial.

Progress Advancement

Terms:

Category: The category refers to the type of letter or letters missing. The categories include three consonant categories (beginning, ending and medial) and one vowel category. (see Appendix C for a complete description of the Categories and words used)

Level: The level refers to the level of difficulty. Each category has from 1 to 5 levels of difficulty.

Unit: A unit is always the smallest group of trials to be evaluated for advancement. IN Chicken Dog the unit is all the trials in a given category at a given level.

A trial is evaluated as correct if the student clicks on the correct missing letter (or letters). A unit is all trials from a given category at a given level. Trials are presented randomly from all categories at the current level for each category. A trial from each category is presented before any category can be repeated. Once all the trials from a given category type at a given level have been presented, that category is evaluated for 90% correct. Table IV below provides detail regarding level/category advancement for Chicken Dog.

TABLE IV

|  | Category 1<br>Beginning | Category 2<br>Ending | Category 3<br>Medial | Category 4<br>Vowel |
|---|---|---|---|---|
| Level 1 | Beginning Consonants:<br>b, c, d, f, g, h, j, k, l, m, n, p, r, s, t, v, w, y, z | Ending Consonants:<br>b, d, g, m, n, p, t, s: /s/ | Single Consonants:<br>b, c, d, f, g, h, j, k, l, m, n, p, r, s, t, v, w, z | Short Vowels<br>a, e, I, o, u |
| Level 2 | Beginning Blends:<br>bl, cl, fl, gl, pl, sl, br, cr, dr, fr, gr, pr, tr, sc, sk, sm, sn, sp, st, sw | Ending Consonants:<br>x, zz, ff, ll, ss s: /z/, s: /s/plural, s: /z/plural | Two Consonants:<br>bl, cr, mp, nc, nd, nt, rm, rs, rt, st | Long Vowels with Final "e":<br>a-e, e—e, i-e, o-e, u-e |
| Level 3 | Beginning Consonants:<br>qu, c: cent, g: gent<br>Beginning Blends:<br>scr, spr, spl, str, squ, shr, thr | Ending Blends:<br>mp, nd, ft, lt, nt, lf, st, nk, ng | Three Consonants:<br>btr, bst, ctr, rtm, ldr, ncl, ncr, nds, ngr, ntr, rnm, rtr, spl str, tst, xpl | Vowel Digraphs:<br>ai, ay, oa, ea, ee |
| Level 4 | Digraphs:<br>ch, sh, th, th(voiced), wh, ph<br>Silent Letters:<br>wr, kn | Silent Letters:<br>ck, lk | Digraphs and Silent Letters in Vowel or Consonant Contexts:<br>ch, ck, dg, gh, lk, sh, th, ph | Long Vowels:<br>y: sky<br>Vowel Digraphs:<br>au, aw, oo: boot, eu, ew<br>Diphthongs:<br>ou, ow, oi, oy |
| Level 5 |  |  | Double Consonants, One Phoneme:<br>cc, dd, ff, gg, ll, mm, nn, pp, ss, tt | Long Vowels:<br>y: happy<br>Vowel Digraphs:<br>oo: foot<br>r-control:<br>ar, er, ir, or, ur |

When a student begins trials in Chicken Dog, words are presented in random order without repeating from all four categories at level 1. A trial from each category is presented before any category can be repeated. Once all trials from a given category at a given level have been presented, that category is evaluated. If the student completes 90% of the words correctly then the trials/words from the next level of that category are used. Otherwise, the same trials/words are repeated. If all levels have been completed with 90% correct responses, then that category is dropped and the trials are chosen randomly from the remaining categories. If any unit (a level of a category) is repeated three times without achieving a 90% correct rate, that unit is temporarily dropped and the next level of the current category replaces it. If there are no more levels left in the current category, the unit is not dropped.

Number of Trials:

The number of trials (words) in each category type at each level corresponds to a multiple of the number of letters or letter groups listed in the category description. This is shown below in Table V.

Figure 29:
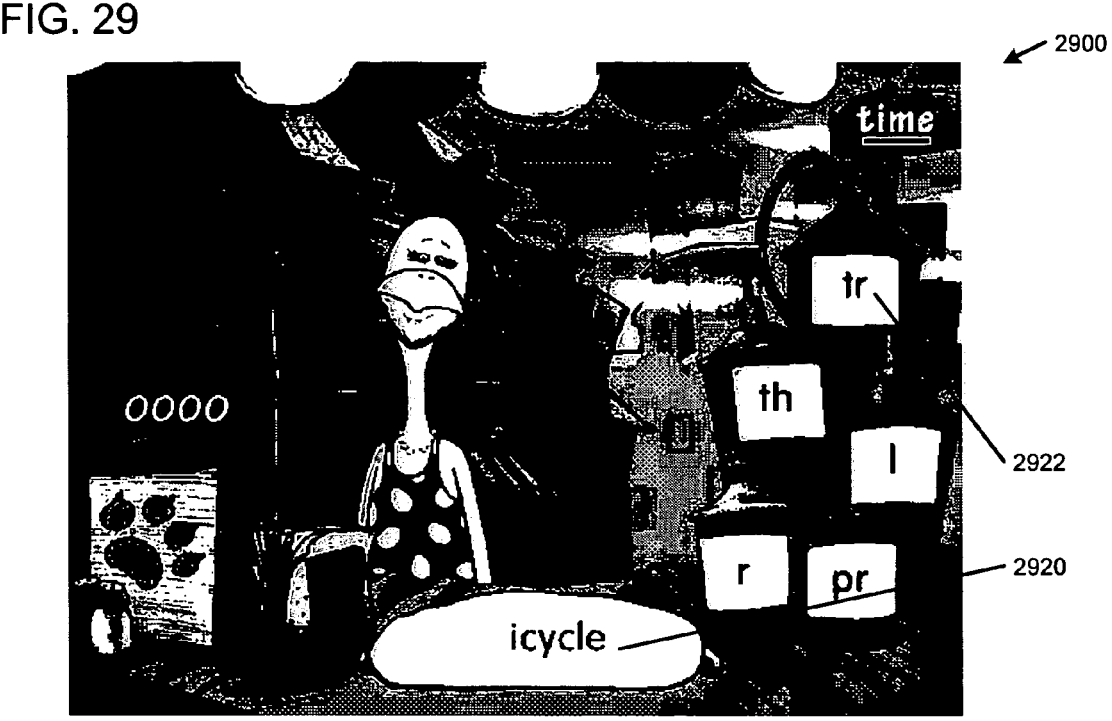
FIG. 29 is a screen shot of a trial within the game Chicken Dog requiring a student to complete the word "icycle" with the blend "tr".

Referring to FIG. 29, a screen shot 2900 is shown of play at level 2 for the beginning blend "tr". The word "icyle" 2920 is presented, and the word "tricyle" is played. The student must select the blend "tr" 2922 to correctly answer the trial.

Figure 30:
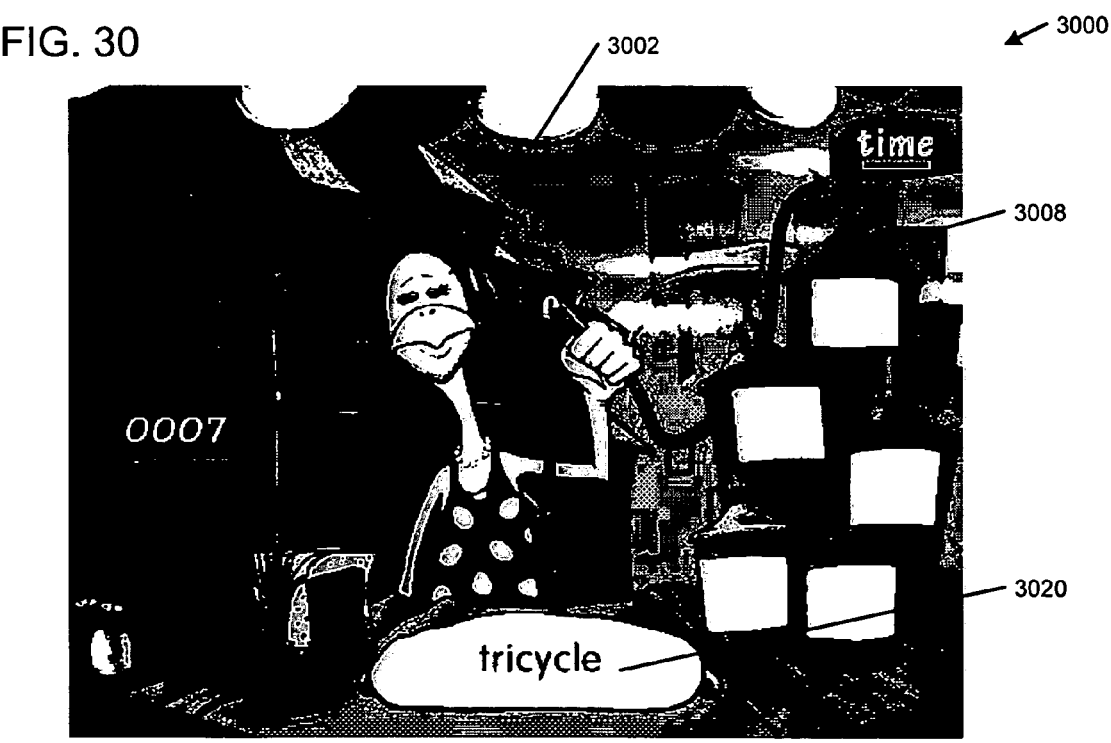
FIG. 30 is a screen shot illustrating correct completion of the word "tricycle" within the game Chicken Dog.

Referring to FIG. 30, a screen shot 3000 is shown illustrating the completed word tricyle 3020, and animating Chicken Dog 3002 providing condiments on the hot dog from the container 3008 that contained the blend "tr".

Figure 31:
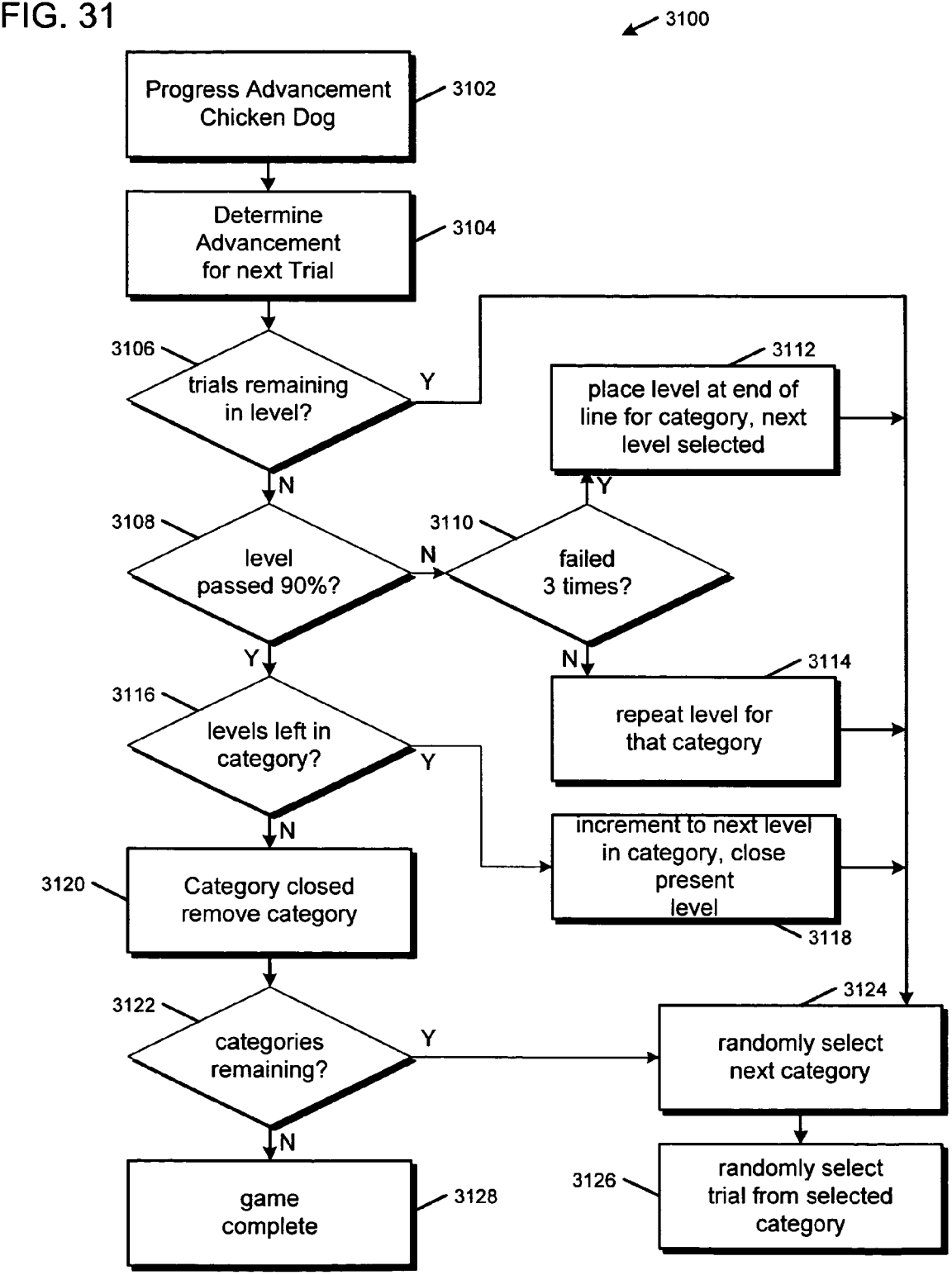
FIG. 31 is a flow chart illustrating progress advancement within the game Chicken Dog.

Referring now to FIG. 31, a flow chart 3100 is provided illustrating how a student advances through all the levels of all the categories in Chicken Dog. Flow begins at block 3102 and proceeds to block 3104 where determination of advancement for the next trial is begun. Flow then proceeds to decision block 3106.

At decision block 3106, a determination is made as to whether there are any trials remaining within the existing level (for the presently selected category). If not, then flow proceeds to decision block 3108. Otherwise, flow proceeds to block 3124.

TABLE V

| Category | Level | Number of trials per letter or letter group | Number of letters or letter groups | Trials per category |
| --- | --- | --- | --- | --- |
| Beginning | Level 1 Beginning Consonants | 3 | 19 | 57 |
| | Level 2 Beginning Blends | 3 | 20 | 60 |
| | Level 3 Beginning Consonants/Blends | 3 | 10 | 30 |
| | Level 4 Beginning Digraphs/Silent Letters | 5 | 8 | 40 |
| Ending | Level 1 Ending Consonants | 4 | 8 | 32 |
| | Level 2 Ending Consonants | 4 | 8 | 32 |
| | Level 3 Ending Blends | 4 | 9 | 36 |
| | Level 4 Ending Silent Letters | 3 | 2 | 6 |
| Medial | Level 1 Single Consonants | 3 | 18 | 54 |
| | Level 2 Two Consonants | 3 | 10 | 30 |
| | Level 3 Three Consonants | — | — | 18 |
| | Level 4 Medial Digraphs/Silent Letters | 3 | 8 | 24 |
| | Level 5 Double Consonants to spell one phoneme | 3 | 10 | 30 |
| Vowel | Level 1 Short Vowels | 5 | 5 | 25 |
| | Level 2 Long Vowels | 5 | 5 | 25 |
| | Level 3 Vowel Digraphs | 5 | 5 | 25 |
| | Level 4 Long Vowels/Vowel Digraphs/Diphthongs | 5 | 10 | 50 |
| | Level 5 Long Vowels/Vowel Digraphs/r-control | 5 | 7 | 35 |

At block 3124 the next category is randomly selected. For example, given four categories (A, B, C, and D), trials are presented randomly across all four categories, for each four instances. That is, if the first trial is presented in category A, the next trial will come randomly from categories B, C, D. If the next trial comes from category C, the trial after that will come randomly from categories B or D. After a trial is presented from each category, the process is repeated for the four categories. Thus, categories are randomly selected, while insuring that at least one trial from each category is presented every four trials. This continues until a category is closed (see block 3120). Flow then proceeds to block 3126.

At block 3126, a trial is randomly selected from the present level, for the presently selected category. At this point, the trial is selected, and game play continues as defined in FIG. 28.

At decision block 3106, if there are no more trials remaining within the present category, within the present level, flow proceeds to decision block 3108.

At decision block 3108 a determination is made as to whether the student has obtained a 90% correct status for that level. If s/he has, then flow proceeds to decision block 3116. Otherwise, flow proceeds to decision block 3110.

At decision block 3110, a determination is made as to whether the student has failed the present level, for the present category 3 times? If not, then flow proceeds to block 3114. Otherwise, flow proceeds to block 3112.

At block 3114, the level for the present category is left open, meaning that all trials for the present level, for the present category will be repeated. Flow then proceeds to block 3124 where the next category for trial is selected.

At block 3112, the present level, for the present category is placed at the end of the line for the category, and the next level is selected for the present category. That is, if the present category has 4 levels, level 1 has already been passed, and the present level is level 2, then the level selected for the present category is level 3, and level 2 is placed behind level 4, to be repeated later. Flow then proceeds to block 3124.

At decision block 3116, a determination is made as to whether any levels are left in the present category. If there are, flow proceeds to block 3118. Otherwise, flow proceeds to block 3120.

At block 3118, the present level for the present category is closed, and the level for the present category is incremented. Flow then proceeds to block 3124.

At block 3120, the present category is closed. That is, the student has reached block 3120 because s/he has obtained a 90% correct status across all trials, across all levels, for the present category. Thus, the present category is removed from the list of randomly selected categories (block 3124). Flow then proceeds to decision block 3122.

At decision block 3122, a determination is made as to whether any categories remain open. If there are, flow proceeds to block 3124 where the next open category is selected. Otherwise, flow proceeds to block 3128.

At block 3128, the game is complete. The student has arrived at this block by obtaining a 90% correct status across all trials, for each level, for each category.

The above has described how the game Chicken Dog, along with its adaptive training process, trains a student in Spelling and in Decoding. Attention is now directed at the next game in Fast ForWord Reading, a game called Twisted Pictures.

Sentence Comprehension

Twisted Pictures trains students to attend to the syntactic structure of a sentence by challenging the student to choose the sentence that best describes a picture. Twisted Pictures trains students in recovering the syntactic structures of sentences ranging from simple sentences in active voice, to sentences in passive voice, to complex sentences with different types of embedded clauses. As students become proficient, the exercise introduces longer sentences that encourage the student to extend their working memory abilities; the exercise also introduces words from a more advanced level of vocabulary.

Twisted Pictures presents sentences containing reversible nouns that cannot be understood by common sense alone (such as The monkey is paying the snake), which forces students to use text-driven logic to understand each sentence. Twisted Pictures also uses a common set of nouns and verbs in each set of sentences, which forces students to pay close attention to syntax and also helps students work on automatic word identification.

Twisted Pictures uses a multiple-choice format to train:
Sentence comprehension: The student must comprehend each presented sentence in order to choose the sentence that best describes the picture on the screen.
Syntax: Twisted Pictures presents 17 syntactic structures of varying complexity.
Working memory: The student must hold each word of the four presented sentences in mind to construct a gist for each sentence, and then must hold those gists in mind while choosing the correct sentence. As the exercise progresses, the sentences become longer, thus stretching working memory to its optimal capacity.
Logical reasoning: Because sentences use reversible nouns, similar vocabulary, and similar syntax, the student must use logic reasoning, and make inferences rather than relying only on common sense to comprehend each sentence and choose the correct sentence.
Vocabulary: As the student progresses, Twisted Pictures presents sentences that use more advanced vocabulary words.

Figure 32:
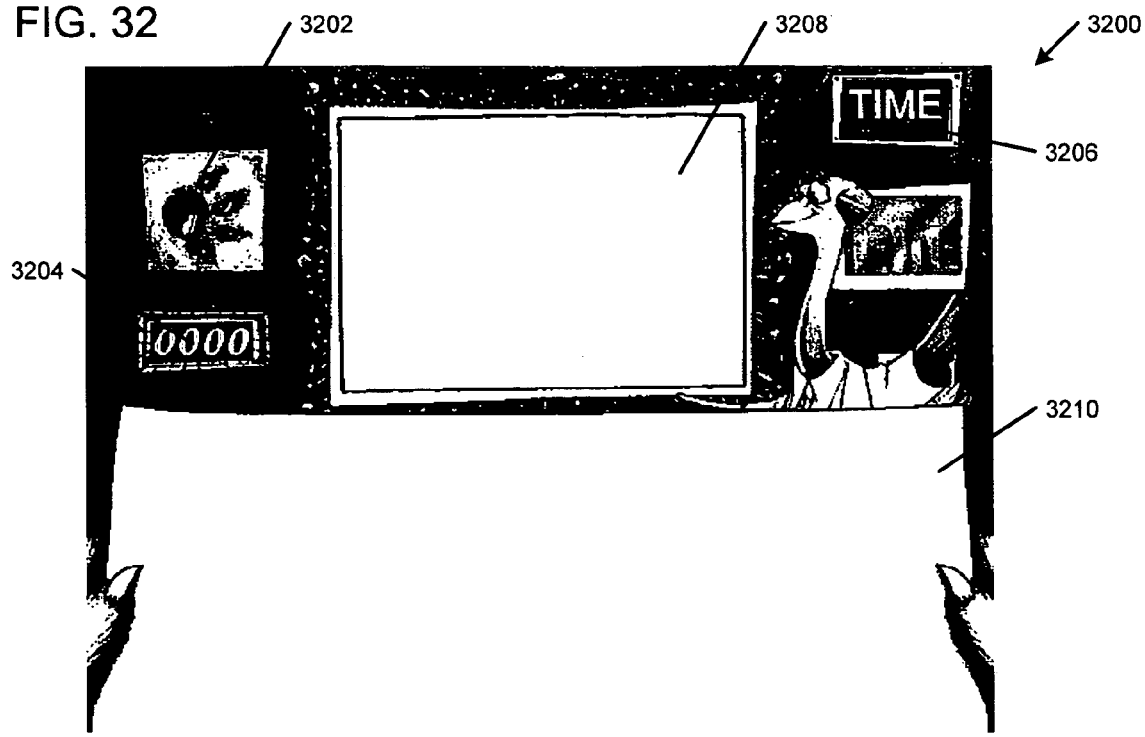
FIG. 32 is an initial screen shot for the game Twisted Pictures.

Referring now to FIG. 32, a screen shot 3200 is provided illustrating the opening scene for the game Twisted Pictures. The game screen 3200 is somewhat similar to the other games described above, having a yellow paw 3202 that must be selected by a student to start a trial, a counter 3204 for keeping track of the student's score, and a timer 3206 for indicating a relative time remaining for game play. In addition, there is a frame 3208 for holding a painting associated with each trial, and a parchment 3210 for holding four sentences, one that correctly describes the picture in the frame 3208, and three foils. The student must select the sentence that correctly describes the picture.

Figure 33:
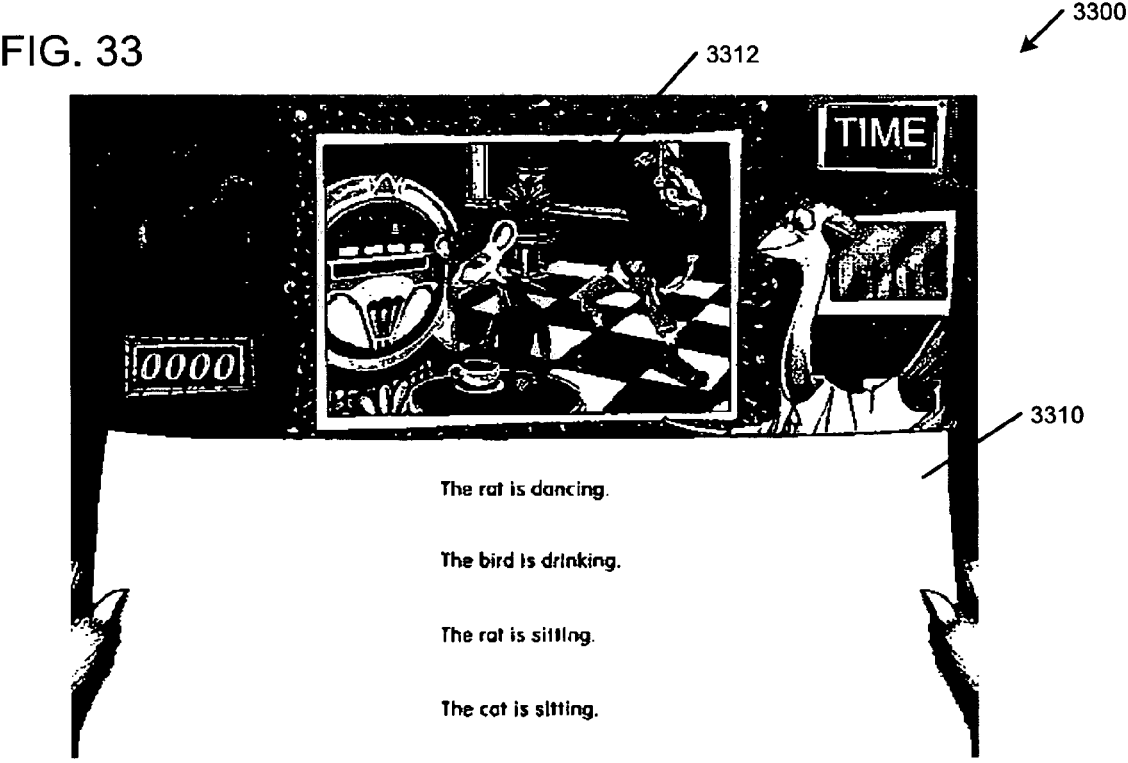
FIG. 33 is a first training screen within the game Twisted Pictures.

Referring now to FIG. 33, a screen shot 3300 is provided illustrating the first trial presented to the student. The screen 3300 contains a picture 3312 of a rat, and a cat in a cafe. The four sentences provided on the parchment 3310 for selection are: 1) The rat is dancing; 2) The bird is dancing; 3) The rat is sitting; and 4) The cat is sitting. The sentence that correctly describes the picture is "The rat is sitting." The first time the student plays Twisted Pictures, the correct sentence flashes to indicate the correct selection. When the student selects "The rat is sitting", a "ding" is played, indicating correct selection, and the screen removes the picture 3312 and sentences on the parchment 3310, leaving the screen like that shown in FIG. 32.

Figure 34:
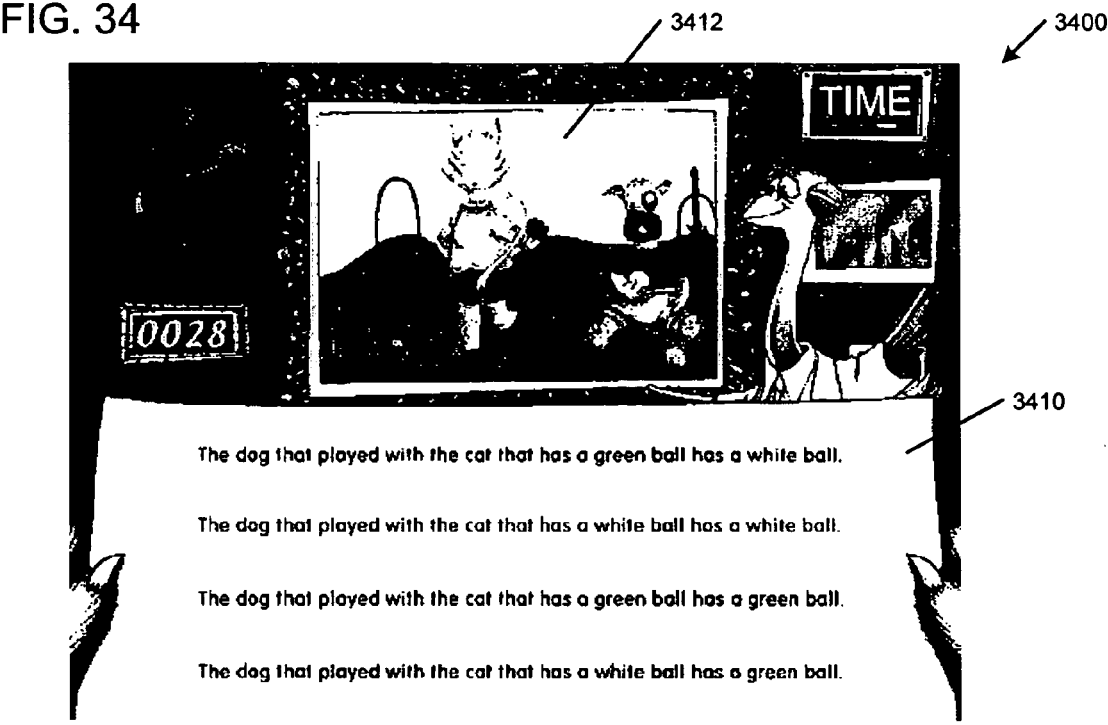
FIG. 34 is a second training screen within the game Twisted Pictures.

Referring now to FIG. 34, a screen shot 3400 is shown illustrating an incorrect selection. The screen shows a picture 3412 of a cat holding a green ball, and a dog holding a white ball. The four sentences provided on the parchment 3410 are: 1) The dog that played with the cat that has a green ball has a white ball (correct); 2) The dog that played with the cat that has a white ball has a white ball (incorrect); 3) The dog that played with the cat that has a green ball has a green ball (incorrect); and 4) The dog that played with the cat that has a white ball has a green ball (incorrect). When the student selects sentence 2, a "thunk" is played, indicating that the student incorrectly selected a sentence. In addition, the incorrect sentences are removed, and the correct sentence (in this case sentence 1) is highlighted to indicate to the student the correct sentence. The screen is then cleared back to the state shown in FIG. 32.

Figure 35:
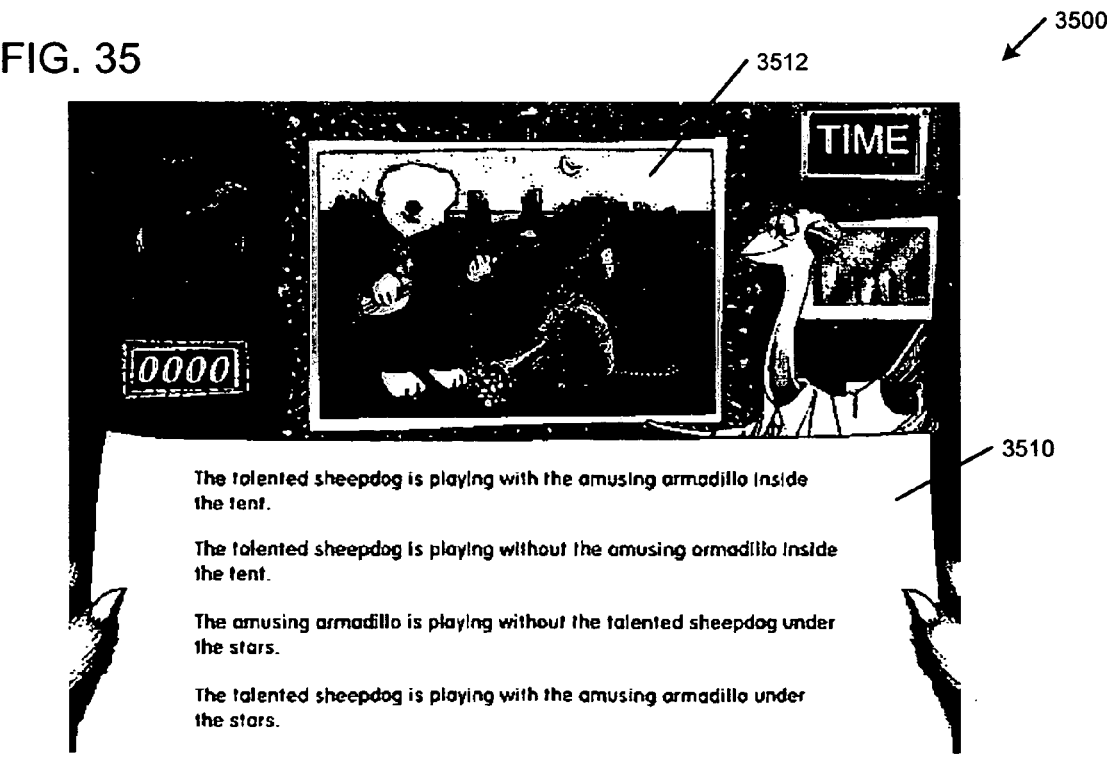
FIG. 35 is a third training screen within the game Twisted Pictures.

Referring now to FIG. 35, a screen shot 3500 is shown of a more complex sentence structure (provided at a more advanced training level in the program). The scene 3500 has a picture 3512 of a sheepdog and an armadillo playing music outside a tent. The four sentences provided on the parchment 3510 are: 1) The talented sheepdog is playing with the amusing armadillo inside the tent; 2) The talented sheepdog is playing without the amusing armadillo inside the tent; 3) The amazing armadillo is playing without the talented sheepdog under the stars; and 4) The talented sheepdog is playing with the amusing armadillo under the stars. The correct sentence, of course, is sentence 4.

Progressing Through Twisted Pictures

Twisted Pictures progresses through three levels of difficulty as follows:

Level 1: The student trains on sentences that contain, on average, 6 words. Words are at the $2^{nd}$ grade level at highest.

Level 2: The student trains on sentences that contain, on average, 8 words. Words are at the $3^{rd}$ grade level at highest.

Level 3: The student trains on sentences that contain, on average, 12 words. Words are at the $4^{th}$ grade level at highest.

At each level, Twisted Pictures presents 6 tiers of syntactic complexity. Each tier contains several different syntactic structures (called categories) that are all mastered at roughly the same age. A complete listing of the trials at the different levels is provided below in Appendix D.

Terms:

Tier: The syntactic complexity tier refers to hierarchical groupings of syntactic categories in the "TwistedPicturesSampleStims.doc".

Category: The syntactic complexity category refers to a specific syntactic structure. There are 17 syntactic categories. There are four trails in each category in each level.

Unit: A unit is always the smallest group of trials to be evaluated for advancement. In Twisted Pictures the unit includes all the trials in a given level (68 trials).

TABLE VI

| Level | Number of trials per syntactic category | Sentence Length | Vocabulary (max grade level) |
|---|---|---|---|
| 1 | 4 | average 6, max 10 | $2^{nd}$ |
| 2 | 4 | average 8, max 12 | $3^{rd}$ |
| 3 | 4 | average 12, max 18 | $4^{th}$ |

Evaluation of Trial:

A trial is evaluated as correct if the participant clicks on the correct sentence for the current picture.

Evaluation of Unit:

A unit includes all trials from a given level (68 trials). All the trials from a level are presented before any trials are evaluated. At that point, the trials are evaluated for 90% correct.

Adaptivity:

Twisted Pictures adapts to the student's incoming skill level and, as the student continues to train, tracks the number of correct and incorrect answers and adjusts the training level when the student is ready to advance. Twisted Pictures trains all syntax at each level, therefore does not advance the student until s/he is prepared to train on syntax in longer sentences and with more difficult vocabulary words. This approach ensures that the student is challenged but not frustrated, which in turn ensures that the student continues to pay attention to and enjoy the training, as well as continues to learn and progress in the exercise.

Advancement:

Twisted Pictures presents syntactic structure categories in variable order to give the student exposure to all syntactic structures. This strategy simulates real-life situations in which the student is surrounded by people using a variety of syntactic structures in everyday conversation. It also prevents the student from advancing steadily and then suddenly getting stuck, becoming frustrated, and withdrawing attention from the training.

Initially, the student is presented with a trial from a first category, like Simple Negation, which is a $1^{st}$ tier of syntactical complexity. After the student chooses the most accurate sentence for the trial, Twisted Pictures presents three more trials from the Simple Negation category. When the student has completed all four Simple Negation trials, Twisted Pictures might present a trial from the Embedded Passives category, which is in the $6^{th}$ tier of syntactical complexity. After the student has completed all the trials in one level, Twisted Pictures evaluates all the trials for that level. If the student has chosen 90 percent of the sentences correctly, Twisted Pictures advances to the next level.

Figure 36:
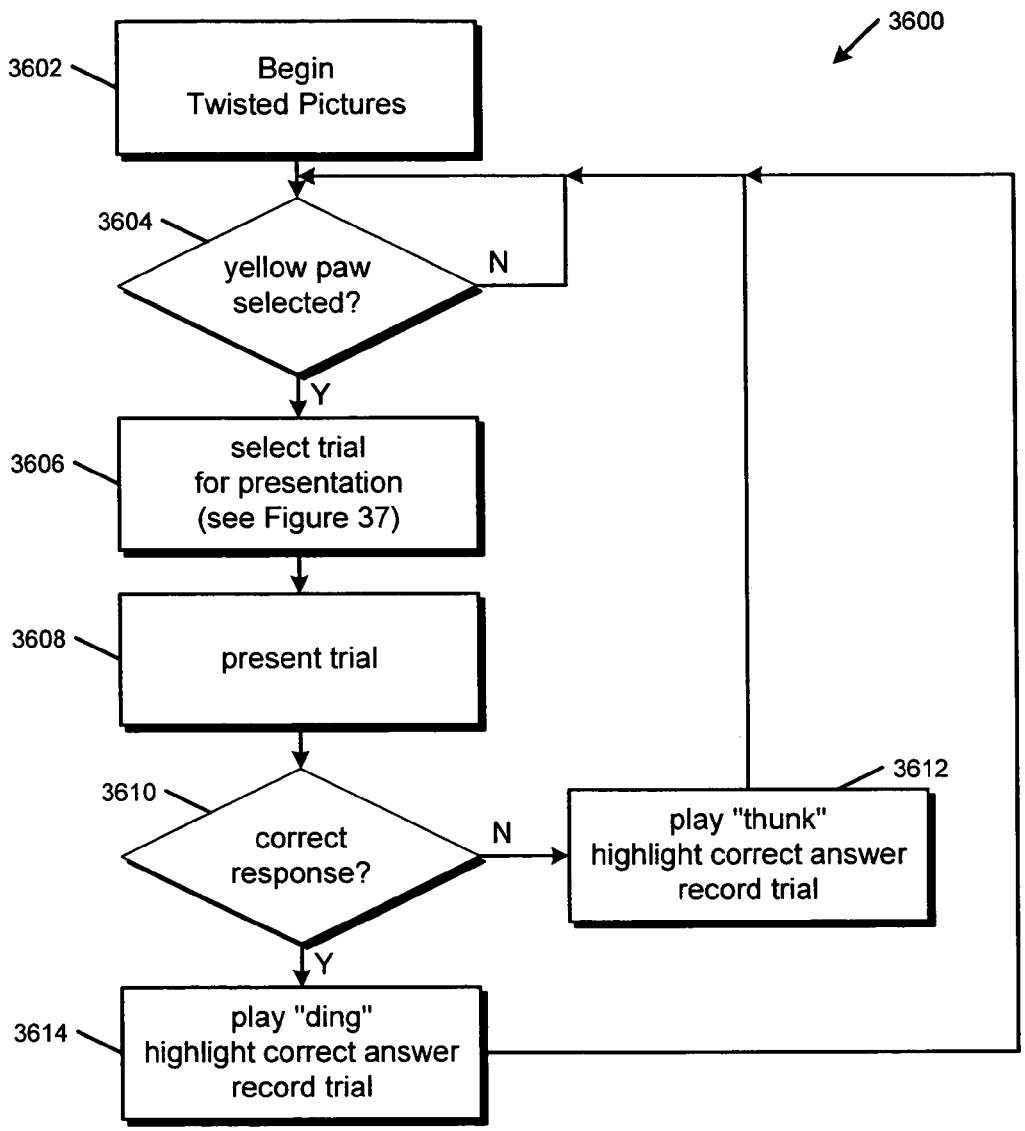
FIG. 36 is a flow chart illustrating the training methodology within the game Twisted Pictures.
Figure 37:
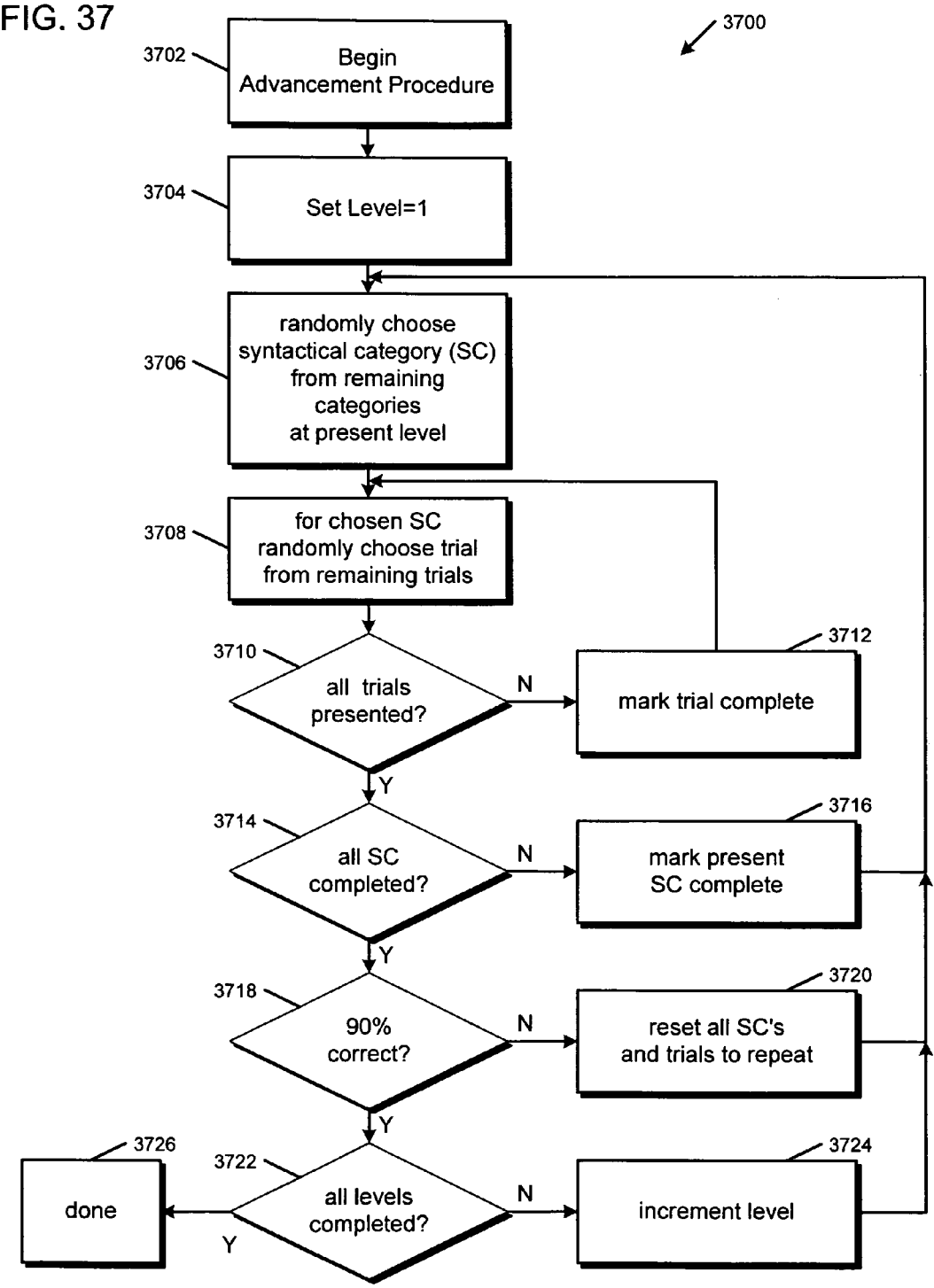
FIG. 37 is a flow chart illustrating the advancement methodology within the game Twisted Pictures.

Referring now to FIGS. 36 and 37, flow charts 3600 and 3700 are provided to particularly illustrate game play in Twisted Pictures, as well as the methodology for advancing a student in game play. Game play begins at block 3602 and proceeds to decision block 3604.

At block 3604, a decision is made as to whether the student has selected the yellow paw 3202. If not, flow continues at decision block 3604 until the paw 3202 is selected. When selected, flow proceeds to block 3606.

At block 3606, a trial is selected according to the methodology described below with reference to FIG. 37. Flow then proceeds to block 3608.

At block 3608, the selected trial is presented. Flow then proceeds to decision block 3610.

At decision block block 3610, a determination is made as to whether the student correctly or incorrectly responded to the trial. If correct, flow proceeds to block 3614. Otherwise flow proceeds to block 3612.

At block 3612, a "thunk" is played to indicate to the student that his/her response was incorrect. In addition, the correct answer is highlighted, and the trial is recorded. That is, the syntactical category, level, and sentence group, along with the outcome (correct or incorrect) are recorded. Flow then proceeds back to decision block 3604 to await initiation of another trial.

At block 3614, a "ding" is played to indicate to the student that his/her response was correct. In addition, the correct answer is highlighted, and the trial is recorded. That is, the syntactical category, level, and sentence group, along with the outcome (correct or incorrect) are recorded. Flow then proceeds back to decision block 3604 to await initiation of another trial.

Referring now to FIG. 37, a flow chart 3700 is provided illustrating the advancement methodology for the game Twisted Pictures. Flow begins at block 3702 and proceeds to block 3704.

At block 3704, the training level is set to Level 1. Flow then proceeds to block 3706.

At block 3706, the program randomly chooses a syntactical category for training from all of the remaining categories at the present level. Initially, all the syntactical categories at level 1 are available. However, as the student correctly responds to trials within a syntactical category, those categories will be marked completed (in block 3716). So, block 3706 is responsible for choosing a syntactical category, at the present level, from those categories that are not yet marked completed. Flow then proceeds to block 3708.

At block 3708, the program randomly chooses a trial from within the chosen syntactical category from the list of remaining trials within the chosen syntactical category. Initially, all of the trials within the chosen syntactical category are available. However, after a trial is presented, it is marked complete (at bock 3712). Thus, block 3708 is responsible for choosing a trial, within the chosen syntactical category, from those trials not yet marked completed. Flow then proceeds to decision block 3710.

At decision block 3710, a determination is made as to whether all the trials within the chosen syntactical category have been presented. In one embodiment, there are four trials within each syntactical category, at each level. If all the trials have not been presented, flow proceeds to block 3712. Otherwise flow proceeds to decision block 3714.

At block 3712, the present trial is marked complete. Flow then proceeds to block 3708 where another trial from the present syntactical category is chosen.

At decision block 3714, a determination is made as to whether all syntactical categories, at the present level, have been completed. If not, flow proceeds to block 3716. Otherwise, flow proceeds to decision block 3718.

At block 3716, the present syntactical category is marked complete. Flow then proceeds back to block 3706 where the program randomly chooses another syntactical category from the remaining categories.

At decision block 3718, a determination is made as to whether the student has responded correctly to at least 90% of the trials across all syntactical categories at the present level. If not, flow proceeds to block 3720. Otherwise, flow proceeds to decision block 3722.

At block 3720, all syntactical categories, and all trials within those syntactical categories, are reset, so that they may again be selected by block 3706/3708. That is, since the student has not correctly responded to 90% of the trials, s/he is required to repeat those trials, at the present level, albeit in random order. Flow then proceeds back to block 3706.

At decision block 3722, a determination is made as to whether all levels have been completed. If not, flow proceeds to block 3724. Otherwise, the student has correctly responded to at least 90% of the trials, for all syntactical categories, for all levels, so the training ends, at block 3726.

The next two games in the program Fast ForWord Reading (Book Monkeys and Hog Hat Zone) deal primarily with Paragraph Comprehension, although they require and build on aspects trained in the other games, including Decoding, Spelling and Sentence Comprehension.

Book Monkeys exercises the student to read a paragraph and then answers questions to demonstrate their comprehension of the paragraph. Some of the paragraphs are fiction and others nonfiction. There are six questions about each paragraph split into a number of question types (i.e. literal, inferential, and causative). There are four answer choices for each question. To reduce the memory load, the paragraph is presented again after the second question is answered and again after the fourth question is answered. If any questions are answered incorrectly, the paragraph is displayed again followed by the incorrectly answered questions. A complete list of the stimuli used in Book Monkeys may be found in Appendix E attached hereto.

Book Monkeys uses a question and answer, multiple choice format to train:

Literal comprehension: For each paragraph, Book Monkeys presents two questions (out of six total) that ask the student to recall facts from the paragraph, such as the main point.

Causative comprehension: For each paragraph, Book Monkeys presents two questions (out of six total) about the cause of the events within the paragraph.

Inferential comprehension: For each paragraph, Book Monkeys presents two questions (out of six total) that ask the student about various hypothesis s/he needed to form in order to understand the text.

Working memory: The student must hold in working memory the gist of the paragraph, as well as important details, to answer the questions correctly.

Vocabulary: As the student progresses, Book Monkeys presents longer paragraphs that use more advanced vocabulary words. In addition, Book Monkeys regularly asks students to use context to identify the meaning of a word that is from 1 to 3 grade levels above the vocabulary level of the paragraph.

By training students in literal, causal, and inferential comprehension, Book Monkeys trains students to extract the main point from a paragraph—the gist—which contributes to comprehension of longer passages. Understanding causal connections is important for comprehending the links between ideas and comprehending longer passages as well as for remembering text. The ability to make correct inferences, such as who a pronoun refers to and what the best title for the paragraph might be, is important for understanding the links between words, between sentences, and for forming a coherent gist of a written work. Developing working memory abilities helps the student not only keep the gist of the paragraph in mind but also read and comprehend longer, more complicated texts. Vocabulary skills contribute to automatic word recognition, an important factor in fluent reading. The questions used in Book Monkeys directly measure the student's ability to read for literal meaning, causal connection, and his or her ability to use working memory effectively not only to remember facts and connections but also to make inferences.

Table VII below lists the question types trained on in Book Monkeys.

TABLE VII

| Question Type | Question Description | Example |
| --- | --- | --- |
| Literal | True or False | Which of the following is a true statement about the paragraph? |

TABLE VII-continued

| Question Type | Question Description | Example |
|---|---|---|
| Causative | Cause and Effect | Mike got up early that morning because? |
| Inferential | Title | Which of the following would be the best title for this paragraph? |
| | Next | Which of the following is most likely to be the next line? |
| | Word | Which is the meaning of __ (a word used in the paragraph)? These words could be multiple meaning words use in a certain sense in the paragraph. [These words should be from a higher vocabulary grade level than the paragraphs]. |
| | Pronoun | Who does he (the pronoun "he" in the paragraph) refer to? |

Figure 38:
FIG. 38 is an initial screen shot for the game Book Monkeys.

Referring now to FIG. 38, a screen shot 3800 is shown of the opening scene in the game Book Monkeys. The setting is a library. As in the other games, a yellow paw 3802 is provided to allow a student to initiate a trial. A counter 3804 is provided to indicate the student's score, and a timer 3806 is provided to indicate a relative amount of time remaining for game play.

Figure 39:
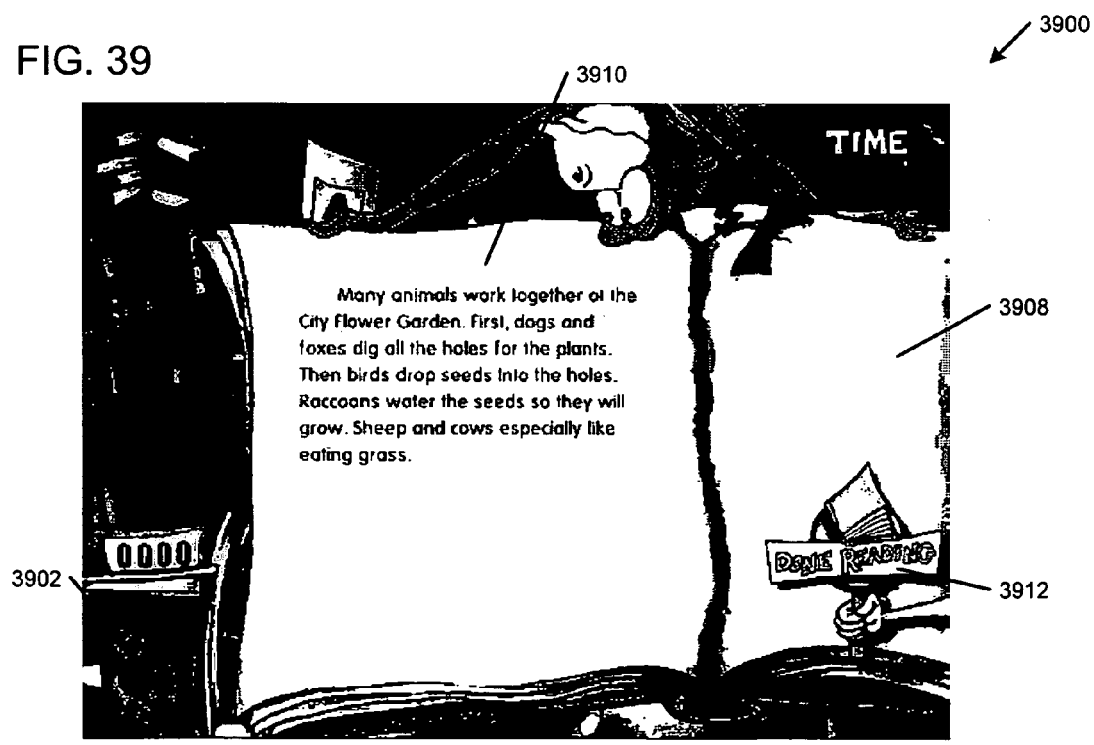
FIG. 39 is a screen shot showing a paragraph presented within the game Book Monkeys.

Referring now to FIG. 39, a screen shot 3900 is shown that is presented after a student selects the yellow paw 3902. A book 3908 appears containing a story 3910. The student is aurally told to read the story, and when finished, to click the sign "done reading" 3912. The first time the student plays Book Monkey's, the "done reading" sign 3912 flashes to indicate to the student what they are to select. When the student is finished reading the story 3910, s/he presses the "done reading" sign 3912, and is taken to the screen presented in FIG. 40, to which attention is now directed.

Figure 40:
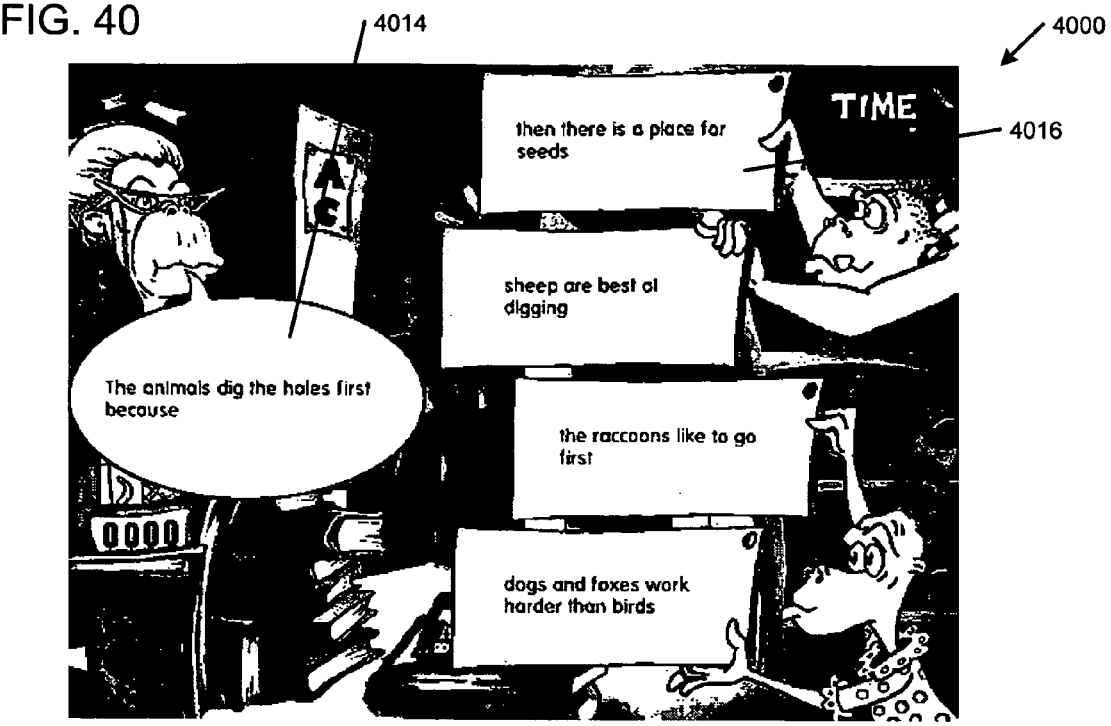
FIG. 40 is a screen shot showing a first question presented within the game Book Monkeys.
Figure 41:
FIG. 41 is a screen shot showing a question that is being repeated after an incorrect response, within the game Book Monkeys.

In FIG. 40, a screen shot 4000 is shown presenting a question 4014, and four answers 4016. There is one correct answer, and three foils for each question 4014. The student is to read the question 4014, and select the answer that most nearly matches the question. If the student selects the correct answer 4016, a "ding" is played, indicating a correct selection, and the correct selection is highlighted. If the student selects an incorrect answer, a "thunk" is played, and the question and answers disappear. However, the next time the question is repeated, the incorrect answer that was selected is "grayed" out so that it is not available for selection. This is shown in FIG. 41, in the screen shot 4100, with the grayed out answer 4118.

Progression Through Book Monkeys

Book Monkeys progresses through two levels of difficulty as follows:

Level 1: The student trains on paragraphs of around 6 sentences; each sentence contains, on average, 10 words. Words are at the $2^{nd}$ grade level at highest.

Level 2: The student trains on paragraphs of around 7 sentences; each sentence contains on average 12 words. Words are at the $3^{rd}$ grade level at highest.

At each level, Book Monkeys presents four nonfiction paragraphs and six fiction paragraphs. After the student has read a paragraph, Book Monkeys asks the student:

Two literal questions of a true-false nature

Two causative questions regarding causes of events within the paragraph

Two inferential questions that require the student to formulate a hypothesis about certain components of the paragraph. The two inferential questions are chosen from four possible types:

The most appropriate title for the paragraph

What is most likely to happen next

The meaning of a particular word

Whom or what a particular pronoun refers to

Adaptivity

Book Monkey's adapts to the student's incoming skill level and, as the student continues to train, tracks the number of correct and incorrect answers and adjusts the training level when the student is ready to advance. However, Book Monkeys trains all categories of questions at each level, therefore does not advance the student to the second level until s/he is prepared to answer the same types of literal, causative, and inferential questions about longer paragraphs that contain longer sentences with more difficult vocabulary words. This approach ensures that the student is challenged but not frustrated, which in turn ensures that the student continues to pay attention to and enjoy the training, as well as continues to learn and progress in the exercise.

After Book Monkeys presents a paragraph and six questions about that paragraph, Book Monkeys evaluates the student's responses. If the student answered all six questions correctly, Book Monkeys activates the yellow paw and allows the student to go on to the next paragraph. If the student has not answered a question correctly, Book Monkeys gives the student two more tries at it.

During the student's second attempt to answer a question correctly, Book Monkeys displays the paragraph again and the librarian repeats the question. The monkeys give the student the same four choices, but Book Monkeys grays out and deactivates the incorrect answer the student chose the first time.

After the student responds, Book Monkeys displays another question that wasn't correctly answered (if there are any). After Book Monkeys cycles through all the questions that the student didn't answer correctly the first time around, Book Monkeys evaluates the student's responses.

If the student still has not answered a question correctly, Book Monkeys gives the student one last try. During the student's third attempt to answer a question correctly, Book Monkeys displays the paragraph again and the librarian repeats the question. The monkeys give the student the same four choices, and Book Monkeys grays out and deactivates both incorrect answers that the student chose the first two times. If the student answers correctly, Book Monkeys displays the next questions that has not yet been correctly answered (if any). If the student doesn't choose the correct answer on the third try, Book Monkeys highlights the correct answer.

Book Monkeys does not give the student a fourth try at questions that the student has not answered correctly; after the third round of attempts, Book Monkeys activates the yellow paw and allows the student to progress to the next paragraph.

After the student has completed all the trials in one level, Book Monkeys evaluates all the trials for that level. In evaluating trials for advancement, Book Monkeys only considers the student's first response to each question. If the student has chosen 95 percent of the answers correctly on the first try, Book Monkeys advances to the next level.

Figure 42A:
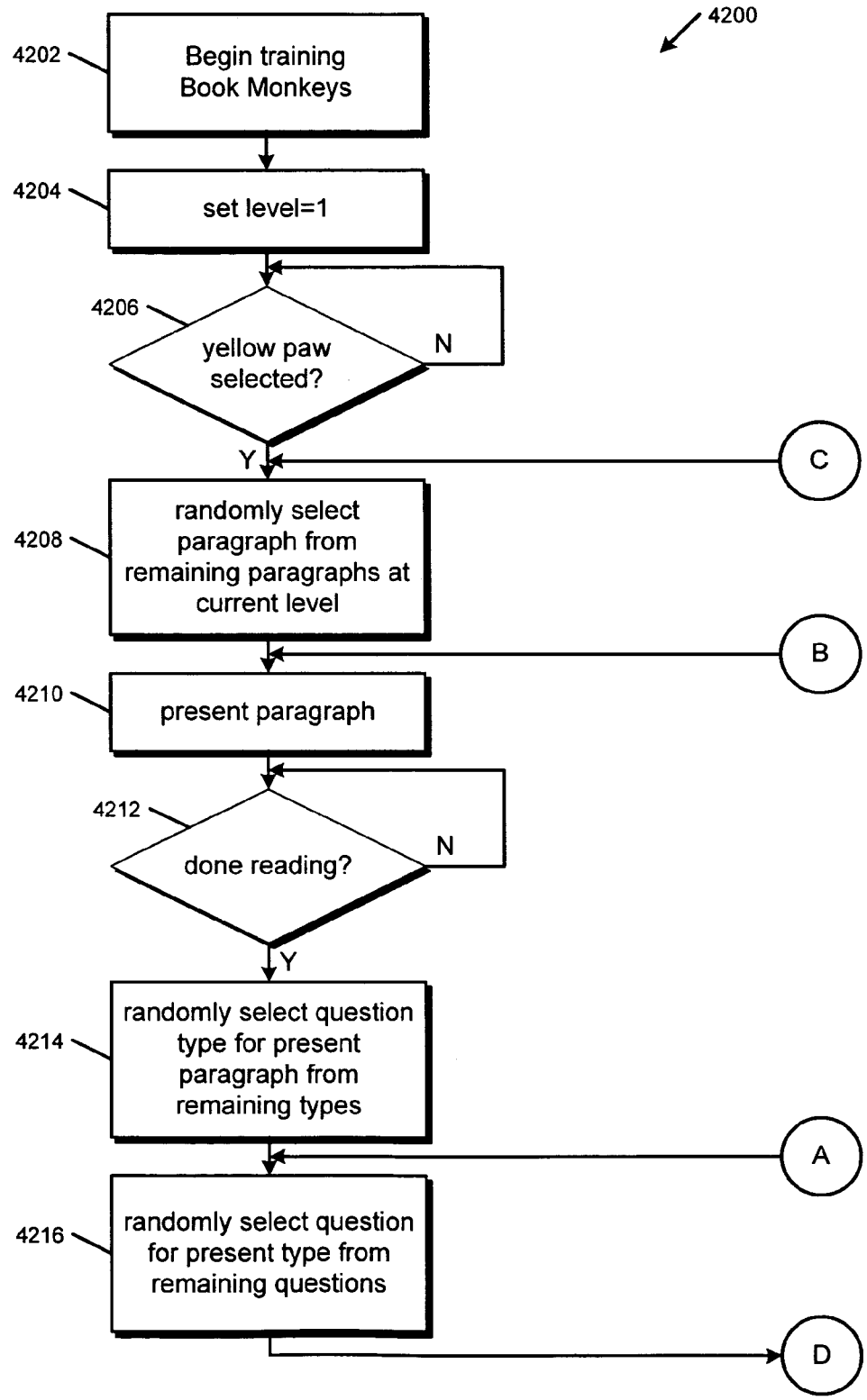
FIGS. 42a–c provide a flow chart illustrating the training and advancement methodology within the game Book Monkeys.
Figure 42B:
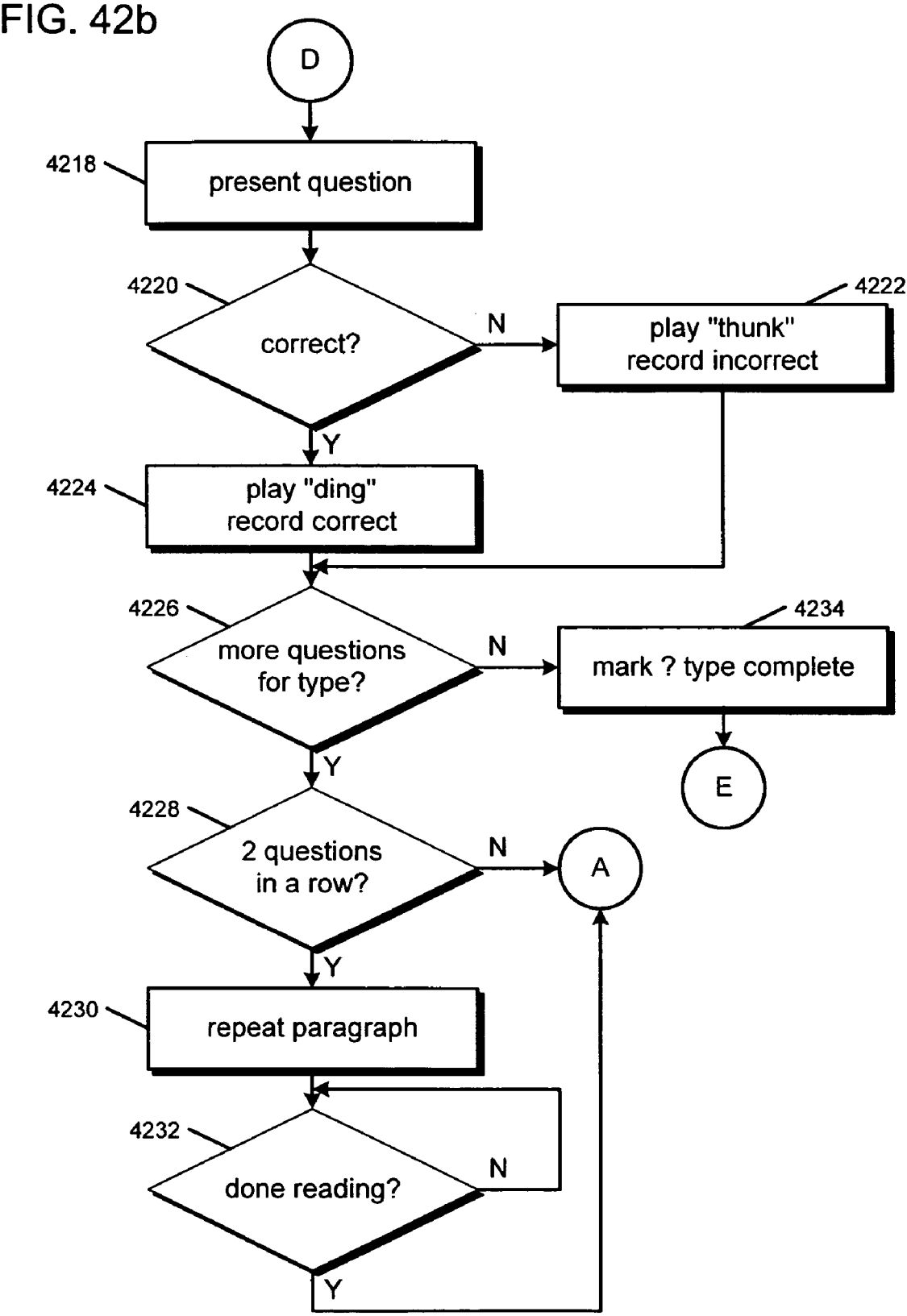
Figure 42C:
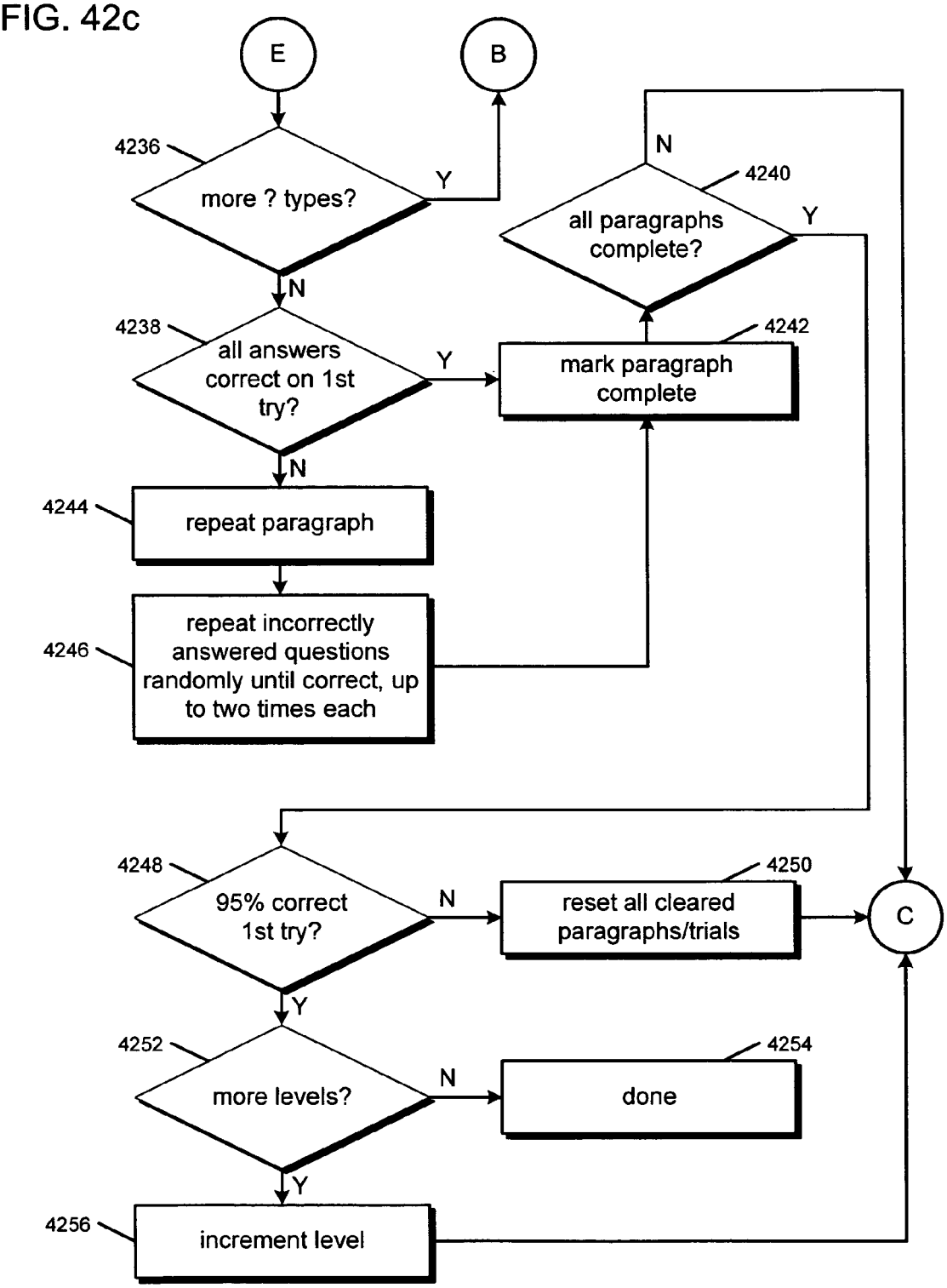

Referring now to FIGS. 42a–c, a flow chart 4200 is provided illustrating the training and advancement methodology within the game Book Monkeys. Flow begins at block 4202 and proceeds to block 4204.

At block 4204 the training level is set to Level 1. Flow then proceeds to decision block 4206.

At decision block 4206, a determination is made as to whether the student has selected the yellow paw, and thereby initiating a trial. Flow remains at decision block 4206 until the student selects the paw. Once selected, flow proceeds to block 4208.

At block 4208, a paragraph is randomly selected from the set of paragraphs provided at the current training level. Initially, the Level is 1, and all paragraphs are available for selection. However, as the student progresses through the paragraphs, the remaining paragraphs are randomly selected, until all paragraphs have been played. Once a paragraph is selected, flow proceeds to block 4210.

At block 4210, the paragraph is presented to the student as shown in FIG. 39. Flow then proceeds to decision block 4212.

Flow remains at decision block 4212 until the student selects the "done reading" icon on the screen (as shown in FIG. 39). Once selected, flow proceeds to block 4214.

At block 4214, a question type is randomly selected for the present paragraph from the remaining question types. Initially, all question types are available for the present paragraph. However, as the student advances through the question types, a selection is made from the remaining question types until all types have been presented. Flow then proceeds to block 4216.

At block 4216, a question is randomly selected from the remaining questions for the present question type. Initially, all questions for the present question type are available. However, as the student advances through the questions, a selection is made from the remaining questions until all questions have been presented. Flow then proceeds to block 4218.

At block 4218, the present question is presented to the student. Flow then proceeds to decision block 4220.

At block 4220, a determination is made as to whether the student correctly answered the presented question. If not, flow proceeds to block 4222. Otherwise, flow proceeds to block 4224.

At block 4222, a "thunk" is played indicating an incorrect answer. The answer is recorded as incorrect, and flow proceeds to decision block 4226.

At block 4224, a "ding" is played to indicate a correct answer. The answer is recorded as correct, and flow proceeds to decision block 4226.

At decision block 4226, a determination is made as to whether there are any more questions remaining for the present question type. If not, flow proceeds to block 4234. Otherwise, flow proceeds to decision block 4228.

At decision block 4228, a determination is made as to whether two questions in a row have been presented to the student. In one embodiment, Book Monkeys repeats the present paragraph after every two questions. Book Monkeys recognizes that a student's memory may need to be refreshed for following questions, and therefore provides them with access to the paragraph every two questions. If there have not been two questions in a row, flow proceeds back to block 4216 where another question for the present question type is selected. Otherwise, flow proceeds to block 4330.

At block 4330, the present paragraph is repeated. Flow then proceeds to decision block 4232.

Flow remains at decision block 4232 until the student selects the "done reading" icon. Flow then proceeds back to block 4216 where another question for the present question type is selected.

At block 4234, the present question type is marked complete. That is, there are no more questions remaining to be asked for the present question type. Flow then proceeds to decision block 4236.

At decision block 4236, a determination is made as to whether there are any more question types for the present paragraph. If so, then flow proceeds back to block 4210 where the paragraph is again presented, and the above described sequence continues until all questions for all question types, at the present level, for the present paragraph, have been presented. If there are no more question types for the present paragraph, flow proceeds to decision block 4238.

At decision block 4238, a determination is made as to whether the student correctly answered all the questions for all the question types for the present paragraph, on the first attempt. If not, flow proceeds to block 4244. Otherwise, flow proceeds to block 4242.

At block 4244, the present paragraph is again repeated. Flow then proceeds to block 4246.

At block 4246, all of the questions that were incorrectly answered on the $1^{st}$ attempt, for all of the question types, are repeated, one at a time, to allow the student to correctly answer the questions. The student is given two opportunities to answer each outstanding question correctly. As mentioned above, previous incorrect answers are grayed out and deactivated to give the student a better opportunity to answer correctly. Whether or not the student answers the outstanding questions correctly, after two attempt, flow proceeds to block 4242.

At block 4242, the present paragraph is marked complete. Flow then proceeds to decision block 4240.

At decision block 4240, a determination is made as to whether all of the paragraphs for the present level have been completed. If not, flow proceeds back to block 4208 where a new paragraph is selected for presentation. However, if all paragraphs at the present level have been completed, flow proceeds to decision block 4248.

At decision block 4248, a determination is made as to whether the student correctly answered at least 95% of the questions, for all question types, for all paragraphs, at the present level. If not, then flow proceeds to block 4250. Otherwise, flow proceeds to decision block 4252.

At block 4250, all questions, question types, and paragraphs are reset, and flow proceeds back to block 4208 to train again, as described above. The student will continue in this training process until s/he has achieved a 95% success rate across all paragraphs, on the $1^{st}$ attempt.

At decision block 4252, a determination is made as to whether there are any more levels for training. If not, flow proceeds to block 4254 where training on Book Monkeys ends. However, if there are more levels of training, flow proceeds to block 4256.

At block 4256, the training level is increased. For example, if the student correctly passes 95% of the questions for level 1, the training level is incremented to level 2. Flow then proceeds back to block 4208 where training begins with new paragraphs for the new training level.

Hog Hat Zone

The last game in the Fast ForWord Reading program is called Hog Hat Zone. This game focuses on helping the student improve paragraph comprehension skills and understanding of morphological complexity in the following ways:

Paragraph comprehension: Hog Hat zone presents paragraphs excerpted from classic children's literature that are missing morphologically important words—words that affect the meaning of the sentence. The missing words follow the progression of students' acquisition of pronouns, plural and possessive nouns, auxiliary verbs, third person singular and past tense verbs, derivational affixes (prefixes and suffixes that change a word's meaning or part of speech), and contractions. Understanding these morphologically important words and how they are spelled in English is crucial for understanding the links between words, the meaning of a sentence, and the relationships between sentences.

Morphological complexity: Hog Hat Zone displays four choices for each missing word: one choice is the correct word, and the other three choices are foils—incorrect choices closely related to the correct choice. The foils are systematically chosen to include words that are commonly confused with the correct word, and they are similar to the correct word either morphologically (through similar root words, affixes, or parts of speech) or orthographically (though similar spellings or spelling-sound correspondences).

Vocabulary: Hog Hat Zone trains students to recognize and correctly use morphological affixes—prefixes and suffixes. Because comprehension of morphological changes leads to vocabulary growth in $3^{rd}$ grade and beyond, Hog Hat Zone helps students increase their vocabulary skills.

Figure 43:
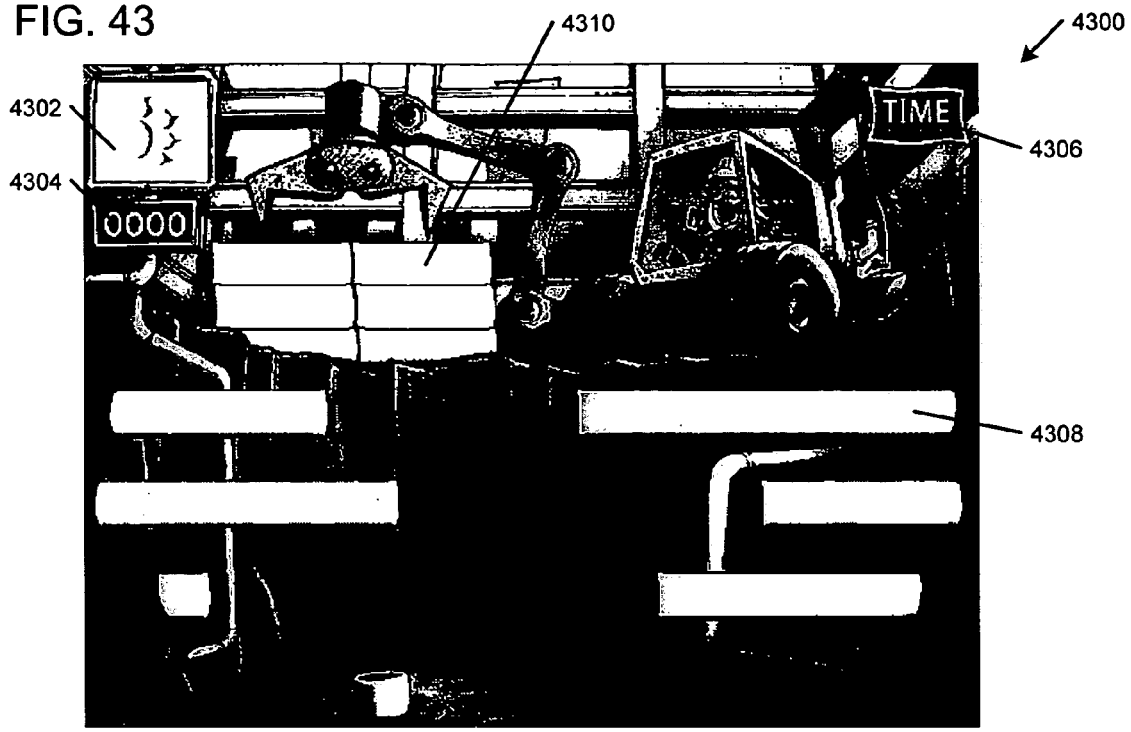
FIG. 43 is an initial screen shot within the game Hog Hat Zone.
Figure 44:
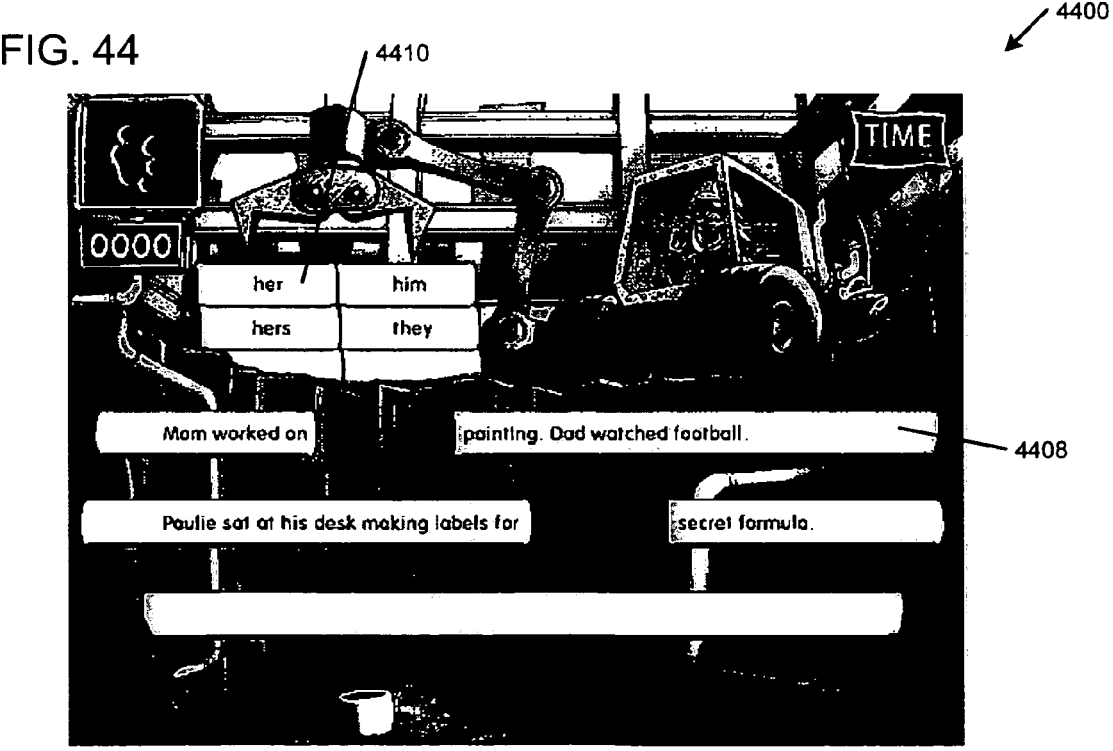
FIG. 44 is a screen shot illustrating a first trial within the game Hog Hat Zone.

Referring now to FIG. 43, an initial screen shot 4300 is shown for the game Hog Hat Zone. As in the other games described above, the screen contains a yellow paw 4302 for initiating a trial, a score counter 4304, and a timer 4306 to indicate a relative amount of remaining time. The setting for Hog Hat Zone is that of a construction site. Either steel pipes, or beams, are provided which are not connected to each other. Additional lengths of pipe 4310 are provided that are to be inserted on the pipes 4308 to complete the construction. When the student selects the yellow paw 4302, s/he is taken to the screen 4400 of FIG. 44, to which attention is now directed.

Figure 45:
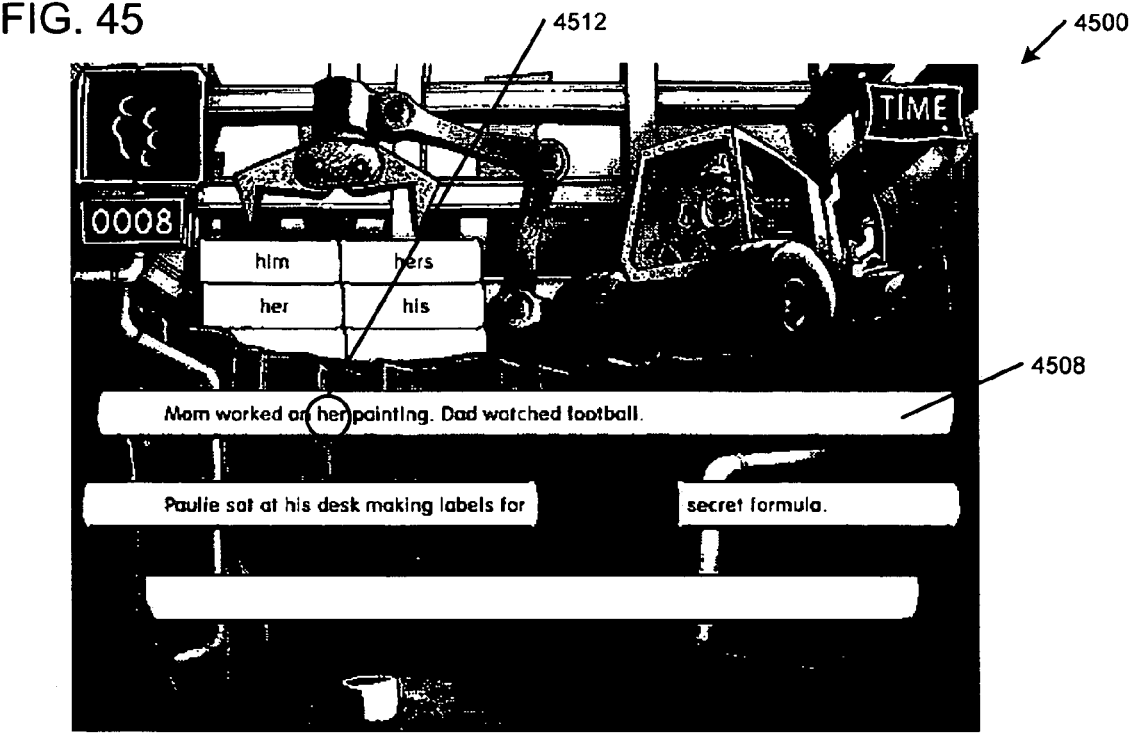
FIG. 45 is a screen shot illustrating a second trial within the game Hog Hat Zone.

On top of the pipes 4408 are placed a sentence or two that is missing a key word or words. The additional lengths of pipes 4410 are provided with four words which may be selected for insertion into the first break in the pipes 4408. One of these words is the correct word, and the other three are foils. If the student selects the correct word, in this case, the word "her", a "ding" is played to indicate the correct selection, and the student is presented with screen 4500 of FIG. 45, to which attention is now directed.

The first word "her" 4512 that was selected, has been inserted into the pipe 4508 to complete the pipe. Since there is still a break in another pipe, the student must select the next correct word. If the student selects an incorrect word, a "thunk" is played to indicate an incorrect selection, and the correct word is highlighted and placed on the pipe 4508.

Figure 46:
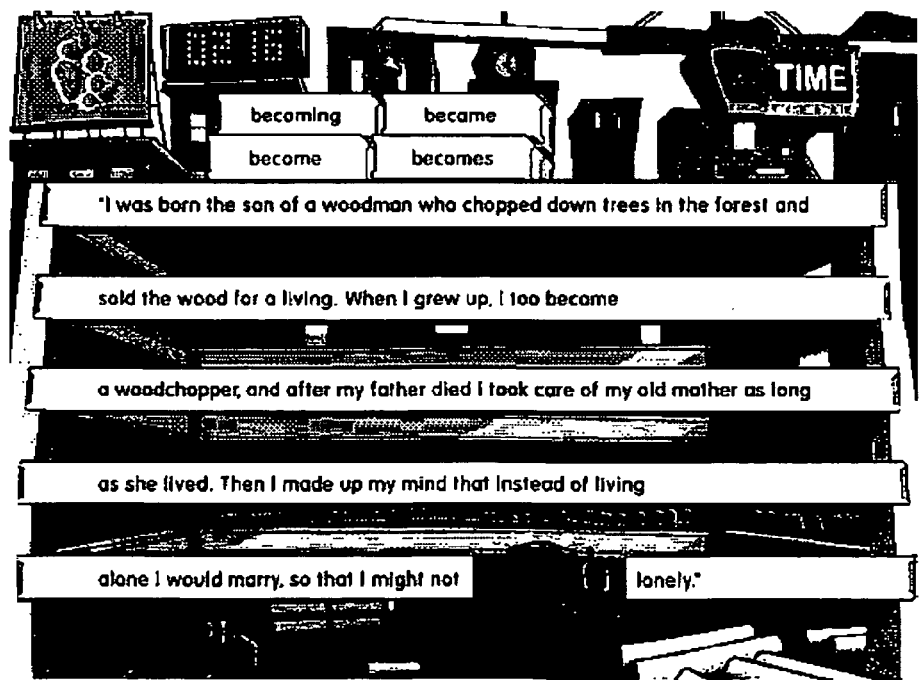
FIG. 46 is a screen shot illustrating a first trial within a second unit within the game Hog Hat Zone.

Referring now to FIG. 46, a screen shot 4600 is shown illustrating a slightly more advanced trial. The length of the reading, along with the complexity of the trial has increased. However, the method of Hog Hat Zone is still the same: the student must complete construction of the pipe by selecting the correct word.

Progression Through Hog Hat Zone

Hog Hat Zone progresses through four tiers of morphological complexity as follows:

Tier 1: Pronouns (such as she) and auxiliary verbs (such as will)

Tier 2: Inflectional suffixes, which are suffixes that add information about number, case, tense, or person, but do not change a word's part of speech. Inflectional suffixes can be added to nouns (such as the -s in cats) and verbs (such as worked and working).

Tier 3: Prefixes (such as the re- in reheat) and derivational suffixes, which are suffixes that change a word's meaning (such as the -less in useless) and often its part of speech (such as the th that changes heal to health)

Tier 4: Diectic pronouns, which are pronouns that point to something (such as here); possessives (such as Mike's); and contractions (such as they're). Many of these pronouns are challenging because they have highly confusable homophones (for instance, they're has two homophones: there and their).

Within each tier, Hog Hat Zone presents two units. The first unit presents paragraphs of 2 to 3 lines displayed on pipes, and the second unit presents paragraphs of 4 to 5 lines displayed on girders. After the student has completed the first unit (shorter paragraphs on pipes), Hog Hat Zone presents the second unit (longer paragraphs on girders).

Adaptivity and Advancement

Hog Hat Zone adapts to the student's incoming skill level and, as the student continues to train, tracks the number of correct and incorrect answers and adjusts the training level when the student is ready to advance or needs to transition to different training material. More specifically, Hog Hat Zone presents the categories within a tier in random order. The student trains on 10 different trials per category. After the student trains on all trials in a tier, Hog Hat Zone evaluates all the trials in that tier for advancement. If the student correctly completed 90 percent of the trials in the first unit (pipes and shorter paragraphs) and 90 percent of the trials in the second unit (girders and longer paragraphs), Hog Hat Zone advances to the next tier.

Hot Hat Zone allows a student who is not progressing in one area to continue to advance in other areas. To accomplish this goal, Hog Hat Zone uses plateau-based transitions to allow the student to train on different material when the student becomes stuck in a unit of a tier—or in a tier—and is not able to progress immediately. If the student did not correctly complete 90 percent of the trials in one unit or another—or both—Hog Hat Zone presents that unit (or both units) again. If the student repeats a unit 3 times but does not achieve 90 percent correct, Hog Hat Zone presents the next tier.

For example, if a student is training on pronouns and auxiliary verbs in tier 1 and is having trouble in both units with deictic pronouns, which are pronouns that point to something (These are the shoes I want), Hog Hat Zone presents the tier 1 paragraphs again. If the student completes the first unit (the shorter paragraphs on the pipes) with 90 percent accuracy, but is still having trouble with the second unit (longer paragraphs on girders), Hog Hat Zone presents the second unit of tier 1 paragraphs again. If the student is unable to complete the second unit with 90 percent accuracy after 3 tries, Hot Hat Zone transitions the student to tier 2, inflectional suffixes and verb tenses.

Before the student completes the exercise—and after the student completes as much of the material in Hog Hat Zone as possible—Hog Hat Zone returns the student to the units that the student did not complete with 90 percent accuracy. Hog Hat Zone requires the student to train on these units until s/he achieves 90 percent accuracy. A complete listing of all of the trials, within each tier, are provided in Appendix F which is attached hereto.

Figure 47A:
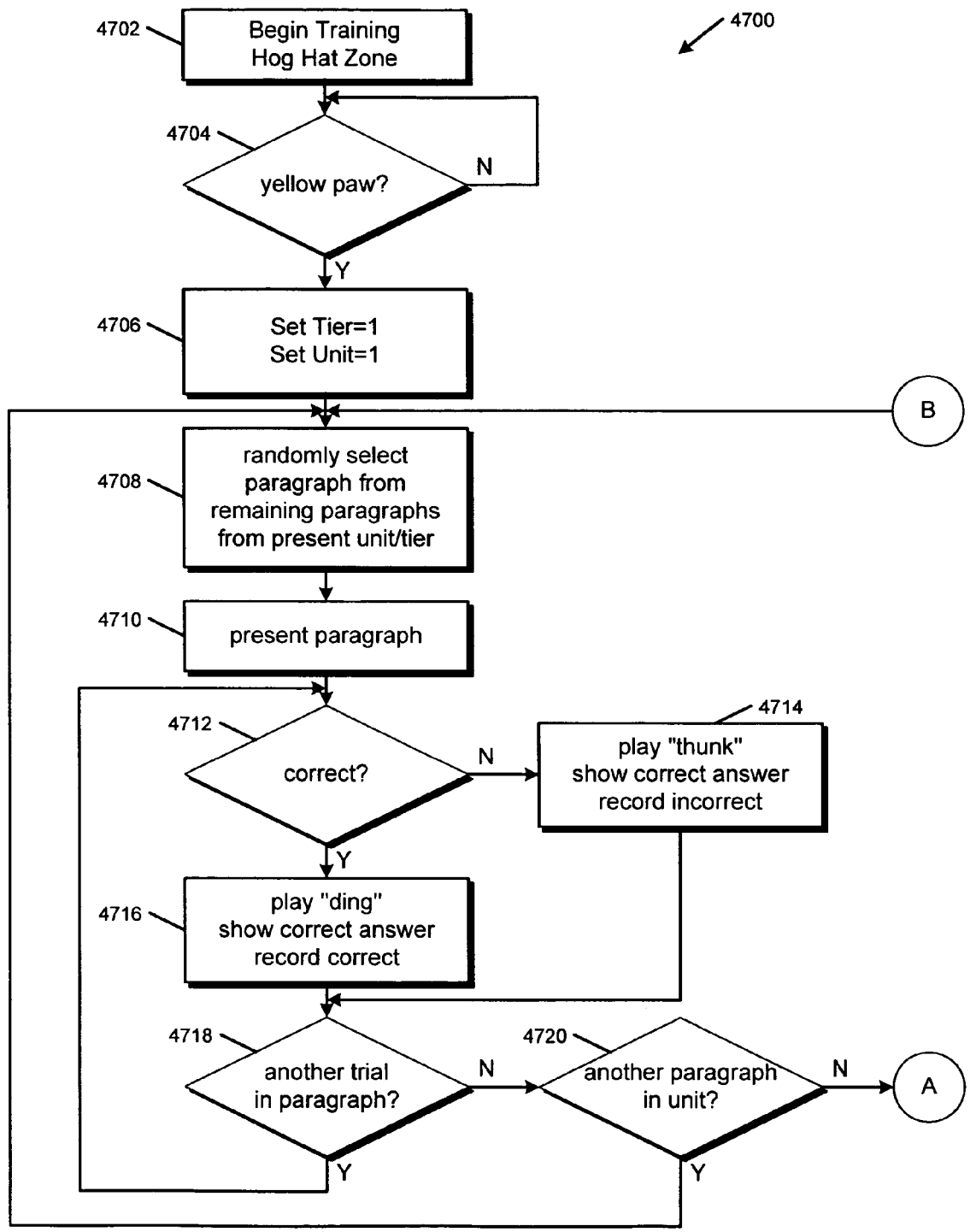
FIGS. 47a–b are a flow chart illustrating the training and advancement methodology within the game Hog Hat Zone.
Figure 47B:
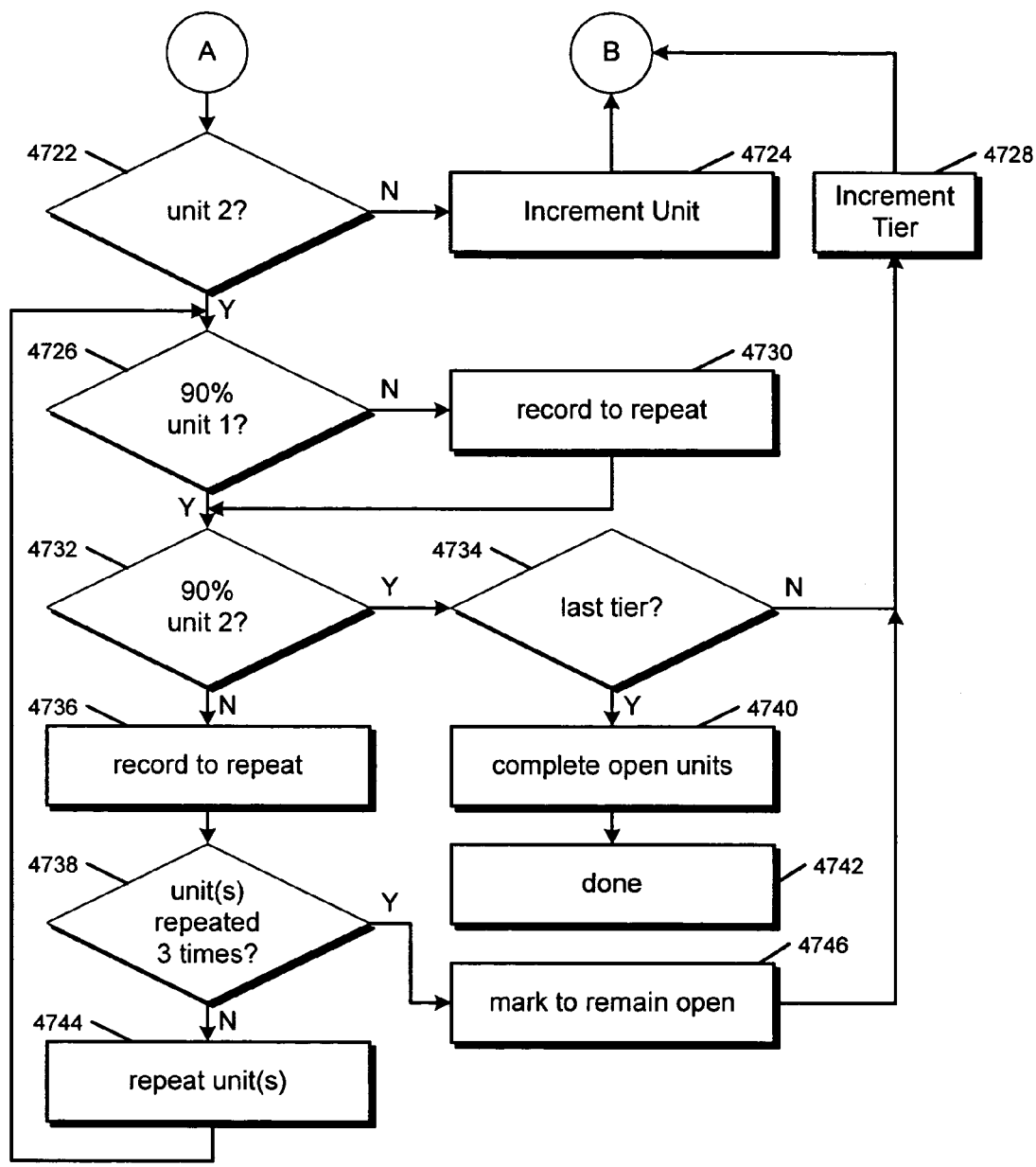

Referring now to FIGS. 47a–b, a flow chart 4700 is provided illustrating the training and advancement methodology for the game Hog Hat Zone. Flow begins at block 4702 and proceeds to decision block 4704.

Play remains at decision block 4704 until the student selects the yellow paw to initiate a trial. Once the student selects the yellow paw, flow proceeds to block 4706.

At block 4706, the Tier and Unit levels are set to 1. Flow then proceeds to block 4708.

At block 4708, the program randomly selects a paragraph from the remaining paragraphs within the present tier and present unit. Initially, the unit and tier are at level 1, and all paragraphs are available for selection. However, as the student progresses through the game, block 4708 chooses remaining paragraphs from the existing tier and unit levels. Flow then proceeds to block 4710.

At block 4710, the present (selected) paragraph is presented to the student as a trial. Flow then proceeds to decision block 4712.

At decision block 4712, a determination is made as to whether the student's selection was correct. If not, flow proceeds to block 4714. Otherwise, flow proceeds to block 4716.

At block 4714, a "thunk" is played to alert the student of the incorrect answer, the incorrect response is recorded, and the correct answer is inserted into the pipe (if unit 1) or girder (if unit 2). Flow then proceeds to decision block 4718.

At block 4716, a "ding" is played to alert the student of the correct answer, the correct response is recorded, and the correct answer is inserted into the pipe/girder. Flow then proceeds to decision block 4718.

At decision block 4718, a determination is made as to whether another trial is outstanding for the present paragraph. If not, flow proceeds to decision block 4720. However, if another trial is outstanding, flow proceeds back to decision block 4712 to evaluate the trial.

At decision block 4720, a determination is made as to whether there is another paragraph within the present unit. If so, flow proceeds back to block 4708 where another one of the remaining paragraphs is chosen for a trial. Otherwise, all paragraphs for the present unit have been completed, and flow proceeds to decision block 4722.

At decision block 4722, a determination is made as to whether the present unit is unit 2. That is, have all paragraphs for both units been presented? If not, then flow proceeds to block 4724. Otherwise, flow proceeds to decision block 4726.

At block 4724 the present unit is incremented. That is, unit 1 is incremented to unit 2. Flow then proceeds back to block 4708 where the program selects a paragraph from the present unit/tier.

At decision block 4726, a determination is made as to whether the student correctly responded to 90% of the trials in unit 1. If not, flow proceeds to block 4730. Otherwise, flow proceeds to decision block 4732.

At block 4730, the fact that the student did not achieve 90& correct responses in unit 1 is recorded. Flow then proceeds to decision block 4732.

At decision block 4732, a determination is made as to whether the student correctly responded to 90% of the trials in unit 2. If not, flow proceeds to block 4736. Otherwise, flow proceeds to decision block 4734.

At block 4736, the fact that the student did not achieve 90& correct responses in unit 2 is recorded. Flow then proceeds to decision block 4738.

At decision block 4738, a determination is made as to whether either/both of units 1 and 2 have been repeated 3 times. If not, flow proceeds to block 4744. Otherwise, flow proceeds to block 4746.

At block 4744, the units that have been recorded to be repeated (in blocks 4730/4736 are repeated per the sequence described above. That is, a student must achieve a 90% correct response in both units before they are allowed to proceed to the next tier. After the recorded units are repeated, flow proceeds back to decision block 4726 to determine if the student has obtained a 90% correct response. This process continues until either: 1) a 90% correct response is obtained in both units, at the present tier level; or 2) the student has repeated either or both the units 3 times. If the student repeats the unit 3 times, flow proceeds to block 4746 (as mentioned above).

At block 4746, the units that were repeated three times, but unsuccessfully, are marked to remain open. Flow then proceeds to block 4728.

At block 4728 the present tier is incremented. That is, if the present tier is 1, the tier is incremented to level 2. Flow then proceeds back to block 4708 where a new paragraph is selected, beginning at unit 1, for the new tier level.

When the program arrives at decision block 4734, it is because the student has obtained a 90% correct response for both units at the present tier level. A determination is then made as to whether the present tier level is the last tier. If it is, flow proceeds to block 4740. However, if it is not the last tier level, flow proceeds to block 4728 where the present tier level is incremented, and the training begins again as described above.

At block 4740, all open units are completed. That is, all of the units that were attempted three times, and not completed with a 90% correct response, were marked open in block 4746, and must be completed before the game ends. Game play continues on the open units until a 90% correct response is obtained. Flow then proceeds to block 4742 where training in Hog Hat Zone ends.

Although the present invention and its objects, features, and advantages have been described in detail, other embodiments are encompassed by the invention. For example, particular advancement/promotion methodology has been thoroughly illustrated and described for each game. The methodology for advancement of each game is based on studies indicating the need for frequency, intensity, motivation and cross-training. However, the number of skill/complexity levels provided for in each game, the number of trials for each level, and the percentage of correct responses required within the methodology are not static. Rather, they change, based on heuristic information, as more students utilize the Fast ForWord Reading training program. Thus, the cross-training benefit of multiple language development programs should not be restricted to the particular advancement methodology prescribed in the detailed description. In addition, one skilled in the art will appreciate that the stimuli used for training, as detailed in the Appendices, are merely a subset of stimuli that can be used within a training environment similar to Fast ForWord Reading. Furthermore, although the animal workers, and construction settings of the games are entertaining, and therefore motivational to a student, other storylines can be developed which would utilize the unique training methodologies described herein.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A method on a computing device for training a student to recover syntactical structures of sentences, the method comprising:
   providing a plurality of sentence categories, each of the categories having a plurality of sentences to be presented as trials, the categories varying in syntactical complexity;
   providing a plurality of graphical pictures, each of the pictures corresponding to at least one of the plurality of sentences to be presented as trials;
   graphically presenting one of the plurality of graphical pictures to the student on the computing device;
   graphically presenting one of the plurality of sentences from a first category to the student as a target, the graphically presented one of the plurality of sentences corresponding to the graphically presented one of the plurality of graphical pictures;
   graphically presenting at least one of the plurality of sentences that does not correspond to the graphically presented one of the plurality of graphical pictures, as a foil;
   requiring the student to select between the target and the foil; and
   recording whether the student correctly selected the target.

2. The method as recited in claim 1 wherein the computing device comprises a processing device for executing instructions, presenting graphical information, and recording input.

3. The method as recited in claim 1 wherein the training to recover syntactical structures of sentences comprises requiring the student to correctly decode a sentence to match a corresponding picture.

4. The method as recited in claim 1 wherein the plurality of sentence categories comprise a predefined database of sentences.

5. The method as recited in claim 1 wherein the plurality of sentences within each category comprise:
   a plurality of target sentences, each of the target sentences corresponding to at least one of the plurality of provided graphical pictures; and
   a plurality of foil sentences, which do not correspond to the plurality of provided graphical pictures.

6. The method as recited in claim 1 wherein a first one of the plurality of categories contains a plurality of sentences having syntactical complexity appropriate for second grade students.

7. The method as recited in claim 6 wherein a second one of the plurality of categories contains a plurality of sentences having syntactical complexity appropriate for third grade students.

8. The method as recited in claim 1 wherein said steps of providing comprise storing the plurality categories and graphical pictures in an electronically readable medium.

9. The method as recited in claim 1 wherein said steps of graphically presenting comprise delivering the one of the plurality of graphical pictures, the target, and the foil, to the student on a display.

10. The method as recited in claim 1 wherein said steps of graphically presenting the target and the foil, randomly place the target and the foil on a display such that the student cannot determine from their placement on the display, which one corresponds to the graphically presented picture.

11. The method as recited in claim 1 wherein said step of graphically presenting one of the plurality of sentences to the student as a target further comprises aurally presenting the target to the student.

12. The method as recited in claim 11 wherein said step of aurally presenting comprises playing the target to the student on speakers so that the student can hear the target as well as seeing the target.

13. The method as recited in claim 1 wherein said step of graphically presenting at least one of the plurality of sentences as a foil comprises graphically presenting two or more of the plurality of sentences as foils.

14. The method as recited in claim 1 wherein said step of requiring comprises considering a selection of the presented target as correct and a selection of the presented foil as incorrect.

15. The method as recited in claim 1 further comprising:
    repeating said step of graphically presenting one of the plurality of graphical pictures through said step of recording, for each of the plurality of sentences within a category.

16. The method as recited in claim 15 further comprising:
    after said step of repeating, determining whether the student correctly selected Y% of the presented targets.

17. The method as recited in claim 16 wherein Y is 90.

18. The method as recited in claim 16 further comprising:
    if the student correctly selected Y% of the presented targets from the first category, selecting a second category for presentation; and
    repeating said steps of graphically presenting thru recording for a plurality of target sentences within the second category.

19. The method as recited in claim 16 further comprising:
    if the student did not correctly select Y% of the presented targets from the first category, repeating said steps of graphically presenting thru recording for a plurality of target sentences within the first category.

20. A method for training a student to choose a sentence that best describes a picture, the method presented within a game environment on a personal computer, the method comprising:
    providing a plurality of target sentences each of which correspond to at least one of a plurality of pictures;
    providing a plurality of foil sentences;
    graphically presenting one of the plurality of pictures on the personal computer, its corresponding target sentence, and at least one of the plurality of foil sentences;
    requiring the student to select between the target sentence and the at least one of the plurality of foil sentences, according to which one corresponds to the graphically presented picture;
    recording whether the student correctly selected the target sentence; and
    repeating said steps of graphically presenting thru recording for each of the plurality of target sentences wherein the plurality of target sentences, pictures and foil sentences belong to a first category of a first syntactical complexity.

21. The method as recited in claim 20 wherein said steps of providing comprise storing predefined target and foil sentences, and pictures, in an electronically readable medium.

22. The method as recited in claim 20 wherein the plurality of foil sentences are provided to provide incorrect choices to the student, for selection.

23. The method as recited in claim 20 wherein said step of graphically presenting further comprises aurally presenting the target and foil sentences.

24. The method as recited in claim 20 wherein said step of graphically presenting comprises presenting at least two of the plurality of foil sentences along with a picture and its corresponding target sentence.

25. The method as recited in claim 20 wherein the student indicates selection between the target sentence and the at least one of the plurality of foil sentences by moving a cursor over at least one of the sentences and pressing a button on an input device coupled to the personal computer.

26. The method as recited in claim 20 further comprising:
providing a plurality of categories of differing syntactical complexity, each having a plurality of target sentences, pictures and foil sentences.

27. The method as recited in claim 26 further comprising:
if the student correctly selects Y% of the target sentences in a first category, selecting a second one of the plurality of categories to be presented to the student; and
repeating said steps of graphically presenting thru repeating for the selected second one of the plurality of categories.

28. The method as recited in claim 26 further comprising:
if the student does not correctly select Y% of the target sentences in a first category, repeating said steps of graphically presenting thru repeating for the first category.

29. The method as recited in claim 28 wherein Y is 90.

30. The method as recited in claim 26 wherein a first category comprises target sentences appropriate for second grade students.

31. The method as recited in claim 26 wherein a second category comprises target sentences appropriate for third grade students.

* * * * *